(12) United States Patent
Lin

(10) Patent No.: US 10,140,126 B2
(45) Date of Patent: Nov. 27, 2018

(54) VARIABLE LENGTH INSTRUCTION PROCESSOR SYSTEM AND METHOD

(71) Applicant: Shanghai XinHao Microelectronics Co. Ltd., Shanghai (CN)

(72) Inventor: Kenneth Chenghao Lin, Shanghai (CN)

(73) Assignee: Shanghai XinHao Microelectronics Co. Ltd., Shanghai (CN)

( * ) Notice: Subject to any disclaimer, the term of this patent is extended or adjusted under 35 U.S.C. 154(b) by 143 days.

(21) Appl. No.: 14/913,352

(22) PCT Filed: Aug. 15, 2014

(86) PCT No.: PCT/CN2014/084540
§ 371 (c)(1),
(2) Date: Feb. 19, 2016

(87) PCT Pub. No.: WO2015/024482
PCT Pub. Date: Feb. 26, 2015

(65) Prior Publication Data
US 2016/0202985 A1 Jul. 14, 2016

(30) Foreign Application Priority Data
Aug. 19, 2013 (CN) .......................... 2013 1 0362686

(51) Int. Cl.
| | |
|---|---|
| G06F 9/32 | (2018.01) |
| G06F 9/30 | (2018.01) |
| G06F 9/38 | (2018.01) |
| G06F 9/26 | (2006.01) |

(52) U.S. Cl.
CPC ............... *G06F 9/32* (2013.01); *G06F 9/26* (2013.01); *G06F 9/261* (2013.01); *G06F 9/3005* (2013.01); *G06F 9/30032* (2013.01); *G06F 9/30149* (2013.01); *G06F 9/382* (2013.01)

(58) Field of Classification Search
None
See application file for complete search history.

(56) References Cited

U.S. PATENT DOCUMENTS

| | | | | |
|---|---|---|---|---|
| 5,452,423 | A | * 9/1995 | Picard | ............. G06F 9/267 711/212 |
| 5,586,277 | A | 12/1996 | Brown et al. | |
| 6,185,671 | B1 | * 2/2001 | Pentovski | ............. G06F 9/30036 712/210 |

(Continued)

FOREIGN PATENT DOCUMENTS

| | | |
|---|---|---|
| CN | 158824 A | 2/2005 |
| CN | 102662635 A | 9/2012 |

OTHER PUBLICATIONS

The World Intellectual Property Organization (WIPO) International Search Report for PCT/CN2014/084540 dated Nov. 21, 2014.

*Primary Examiner* — Eric Coleman
(74) *Attorney, Agent, or Firm* — Anova Law Group, PLLC

(57) ABSTRACT

A variable length instruction processor system and method is provided. Before a processor core executes an instruction, the system and method applied in a processor field convert the instruction into micro-operation(s) and the micro-operation(s) can be filled into a cache system that can be directly accessed by a processor core, reducing the depth of a pipeline and improving efficiency of the pipeline.

32 Claims, 15 Drawing Sheets

(56) References Cited

U.S. PATENT DOCUMENTS

| | | | | |
|---|---|---|---|---|
| 7,032,100 | B1* | 4/2006 | Fleming | G06F 9/30058 |
| | | | | 708/672 |
| 2008/0086623 | A1* | 4/2008 | Lien | G06F 9/30174 |
| | | | | 712/218 |
| 2011/0296096 | A1* | 12/2011 | Zou | G06F 9/30174 |
| | | | | 711/105 |
| 2013/0179651 | A1* | 7/2013 | Shatz | G06F 9/45558 |
| | | | | 711/162 |

* cited by examiner

VARIABLE LENGTH INSTRUCTION PROCESSOR SYSTEM AND METHOD

CROSS-REFERENCES TO RELATED APPLICATIONS

This application is a national phase entry under 35 U.S.C. § 371 of International Application No. PCT/CN2014/084540, filed on Aug. 15, 2014, which claims priority of Chinese Patent Application No. 201310362686.4, filed on Aug. 19, 2013, the entire contents of which are incorporated by reference herein.

FIELD OF THE INVENTION

The present invention generally relates to the fields of computer, communication and integrated circuit.

BACKGROUND

Variable length instructions refer to instructions that have variable word length. For example, in a variable length instruction set, the length of the instructions may be 1 byte, 2 bytes, 3 bytes, 4 bytes, or even more bytes. Fixed length instructions refer to instructions that have fixed word length. For example, the length of every instruction is 4 bytes in a fixed length instruction set. In general, a variable length instruction set is used in Complex Instruction Set Computer (CISC), whereas a fixed length instruction set is used in Reduced Instruction Set Computer (RISC).

Generally, every instruction in the fixed length instruction set completes an operation (or an action), thereby better utilizing efficiency of pipeline execution; whereas some instructions in the variable length instruction set often need to complete multiple operations (or actions) in steps, causing a pipeline in a pause status, thereby reducing pipeline throughput and the overall performance of a processor system.

One solution of the above problem is that a central processing unit (CPU) core (also called processor core) which executes the instructions in the fixed length instruction set is used to generate a variable length instruction address. Based on the variable length instruction address, an instruction is obtained from a memory. Before executing the variable length instruction, the variable length instruction is converted to one or more fixed length instructions. Then, the CPU core executes these fixed length instructions, thereby increasing the pipeline throughput. However, the conversion may increase the depth of the pipeline. Thus, more pipeline stages need to be cleared when branch prediction is wrong, thereby reducing the overall performance of the processor system.

In addition, a cache is generally used to duplicate a part of content from a lower level memory in current processor architectures, so that the duplicated content in the cache can be quickly accessed by a higher level memory or the CPU core and thus to ensure pipeline for continuous execution. In a basic cache structure, after a cache miss occurs, contents in the lower level storage medium is filled into the cache, such that the pipeline has to pause to wait for miss contents to be filled into the cache. Some new cache structures, such as victim cache, trace cache and prefetching, are introduced based on the above cache structure, improving the above structure. Therefore, with a widening gap between processor speed and memory speed, the current computer architectures, especially various kinds of cache misses, become still the most serious bottleneck in increasing the performance of modern processors.

BRIEF SUMMARY OF THE DISCLOSURE

Technical Solution

The disclosed methods and systems are directed to solve one or more problems set forth above and other problems.

A variable length instruction processor system is provided. The system includes a processor core configured to execute micro-operations; a converter configured to convert instructions to the micro-operations; a micro-operation memory configured to store the obtained micro-operations; and a mapping module configured to store address mapping relationships between the instructions and the micro-operations.

Optionally, the converter is also configured to convert an instruction block offset to a micro-operation block offset.

Optionally, the converter is further configured to convert a branch offset of a branch instruction to a compensated branch offset; and the compensated branch offset is equal to a sum of a block offset of the branch instruction and the branch offset of the branch instruction.

Optionally, an ending flag memory configured to store position information of a last micro-operation in every micro-operation block in the micro-operation memory.

Optionally, based on the micro-operation address obtained by performing the conversion operation for the complete instruction address or the partial instruction address outputted by the processor core, the corresponding micro-operation is outputted from the micro-operation memory to the processor core for execution.

Optionally, the variable length instruction processor system also includes: a micro-operation read buffer configured to output the micro-operations to the processor for execution in advance; and a token transmitter corresponding to every micro-operation in the micro-operation read buffer and configured to pass a token, wherein the micro-operation read buffer outputs the micro-operation corresponding to the token transmitter containing the token to the processor core for execution in advance.

Optionally, the variable length instruction processor system also includes: a track table configured to store branch target micro-operation address information of the branch micro-operation; a tracker configured to move on to a first branch micro-operation following a micro-operation executed currently by the processor core, and to output a next micro-operation address and a target micro-operation address of the branch micro-operation; and when the next micro-operation or the target micro-operation is not stored in the micro-operation memory, based on the next micro-operation address, the tracker configured to fill the next micro-operation or the target micro-operation into the micro-operation memory.

Optionally, based on the offset address obtained by converting partial instruction address outputted by the processor core, the corresponding micro-operation is outputted from the micro-operation block pointed to by the tracker to the processor core for processor core execution.

Optionally, when the micro-operations in the same micro-operation block are executed according to an address order, the token is transmitted from a current token transmitter to a neighboring token transmitter; and when the micro-operations in different micro-operation blocks are executed, the token is transmitted from the current token transmitter to a corresponding token transmitter via global buses.

Optionally, the variable length instruction processor system also includes one or more lower levels of memory configured to store the instructions or the micro-operations.

Optionally, the converter is further configured to convert instructions of different instruction sets to instructions of one instruction set.

A variable length instruction processor method is also provided. The method includes: converting instructions in an instruction block to micro-operations, and creating mapping relationships between instruction addresses of the instructions and micro-operation addresses of the micro-operations; converting the instruction address outputted by the processor core to a micro-operation address based on the mapping relationships and outputting a corresponding micro-operation to the processor core for execution based on the micro-operation address; or based on the micro-operation address outputted by the processor core, outputting directly a corresponding micro-operation to the processor core for execution.

Optionally, an instruction block address is equal to a micro-operation block address, and a mapping relationship between an instruction block offset and a micro-operation block offset is created.

Optionally, a position of a last micro-operation of every micro-operation block is flagged by a conversion operation.

Optionally, based on the instruction block address, the micro-operation block is found, and a corresponding micro-operation is found in the micro-operation block by converting the instruction block offset to the micro-operation block offset; and the micro-operation is a first micro-operation of at least one micro-operation corresponding to the instruction.

Optionally, a total number of instructions starting from a first instruction to an instruction to be addressed in the instruction block are counted; a total number of the micro-operations starting from a first micro-operation to a micro-operation to be addressed in the micro-operation block are counted; and the instruction address is converted to the micro-operation address.

Optionally, a compensated branch offset of a corresponding branch micro-operation is obtained by adding a branch offset and a branch instruction block offset; and a branch target micro-operation address corresponding to the branch micro-operation is obtained by adding the compensated branch offset of the branch micro-operation and the block address of the micro-operation block corresponding to the branch micro-operation.

Optionally, when filling the micro-operations to a cache memory, target micro-operation addresses of all branch micro-operations is calculated; the target micro-operation address or address information obtained by mapping the target micro-operation address into a track table is stored; and when executing the branch micro-operation, the position information of the target micro-operation is obtained directly.

Optionally, before a partial or the complete branch micro-operation is executed, the corresponding target micro-operation is filled into the cache memory in advance and updating corresponding information in the track table; and when executing the branch micro-operation, the position information of the target micro-operation in the cache memory is obtained, or the target micro-operation from the cache memory is found directly.

Optionally, instructions of different instruction sets are converted to instructions of one instruction set.

Optionally, the converter is also configured to convert an instruction block to a micro-operation block by performing multiple conversion operations.

Optionally, the system also includes a shifter, where when the instruction block is converted at a first time and only instructions from a certain instruction in the instruction block to an end of the instruction block are converted, the obtained micro-operations are aligned by a minimum address boundary of the micro-operation block; and when partial or all unconverted instructions in the instruction block are converted, the shifter shifts the micro-operations of the part of converted instructions and stores the micro-operations into appropriate positions of the micro-operation block, and then the micro-operations obtained by conversion at this time are filled into corresponding positions of the micro-operation block.

Optionally, when the instruction block is converted every time, position information of the converted instruction in the instruction block and position information of the micro-operation obtained by conversion in the micro-operation block are recorded; and when the partial or all unconverted instructions in the instruction block are converted, the shifter shifts the micro-operations of the part of converted instructions and stores the micro-operations into appropriate positions of the micro-operation block, and then the micro-operations obtained by conversion at this time are filled into corresponding positions of the micro-operation block.

Optionally, when the instruction block is converted at a first time and only instructions from a certain instruction in the instruction block to an end of the instruction block are converted, the obtained micro operations are aligned by a maximum address boundary of the micro-operation block, and position information of the converted instructions in the instruction block and position information of the micro-operations obtained by conversion in the micro-operation block are recorded; and when partial or all unconverted instructions in the instruction block are converted, the micro-operations obtained by conversion at this time and the converted micro-operations in the micro-operation block are spliced, such that all the micro-operations obtained by conversion are aligned by a maximum address boundary of the micro-operation block.

Optionally, position information of a first micro-operation in a next micro-operation block in a sequential address is also recorded in every micro-operation block.

Optionally, the converter is also configured to convert an instruction block to a micro-operation block by performing multiple conversion operations.

Optionally, when the instruction block is converted at a first time and only instructions from a certain instruction in the instruction block to an end of the instruction block are converted, the obtained micro-operations are aligned by a minimum address boundary of the micro-operation block; and when partial or all unconverted instructions in the instruction block are converted, the shifter shifts the micro-operations of the part of converted instructions and stores the micro-operations into appropriate positions of the micro-operation block, and then the micro-operations obtained by conversion at this time are filled into corresponding positions of the micro-operation block.

Optionally, when the instruction block is converted every time, position information of the converted instruction in the instruction block and position information of the micro-operation obtained by conversion in the micro-operation block are recorded; and when the partial or all unconverted instructions in the instruction block are converted, the shifter shifts the micro-operations of the part of converted instructions and stores the micro-operations into appropriate positions of the micro-operation block, and then the micro-operations obtained by conversion at this time are filled into corresponding positions of the micro-operation block.

Optionally, when the instruction block is converted at a first time and only instructions from a certain instruction in the instruction block to an end of the instruction block are converted, the obtained micro operations are aligned by a maximum address boundary of the micro-operation block, and position information of the converted instructions in the instruction block and position information of the micro-operations obtained by conversion in the micro-operation block are recorded; and when partial or all unconverted instructions in the instruction block are converted, the micro-operations obtained by conversion at this time and the converted micro-operations in the micro-operation block are spliced, such that all the micro-operations obtained by conversion are aligned by a maximum address boundary of the micro-operation block.

Optionally, position information of a first micro-operation in a next micro-operation block in a sequential address is also recorded in every micro-operation block.

Other aspects of the present disclosure can be understood by those skilled in the art in light of the description, the claims, and the drawings of the present disclosure.

Advantageous Effects

A cache system closest to a processor core in a processor system stores micro-operations. The processor core can directly perform addressing operations for the micro-operations, and a micro-operation memory can directly provide the micro-operations for the processor core. Comparing with existing Complex Instruction Set Computer (CISC), there is no need to access instructions from the instruction memory, and the instructions are converted to the micro-operations. Therefore, the depth of a pipeline is reduced and the efficiency of the pipeline is improved. Especially when a branch prediction is wrong, the waste of pipeline cycles can be reduced.

Unlike traditional cache systems, in the present disclosure, before the processor core executes an instruction, the corresponding micro-operation(s) can be filled into a micro-operation read buffer in an instruction cache system. Therefore, waiting time of an operation unit caused by a cache miss can be eliminated or masked. Further, for the cache system of the processor system in this disclosure, the micro-operation read buffer can actively output the instructions to the processor core for execution, thereby avoiding tag matching in critical path delay when reading the cache. The cache system can run at a higher clock frequency, and the power consumption is significantly lowered comparing with the traditional cache systems.

For those skilled in the arts, other advantages and applications of the invention are obvious.

BEST MODE

Figure 6:
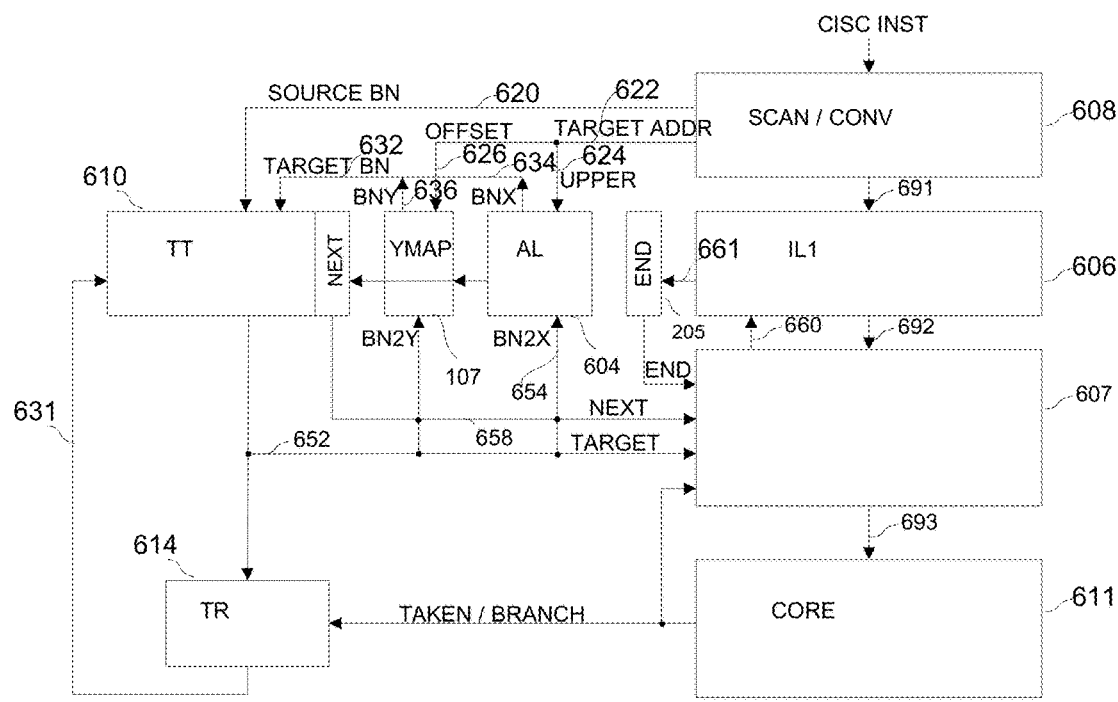
FIG. 6 illustrates a structure schematic diagram of an exemplary processor system based on a track table consistent with the disclosed embodiments.

FIG. 6 illustrates one of the exemplary embodiments related to the best mode of the disclosed invention

DETAILED DESCRIPTION

Reference will now be made in detail to exemplary embodiments of the invention, which are illustrated in the accompanying drawings in connection with the exemplary embodiments. By referring to the description and claims, features and merits of the present invention will be clearer to understand. It should be noted that all the accompanying drawings use very simplified forms and use non-precise proportion, only for the purpose of conveniently and clearly explain the embodiments of this disclosure.

It is noted that, in order to clearly illustrate the contents of the present disclosure, multiple embodiments are provided to further interpret different implementations of this disclosure, where the multiple embodiments are enumerated rather than using an exhaustion method. In addition, for the sake of simplicity, contents mentioned in the previous embodiments are often omitted in the following embodiments. Therefore, the contents that are not mentioned in the following embodiments can refer to the previous embodiments.

Although this disclosure may be expanded using various forms of modifications and alternations, the specification also lists a number of specific embodiments to explain in detail. It should be understood that the purpose of the inventor is not to limit the disclosure to the specific embodiments described herein. On the contrary, the purpose of the inventor is to protect all the improvements, equivalent conversions and modifications based on spirit or scope defined by the claims in the disclosure. The same reference numbers may be used throughout the drawings to refer to the same or like parts.

Variable length instruction address refers to a memory address of an instruction stored in a main memory. That is, the instruction can be found in the main memory based on this address. For simplicity, it is assumed that a virtual address equals to a physical address. The method described in the present invention may be also applied to the situation that address mapping operations need to be performed. The current instruction may refer to the instruction being executed or obtained currently by a central processing unit (CPU) core. The current instruction block may refer to the instruction block containing the instruction being executed currently by the CPU core.

For illustration purposes, as used herein, the term "instruction" represents a variable length instruction; the term "micro-operation" (micro-op) represents a fixed length instruction; the term "instruction block" represents a group of continuous instructions that have the same upper bit portion of the instruction address; the term "micro-operation block" represents a group of continuous micro-operations that have the same upper bit portion of the instruction address. In addition, if the upper bit portions of the addresses of all bytes occupied by one variable length instruction are not exactly the same (that is, the instruction spans two instruction block), the instruction is considered as the last instruction of the previous instruction block, and the next instruction following the instruction is considered as the first instruction of the next instruction block.

A branch micro-operation or a branch point refers to any appropriate micro-operation type that may make the CPU core to change an execution flow (e.g., an instruction or micro-operation is not executed in sequence). The branch micro-operation refers to a micro-operation that executes a branch operation. A micro-operation address may refer to the address of the micro-operation itself, and the address is constituted by an instruction block address and a micro-operation offset (also called offset address); a branch target instruction may refer to a target instruction being branched to by a branch micro-operation; a branch target instruction address may refer to an instruction address of the branch target instruction. A branch target micro-operation may refer to the first micro-operation corresponding to the branch target instruction. A branch target micro-operation address may refer to a micro-operation address of the branch target micro-operation, and the address is constituted by an instruction block address and a micro-operation offset.

Figures 1A, 1B, 1C, 1D:
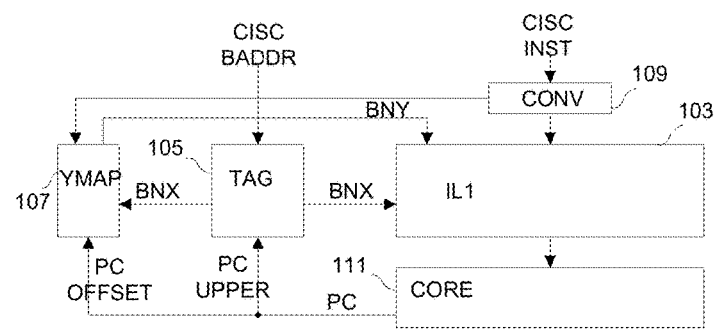
FIG. 1A illustrates an organization mode of an exemplary micro-operation memory consistent with the disclosed embodiments.
FIG. 1B illustrates another organization mode of an exemplary micro-operation memory consistent with the disclosed embodiments.
FIG. 1C illustrates a storage mode of an exemplary micro-operation in a low level memory consistent with the disclosed embodiments.
FIG. 1D illustrates a structure schematic diagram of an exemplary processor system of an instruction cache system consistent with the disclosed embodiments.

Each variable length instruction is converted to one or more micro-operations. Then, these micro-operations are performed by the CPU core, implementing the same functionality as performing the variable length instruction directly. FIG. 1A illustrates an organization mode of an exemplary micro-operation memory. As shown in FIG. 1A, a block address of an instruction block 110 is 8.8 bytes are included in the block, storing different numbers of variable length instructions.

A block offset is represented by byte. Instruction block 111 and instruction block 112 are two sequential instruction blocks following instruction block 110. Each micro-operation block contains 4 fixed length micro-operations. For example, micro-operation block 120, micro-operation block 121, and micro-operation block 123 are three sequential micro-operation blocks, and the block addresses of micro-operation block 120, micro-operation block 121, and micro-operation block 123 are 8, 16, and 24, respectively. A micro-operations block offset is measured by the number of micro-operations. As used herein, a micro-operation occupies a word. For illustration purposes, byte 0 in instruction block 110 is a partially incomplete instruction, where a starting byte is in an instruction block whose block address is '0' (not shown here); the part starting from byte 1 are a 3-byte instruction A; the part starting from byte 4 are a 2-byte instruction B; the part starting from byte 6 are a 4-byte instruction C. The last two bytes of the 4-byte instruction C are byte 0 and byte 1 in instruction block 111. The part starting from byte 2 in instruction block 111 is a 3-byte instruction D. The part starting from byte 5 in instruction block 111 is a 2-byte instruction E. These four instructions are converted into corresponding micro-operations A, B, C and D for performing the same function. The corresponding micro-operations are stored in micro-operation block 120 and placed at the No. 0 word, the No. 1 word, the No. 2 word and the No. 3 word in order. Because the micro-operation block is fully filled, instruction E is stored in the No. 0 word in the next sequential micro-operation block 121. Other instructions and micro-operation blocks are placed according to the same pattern, which are not repeated herein.

Because the number of the micro-operations in a micro-operation block is not necessarily equal to the number of bytes in the corresponding instruction block, so there is a need for providing a maximum address offset in the block for the organization mode. When the address of the micro-operation block points to the last micro-operation, it indicates that the next sequential micro-operation is stored in the No. 0 word in the next sequential micro-operation. When the micro-operations are executed in order, as long as the processor provides an increment '1' for the micro-operation memory address in every clock cycle, the micro-operations can be read out in order from the micro-operations memory. If the current address points to 8-2 (as used herein, the first number is a block address, and the second number is a block offset, that is, micro-operation C in the second word in row 120), the address in the next clock cycle is added '1' to obtain 8-3 (that is, instruction D). At this time, the maximum address offset in the block matches with the address offset '3', indicating that the last micro-operation in the micro-operation block is reached. In the next clock cycle, according to the above indication, the corresponding address generated by the CPU core is 16-0, that is, the first micro-operation in address block 121. Of course, the number of micro-operations in a micro-operation block in the micro-operation memory may be set to be equal to the number of bytes in the instruction block. Thus, setting the ending flag in the block is not needed. The next address automatically points to the first micro-operation in the next instruction block by adding '1' to the current address when the current address points to the last micro-operation in the block.

In the memory, when the instruction is not executed in order (e.g., a branch is executed), the instruction address needs to be mapped to the micro-operation address because a compiler provides a branch offset based on the relative position of the branch source instruction and the branch target instruction in the memory. For example, when the instruction which instruction address is 8-6 (i.e., instruction C) is a branch instruction and the branch instruction jumps using a branch offset 16, the processor system obtains a result 30 by adding the value 8-6 (i.e., 8+6=14) and the branch offset (i.e., 16). The result that the obtained value is 30 is the branch target instruction address 24-6, that is, instruction H in instruction block 112. Accordingly, when micro-operation C (the address of micro-operation C is 8-2) is a branch micro-operation in micro-operation block 120 and a branch offset is 16 that is obtained from instruction conversion, the following 3 mapping steps need to be performed for a jump with the branch offset (i.e., 16). The first step is a branch source mapping operation. That is, the micro-operation address 8-2 is mapped to the instruction address 8-6. The second step is a mapping operation for conversion relation between the instruction bytes in the middle block (that is, neither a branch source instruction block, nor a branch target instruction block) and the micro-operations (e.g., if the branch offset is large, there may be many middle blocks between the branch source instruction block and the branch target instruction block, and the mapping relationship between the number of bytes in each block and the number of micro-operations are not the same). The third step is a mapping operation from a branch target instruction block offset to a branch target micro-operation block offset. The address (i.e., 16-3) of the branch target micro-operation may be obtained by performing these three mapping steps in combination with the branch offset.

FIG. 1B illustrates the second storage organization mode of an exemplary micro-operation memory. Instruction block 110, instruction block 111 and instruction block 112 store the same variable length instructions shown in FIG. 1A. Micro-operation block 130, micro-operation block 131, and micro-operation block 132 are the second storage mode of micro-operations. Micro-operation block 130 stores three micro-operations corresponding to the three instructions in instruction block 110, and the 3rd micro-operation is vacant. Micro-operation block 131 and micro-operation block 132 are organized by the same mode. That is, the number of micro-operations contained in the micro-operation block is the same as the number of instructions in the corresponding instruction block, and the micro-operation block may not be fully filled. Thus, the block address of the micro-operation is the same as the block address of the instruction block. For example, a micro-operation corresponding to instruction H in instruction block 112 (a block address is 24) is in micro-operation block 132 (the block address is 24). In the second storage mode, the number of the micro-operations in every micro-operation block is different, so there is a need for setting a maximum block offset in each micro-operation block for the organization mode. When the address points to the last micro-operation in the micro-operation block, the maximum block offset prompts that the next sequential micro-operation is stored in the first micro-operation in the next sequential instruction block.

When the micro-operations are executed in order, as long as the processor provides an increment '1' for the second kind of micro-operation memory address in every clock cycle, the micro-operations can be read out in order from the micro-operation memory. If the current address points to 8-2, the maximum address offset in the block matches with address offset '2' at this time. It indicates that the last micro-operation in the micro-operation block is reached. In the next clock cycle, according to the above indication, the corresponding address generated by the CPU core is 16-0, that is, the first micro-operation in address block 131 (the next sequential instruction block).

In the memory with the second storage organization mode, when the instruction is not executed in order (e.g., a branch is executed), the instruction address needs to be mapped to the micro-operation address in only two steps. For example, when a micro-operation (the address of the micro-operation is 8-2) is a branch micro-operation and performs a jump with the branch offset (i.e., 16), the following 2 mapping steps are performed. The first step is a branch source mapping operation. That is, the micro-operation address 8-2 is mapped to the instruction address 8-6 (i.e., instruction C). The processor system obtains the value 30 by the value 8-6 (i.e., 8+6=14) plus the branch offset (i.e., 16). The result that the obtained value is 30 is the branch target instruction address 24-6, that is, H instruction in instruction block 112. The second step is a branch target mapping operation. By performing the mapping operation, the address (24-1) of the corresponding micro-operation (i.e., micro-operation H) in the sixth byte in the instruction block (the instruction block address is 24) is mapped. The mapping operation to convert between instruction bytes and micro-operations in the middle blocks is omitted because the number of micro-operations in the micro-operation block is the same as the number of instructions in the corresponding instruction block (i.e., a fixed mapping) in the second storage organization mode. The branch micro-operation C (the address is 8-2) in the micro-operation block 130 and a branch offset (the branch offset is 16) are used as an example. According to the above method, at the beginning, a block offset (i.e., 6) of the branch source instruction corresponding to the branch source micro-operation is obtained by performing a mapping operation. Then, the instruction address (i.e., 8+6=14) is obtained by using the block offset and the micro-operation block address. The processor system obtains the value 30 by the instruction address (i.e., 8+6=14) plus the branch offset (i.e., 16). The result that the obtained value is 30 is the branch target instruction address (i.e., 8-6). Further, the step for mapping the instruction block offset (i.e., 6) to the micro-operation address (i.e., 2) is performed.

The memory with the second storage organization mode is used in all the following embodiments. Therefore, the instruction block address and the micro-operation block address are the same and can be exchanged. In general, the instruction block offset and the micro-operation block offset are different, so a lookup mapping operation needs to be performed. Even if in a lower level memory, when one micro-operation block in the memory can store multiple micro-operation blocks in a higher level memory, the organization mode is still used. FIG. 1C illustrates a storage mode of an exemplary micro-operation in a low level memory consistent with the disclosed embodiments. As shown in FIG. 1C, each micro-operation block in the low level memory may store 16 micro-operations, which is equivalent to 2 micro-operation blocks in a higher level memory. The block address of micro-operation block 140 is 0. Micro-operation block 140 stores the micro-operation block whose address is 0 and the micro-operation block 130 (the block address is 8) in FIG. 1B. The block address of micro-operation block 141 is 16. Micro-operation block 141 stores the micro-operation block 131 (the block address is 16) and the micro-operation block 132 (the block address is 24) in FIG. 1B. The micro-operation blocks in the lower level memory still use the micro-operation blocks in the higher level memory as units of measure, such that a corresponding relationship between the micro-operation block and the corresponding instruction block in the higher level memory is maintained.

Further, the branch source mapping step can be eliminated. In the first method, every branch micro-operation stores the block offset of the corresponding instruction, and an extra look-up table operation is not needed. When the program executes a branch micro-operation, the branch target instruction address is calculated by the stored block offset of the branch instruction, that is, a branch target instruction address=a block address of the branch source micro-operation+a block offset of the branch source instruction+a branch offset. In the second method, the micro-operation is placed by a sparse matrix, such that the block offset of the micro-operation is equal to the block offset of the instruction, that is, a branch target instruction address=a block address of the branch source micro-operation+a block offset of the branch source micro-operation+a branch offset. The storage mode needs a mechanism for pre-detecting vacant micro-operations and jumping the vacant micro-operations when the instructions are executed in order. In the third method, when the instruction is converted into the micro-operation, the branch offset is compensated. That is, a compensated branch offset=a block offset of the branch source instruction+a branch offset. The compensated branch offset is placed in the micro-operation to replace the old branch offset.

In the operation mode for using the compensated branch offset, when the instruction is converted, that is, a compensated branch offset=a block offset of the branch source instruction+a branch offset (i.e., 22=6+16), the compensated branch offset (i.e., 22) is placed in the micro-operation to replace the old branch offset. When the branch micro-operation C (the address 8-2 in micro-operation block 130) is executed, the target address of the branch instruction is calculated by the address of the micro-operation block plus the compensated branch offset (i.e., 30=8+22). The address points to micro-operation block 132 (the address is 24). Then, a mapping operation from an instruction block offset to the micro-operation block offset (6→1 in the block with address 24) is performed to obtain a branch target micro-operation address 24-1. The method is used in FIG. 2.

Further, when the instruction is converted, the branch target micro-operation address is calculated and stored into the memory corresponding to the branch source micro-operation. In this method, when the micro-operation is a branch operation, there is no need to perform any mapping operation for the block offset. This method is described in detail in FIG. 6.

There is a one-to-one correspondence between the instruction block and the micro-operation block. Therefore, the block address of the instruction block is the same as the block address of the corresponding micro-operation block. But due to the number of instructions in the instruction block and the number of micro-operations in the corresponding micro-operation block are not always the same, the block offset of an instruction and the block offset of its corresponding micro-operation are not always the same.

FIG. 1D illustrates a structure schematic diagram of an exemplary processor system of an instruction cache system consistent with the disclosed embodiments. As shown in FIG. 1D, the processor system includes an instruction cache system and a CPU core 111. A memory address generated by CPU core 111 is an address corresponding to a variable length instruction, and an execution unit in CPU core 111 executes the micro-operations. The instruction cache system includes a micro-operation memory 103, a tag memory 105, a mapping module 107, and a converter 109. It is understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

Converter 109 is configured to convert an instruction block containing variable length instructions to a micro-operation blocking a cache memory system. Specifically, according to the number of operations (or actions) contained in each variable length instruction, converter 109 converts the variable length instructions to a corresponding number of fixed length micro-operations. In addition, when the instruction block is converted to the micro-operation block, a corresponding relationship between the instruction block offset of every instruction in the instruction block and the micro-operation block offsets of its one or more corresponding micro-operations may be obtained.

The micro-operation memory 103 is configured to store the micro-operations converted by converter 109. The micro-operation memory 103 may include any appropriate storage devices such as register, register file, static RAM (SRAM), dynamic RAM (DRAM), flash memory, hard disk, Solid State Disk (SSD), and any appropriate storage device or new storage device of the future. The micro-operation memory 103 may function as a cache for the system or a level one cache if other caches exist, and may be separated into a plurality of memory segments called blocks (e.g., memory blocks) for storing data to be accessed by the CPU core 111. Thus, the capacity of every memory block in micro-operation memory 103 is the same as the maximum number of operations possibly contained in an instruction block, and every memory block in micro-operation memory 103 stores a micro-operation block.

For example, if an instruction block contains at most 16 instructions and every instruction is converted into at most 3 micro-operations, every memory block in micro-operation memory 103 may contain 48 micro-operations. Because the number of micro-operations contained in micro-operation block is not greater than the number of micro-operations that can be stored in the memory block, the memory block may store the micro-operations in a sparse way.

There is a one-to-one correspondence between every row in the tag memory 105 and every row in the micro-operation memory 103. Every row in the tag memory 105 is used to store the block address of the corresponding micro-operation block in the micro-operation memory 103. Because the block address is the same as the block address of the corresponding micro-operation block in the micro-operation memory 103, the content stored in every row in the tag memory 105 is the block address of the corresponding micro-operation block in the micro-operation memory 103, and the block address of the instruction block which corresponds the micro-operation block Mapping module 107 is configured to store a corresponding relationship between the instruction block offset and the micro-operation block offset, and obtain the block offset in the micro-operation block containing the first micro-operation in one or more micro-operations corresponding to the instruction by the conversion operation according to the instruction block offset.

When CPU core 111 executes an instruction, at the beginning, CPU core 111 needs to load the instruction from the lower level memory. As used herein, the level of a memory refers to the closeness of the memory in coupling with a CPU core 111. The closer to the CPU core 111, the higher the level. Further, a memory with a higher level is generally faster in speed while smaller in size than a memory with a lower level.

When the instruction block is sent to the cache system, at the beginning, converter 109 converts every instruction in the instruction block into one or more micro-operations. Then, the obtained micro-operation is filled into the memory block in micro-operation memory 103 specified by a replacement algorithm (e.g., LRU replacement algorithm). The block address of the instruction block (i.e., the block address of the micro-operation block) is filled into the row corresponding to the memory block in tag memory 105. At the same time, a corresponding relationship between an instruction block offset and a micro-operation block offset is filled into mapping module 107.

When CPU core 111 needs to obtain the instruction, the upper bit portion of the instruction address (i.e., the instruction block address) is sent to tag memory 105 to perform a matching operation, and the low bit portion of the instruction address (i.e., instruction block offset) is sent to mapping module 107. Mapping module 107 converts the low bit portion of the instruction address to the micro-operation block offset according to the stored corresponding relationship between the instruction block offset and the micro-operation block offset.

If the upper bit portion of the address matches successfully in tag memory 105, the memory block corresponding to the entry which is successfully matched is the memory block containing the micro-operations corresponding to the instruction needed by CPU core 111. At this time, based on the micro-operation block offset converted by mapping module 107, the micro-operations corresponding to the instruction can be read out from the memory block and sent to CPU core 111 for execution.

If the upper bit portion of the address does not match successfully in tag memory 105, the micro-operations corresponding to the instruction needed by CPU core 111 are not stored in micro-operation memory 103. At this time, the instruction address is sent to the lower level memory to obtain the corresponding instruction block. When the instruction block is sent to the cache system, according to the previous method, the instruction block is converted and the converted instruction block is filled into micro-operation memory 103. Tag memory 105 and mapping module 107 are also updated. At the same time, the micro-operation obtained by the conversion operation is sent to CPU core 111 for execution.

The micro-operation memory 103 is indexed by the first address (BNX) obtained by the matching operation and the second address (BNY) obtained by the mapping operation, where the row in micro-operation memory 103 is found by using the first address, and the column in micro-operation memory 103 is found by using the second address. When only branch target instruction address is processed, BNY is generated by converter 109. In other situations, CPU core 111 directly generates BNY and indexes the columns in micro-operation memory 103.

In addition, the converter is also configured to convert instructions from different instruction sets to instructions in one instruction set. For example, converter 109 includes a conversion function (that is, the instruction in the instruction set B can be converted to the corresponding instruction in the instruction set A by the converter 109). Therefore, the processor may support the instruction set A and the instruction set B at the same time. When the instruction set A is executed, converter 109 only executes a conversion function from the instructions to the micro-operations but does not execute the instruction set conversion function. When the instruction set B is executed, converter 109 not only executes the conversion function from the instructions to the micro-operations but also executes the instruction set conversion function. Or when the instruction set B is executed, converter 109 may directly convert the instructions in instruction set B to the micro-operations corresponding to the instructions in instruction set A. The conversion function is implemented before the micro-operation is stored into micro-operation memory 103, so micro-operation memory 103 only stores micro-operations in instruction set A. Therefore, when CPU core needs the micro-operation, as long as the micro-operation is hit in the micro-operation memory 103, there is no need to wait for the conversion of the instruction set.

Figure 2:
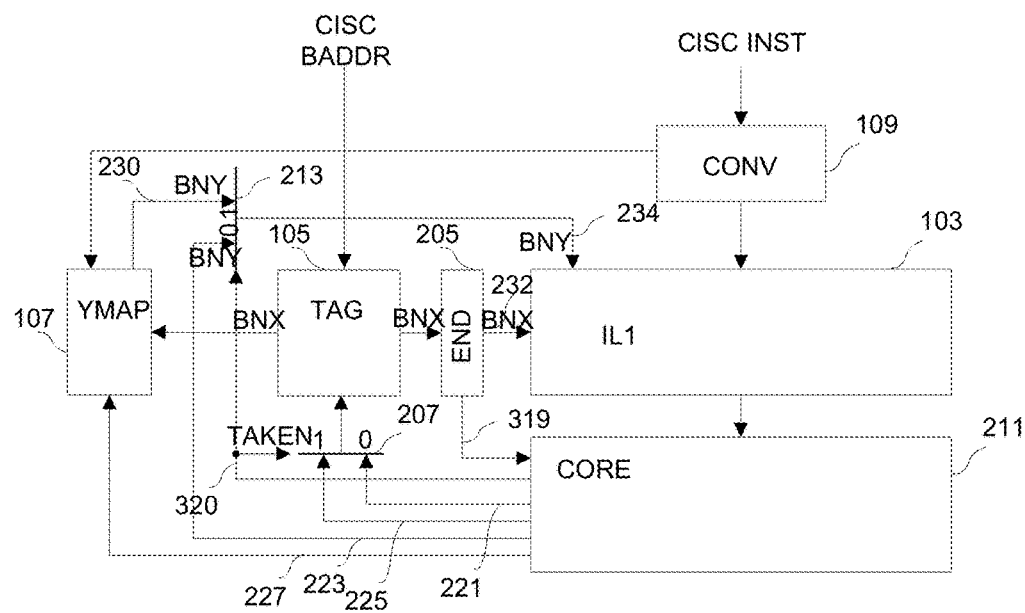
FIG. 2 illustrates a structure schematic diagram of another exemplary processor system of an instruction cache system consistent with the disclosed embodiments.

FIG. 2 illustrates a structure schematic diagram of another exemplary processor system of an instruction cache system consistent with the disclosed embodiments. As shown in FIG. 2, the system includes an instruction cache system and a CPU core 211. The instruction cache system includes a micro-operation memory 103, a tag memory 105, an ending flag memory 205, a mapping module 107, and a converter 109. The functions of micro-operation memory 103, tag memory 105, mapping module 107, and converter 109 in FIG. 2 are the same as the functions of the corresponding parts in FIG. 1. CPU core 211 provides 'TAKEN' signal 320 to control selector 207 and selector 213. 'TAKEN' signal 320 is a decision for a branch micro-operation by CPU core 211. When the executed micro-operation is a branch micro-operation and the branch is taken successfully, 'TAKEN' signal 320 is '1'. When the executed micro-operation is a branch micro-operation and the branch is not taken, or when the executed micro-operation is a non-branch micro-operation, 'TAKEN' signal 320 is '0'.

CPU core 211 is a modified CPU core. The instruction address outputted by CPU core 211 is constituted by sequential micro-operation block address 221, sequential micro-operation block offset 223, branch target micro-operation block address 225 and branch target micro-operation block offset 227. Under the control of TAKEN signal 320, selector 207 selects a block address that is sent to tag memory 105. Under the control of TAKEN signal 320, selector 213 selects a block offset that is sent to micro-operation memory 103. When TAKEN signal 320 is '0', selector 207 selects sequential micro-operation block address 221. The sequential micro-operation block address 221 is sent to tag memory 105 to perform a matching operation to select a micro-operation block in micro-operation memory 103. Under the control of TAKEN signal 320, selector 213 selects sequential micro-operation block offset 223. A micro-operation in the micro-operation block is read out and sent to CPU core 211 for execution. When TAKEN signal 320 is '1', selector 207 selects branch target micro-operation block address 225. The branch target micro-operation block address 225 is sent to tag memory 105 to perform a matching operation to select a micro-operation block in micro-operation memory 103. Under the control of TAKEN signal 320, selector 213 selects branch target micro-operation block offset 230, which is mapped by mapping module 107. A micro-operation in the micro-operation block addressed by the selected 230 is read out and sent to CPU core 211 for execution.

After the sequential instruction block address or the branch instruction block address via tag memory 105 performs a matching operation to obtain BNX signal 232, the position of the micro-operation block corresponding to the instruction block represented by the block address may be found in micro-operation memory 103. The instruction block offset 227 is valid when CPU core 211 obtains a branch target instruction. The instruction block offset 227 represents the offset of the branch target instruction in the instruction block. As shown in FIG. 1D, after the instruction offset address is converted to BNY 234 by mapping module 107, the corresponding micro-operation may be found in the row pointed to by BNX in micro-operation memory 103. Sequential micro-operation block offset 223 can be directly used as BNY to index the column in micro-operation memory 103.

There is a one-to-one correspondence between a row in ending flag memory 205 and a row in tag memory 105 (and a memory block in micro-operation memory 103), which stores BNY corresponding to the last micro-operation in every micro-operation block. Because the number of micro-operations obtained through converting the instructions by converter 109 and the number of instructions may be not the same, ending flag memory 205 may check whether the micro-operation is the last micro-operation in the current micro-operation block when CPU core 211 reads the micro-operation. If the micro-operation is not the last micro-operation in the current micro-operation block, the column address of the next micro-operation is obtained by adding 1 to BNY of the micro-operation. If the micro-operation is the last micro-operation in the current micro-operation block, the next micro-operation is the first micro-operation in the next micro-operation block.

Ending flag memory 205 may also have any appropriate organization mode. For example, each row in ending flag memory 205 may include entries, and the number of entries is the same as the maximum number of micro-operations in every micro-operation block. '1' is stored in the entry in each row corresponding to the last micro-operation in the micro-operation block, and '0' is stored in the other entries in the row. In this case, when CPU core 211 reads a micro-operation, CPU core 211 also reads a corresponding entry in ending flag memory 205 at the same time. If the value of the entry is '0', it indicates that the micro-operation read by CPU core 211 is not the last micro-operation in the micro-operation block. If the value of the entry is '1', it indicates that the micro-operation read by CPU core 211 is the last micro-operation in the micro-operation block.

When CPU core 211 executes the instructions in order, if the current micro-operation is not the last micro-operation in the current micro-operation block, it indicates that the next micro-operation and the current micro-operation are in the same micro-operation block (i.e., the same instruction block). At this time, the CPU core 211 outputs the unchanged sequential instruction block address via bus 221 selected by the selector 207 is sent to tag memory 105 to perform a matching operation. The micro-operation offset address is incremented to obtain a new addressable address. The next micro-operation can be found by the new addressable address selected by selector 213 in micro-operation memory 103. When CPU core 211 executes the instructions in order, if the current micro-operation corresponds to the ending flag of the current micro-operation block, it indicates that the next micro-operation and the current micro-operation are not in the same micro-operation block (that is, the next micro-operation is the first micro-operation in the next micro-operation block of the current micro-operation block). At this point, the selector 207 selects the sequential instruction block address added by 1 outputted by CPU core via bus 221 and sent to tag memory 105 to perform a matching operation. The micro-operation offset address is cleared (that is, the micro-operation offset address is set to '0') to obtain a new addressable address. The next micro-operation can be found by the new addressable address selected by selector 213 in micro-operation memory 103.

When CPU core 211 executes discontinuous instructions (e.g., a target micro-operation) due to taking a branch, the target instruction block address selected by the selector 207 is sent to tag memory 105 to perform a matching operation, where CPU core 211 outputs the target instruction block address. Thus, the instruction block address of the target instruction address is sent to tag memory 105 to perform a matching operation and the instruction offset address is sent to mapping module 107 to perform a conversion operation to obtain the corresponding micro-operation offset address. The target micro-operation can be found by the corresponding micro-operation offset address selected by selector 213 in micro-operation memory 103.

When CPU core 211 executes a branch instruction, a branch target instruction is calculated by an arithmetic unit in CPU core 211. For example, an adder in CPU core 211 adds a branch offset to a branch instruction address to obtain a branch target address. Or an instruction address generation module directly uses an instruction block address and a compensated branch offset to calculate a branch target instruction. At this point, the compensated branch offset can be calculated during the process that converter 109 converts the branch instruction (that is, a compensated branch offset=a block offset of the branch instruction+a branch offset). The compensated branch offset is stored in the micro-operation corresponding to the branch instruction in micro-operation memory 103. Typically, the branch target address is equal to a sum of the branch instruction address and the branch offset, and the branch instruction address is equal to a sum of the branch instruction block and the branch instruction block offset. Therefore, the branch target address is equal to a sum of the branch instruction block address and the compensated branch offset.

Figure 3:
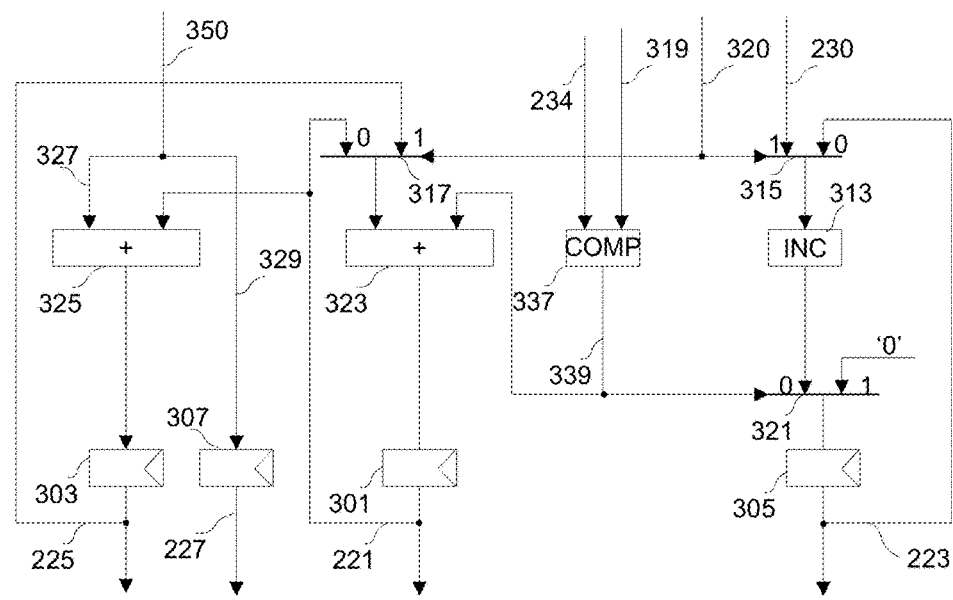
FIG. 3 illustrates an exemplary process for generating an instruction address in a modified CPU core consistent with the disclosed embodiments.

FIG. 3 illustrates an exemplary process for generating an instruction address in a modified CPU core consistent with the disclosed embodiments. The structure of the instruction address is different from the structure of the traditional instruction address. A memory address is divided into a block address (that is, upper bit portion of the micro-operation address, which is the same as the upper bit portion of the instruction address) and a block offset (that is, the low bit portion of the instruction address or micro-operations address). As shown in FIG. 3, when a micro-operation is executed in order, register 301 outputs micro-operation block address 221, and register 305 outputs micro-operation block offset 223 (BNY); when a branch target instruction is executed, register 303 outputs block address 225, and register 307 outputs instruction block offset 227. Selector 315 and selector 317 are controlled by TAKEN signal 320 which indicates whether a branch is taken. Selector 321 is controlled by the output of comparator 337.

Specifically, when the CPU core 211 executes the sequential micro-operation, selector 315 selects the current micro-operation block offset 223 sent from register 305 under the control of TAKEN signal 320 ('0'). The current micro-operation block offset 223 is sent to incrementer 313 to be added by 1, waiting for selector 321 selection. If a micro-operation currently executed by CPU core 211 is not the last micro-operation in the micro-operation block, comparator 337 compares micro-operation block offset 234 with ending flag 319 sent from ending flag register representing the last micro-operation offset address in the micro-operation block. The comparison result is unmatched. Therefore, selector 321 selects the micro-operation offset address outputted by incrementer 313 as the micro-operation offset address in the next clock cycle. At the same time, adder 323 adds the instruction block address fed back from register 301 to the received unsuccessful matching signal ('0') to obtain a new result. The new result is used as a new instruction block address, keeping the instruction block address unchanged. Thus, the instruction block address 221 outputted from register 301 is unchanged in the next clock cycle. According to the method described in FIG. 2, when TAKEN signal 320 is '0', after selector 207 selects the unchanged instruction block address 221 under the control of TAKEN signal 320 ('0'), the original BNX is obtained by tag memory 105 (that is, the block pointed to by BNX in micro-operation memory 103 is unchanged). In the next clock cycle, the current micro-operation block offset 223 outputted from register 305 is increased by 1 to obtain a new micro-operation block offset 223. After selector 207 selects the new micro-operation block offset 223 under the control of TAKEN signal 320 ('0'), the new micro-operation block offset 223 is used as BNY. The BNX points to the corresponding micro-operation in the block, implementing the function for providing the next sequential micro-operation in the same instruction block (micro-operation block) to CPU 211.

If a micro-operation currently executed by CPU core 211 is the last micro-operation in the micro-operation block, the comparator 337 compares the current micro-operation block offset 234 with ending flag 319 sent from ending flag register 205 representing the last micro-operation offset address in the micro-operation block corresponding to the instruction block. The comparison result is matched successfully. Therefore, selector 321 selects '0' as a new micro-operation offset address. At the same time, adder 323 adds the instruction block address fed back from register 301 to the received successful matching signal ('1') to obtain a new result. The new result is used as a new instruction block address, such that the instruction block address is added by 1. Thus, the instruction block address 221 outputted from register 301 is added by 1. According to the method described in FIG. 2, after selector 207 selects the new instruction block address, BNX is obtained by tag memory 105. The BNX points to the corresponding row in the next sequential micro-operation block in micro-operation memory 103. The micro-operation block offset 223 outputted from register 305 is '0'. The micro-operation block offset 223 selected by selector 207 is used as BNY. The BNY points to the first micro-operation in the row, implementing the function for providing the first micro-operation in the next sequential instruction block (micro-operation block) to CPU 211.

If CPU core 211 executes a branch micro-operation and the branch is taken, adder 325 obtains the address of a new instruction block by adding the current micro-operation block address (i.e., branch source address) sent from register 301 to the upper bit portion 327 of the compensated branch offset 350 contained in the micro-operation, and the new instruction block address is stored in register 303. The low bit portion 329 of the compensated branch offset 350 that is used as a branch target instruction block offset is stored in register 307. Thus, after selector 207 selects the branch target block address 225 outputted from register 303 (at this time, TAKEN signal 320 is '1'), BNX is obtained by tag memory 105. The BNX points to the micro-operation block in micro-operation memory 103 corresponding to the branch instruction block. The branch target instruction block offset 227 outputted from register 307 is converted to micro-operation offset address 230 by mapping module 107. The micro-operation offset address 230 selected by selector 207 is used as BNY (at this time, TAKEN signal 320 is '1'). The BNY points to the corresponding micro-operation in the row (i.e., the first micro-operation corresponding to the branch target instruction), implementing the function for providing the first micro-operation corresponding to the branch target instruction to CPU 211.

At this time, TAKEN signal 320 ('1') controls selector 317 to select branch target micro-operation block address 225 and send the branch target micro-operation block address 225 to one input of adder 323. Adder 323 adds the branch target micro-operation block address 225 to the output of comparator 337. TAKEN signal 320 ('1') controls selector 315 to select micro-operation offset address 230 and send the micro-operation offset address 230 to incrementer 313. The micro-operation offset address 230 is increased by 1 via incrementer 313. At the same time, micro-operation block offset 234 (BNY) selected by selector 213 is compared with ending flag 319 in the micro-operation block. If there is no match between micro-operation block offset 234

(BNY) and ending flag 319 (that is, the branch target micro-operation is not the last micro-operation in the micro-operation block), the output 339 of comparator 337 is '0'. Block address 225 is not changed after adding the output 339 '0' and block address 225 is stored into the register 301 in the next clock cycle. The output 339 of comparator 337 also controls selector 321 to select the output of incrementer 313, such that micro-operation offset address 230 added by '1' is stored into registers 305 in the next clock cycle. Thus, the micro-operation address sent via the buses is the branch target address+'1' in the next clock cycle. At this point, TAKEN signal 320 ('0') controls selector 207 and selector 213 to select the address on bus 221 and the address on bus 223 as BNX and BNY to access micro-operation memory 103.

If there is a match between micro-operation block offset 234 (BNY) and ending flag 319 (that is, the branch target micro-operation is the last micro-operation in the micro-operation block), the output 339 of comparator 337 is '1'. Block address 225 added by '1' is stored into the register 301 in the next clock cycle. The output 339 of comparator 337 also controls selector 321 to select '0', such that micro-operation offset address 230 added by '1' is stored into register 305 in the next clock cycle. Thus, the micro-operation block address sent via bus 221 is used as the address of the next instruction block of the branch target instruction block in the next clock cycle and the micro-operation offset address sent via bus 223 is '0'. At this point, TAKEN signal 320 ('0') controls selector 207 and selector 213 to select the address on bus 221 and the address on bus 223 as BNX and BNY to access micro-operation memory 103. The above pattern is repeated, making the pipeline starts from accessing micro-operation memory 103. The pipeline does not need to start from the variable length instruction that is not converted, saving a pipeline segment for converting the variable length instruction to the micro-operations.

In addition, as the previous description, the branch target instruction address can also be calculated by the arithmetic unit included in CPU core 211. In this case, the corresponding modules that can achieve the same functionality in FIG. 3 can be omitted, which are not repeated herein.

Figure 4:
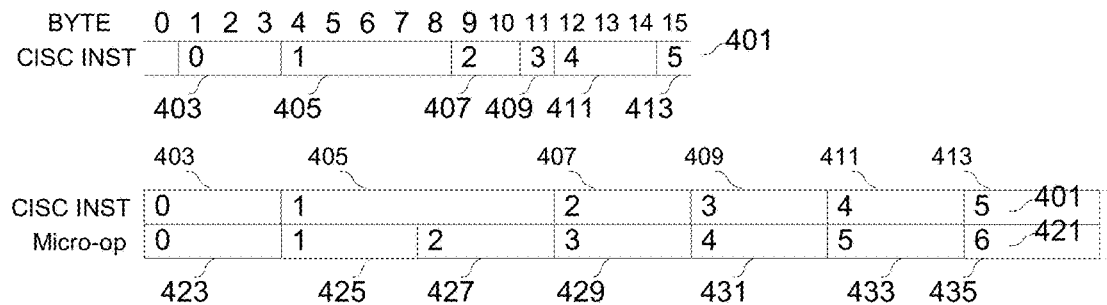
FIG. 4 illustrates a schematic diagram of a corresponding relationship between an instruction block and a micro-operation block consistent with the disclosed embodiments.

When an instruction block is sent to cache system 201, at the beginning, the instruction block is converted into a micro-operation block by converter 109. FIG. 4 illustrates a schematic diagram of an exemplary corresponding relationship between an instruction block and a micro-operation block consistent with the disclosed embodiments. It is assumed that the length of an instruction block is 16 bytes (0-15 byte), and the length of every micro-operation is 4 bytes. As shown in FIG. 4, instruction block 401 includes 6 variable length instructions. As described in the previous embodiments, byte 0 in the instruction block is the last byte in the previous instruction, therefore byte 0 falls within the previous instruction block. That is, the variable length instruction in the current instruction block starts from byte 1 in the instruction block, where instruction 403 occupies 3 bytes (bytes 1, 2 and 3); instruction 405 occupies 5 bytes (bytes 4, 5, 6, 7 and 8); instruction 407 occupies 2 bytes (bytes 9 and 10); instruction 409 occupies 1 byte (byte 11); instruction 411 occupies 3 bytes (bytes 12, 13 and 14); instruction 413 occupies 1 byte; and the rest part is in the next instruction block.

It is assumed that instruction 405 can be converted into 2 micro-operations (that is, micro-operation 425 and micro-operation 427); instruction 403, instruction 407, instruction 409, instruction 411 and instruction 413 can all be converted into 1 micro-operation. That is, instruction 403, instruction 407, instruction 409, instruction 411 and instruction 413 can be converted into micro-operation 423, micro-operation 429, micro-operation 431, micro-operation 433 and micro-operation 435, respectively. The micro-operation block 421 converted by converter 109 contains 7 micro-operations (from micro-operation 0 to micro-operation 7). Therefore, the corresponding row in ending flag memory 205 records the block offset of the last micro-operation (that is, '6').

Figure 5A:
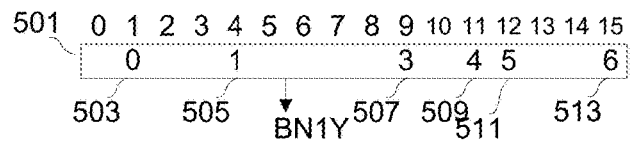
FIG. 5A illustrates an exemplary process for mapping address consistent with the disclosed embodiments.

Mapping module 107 can have different organization forms. FIG. 5A illustrates an exemplary process for mapping address consistent with the disclosed embodiments. As shown in FIG. 5A, there is a one-to-one correspondence between a row in a mapping module and a memory block in a micro-operation memory 103. A received instruction address offset is converted into a micro-operation address offset. An example shown in FIG. 4 is also used here. One row in mapping module 107 corresponds to one row in micro-operation memory 103. The number of entries in every row in mapping module 107 is the same as the number of bytes contained in the instruction block, that is, 16 entries (0~15 entry). Each entry corresponding to the starting address of the instruction stores the block offset of the first micro-operation corresponding to the instruction in micro-operation memory 103.

For example, a starting address of instruction 403 in instruction block 401 is an instruction block offset address '1', and a starting address of the micro-operation 423 corresponding to instruction 403 is the micro-operation block offset address '0'. Therefore, the 1st entry 503 of the corresponding row 501 in mapping module 107 stores the starting address '0' of the micro-operation 423 corresponding to instruction 403.

For another example, a starting address of instruction 405 in instruction block 421 is an instruction block offset address '4', and micro-operation 425 and micro-operation 427 correspond to instruction 405. The first micro-operation is micro-operation 425, and a starting address of the first micro-operation (i.e., micro-operation 425) is a micro-operation block offset address '1'. Therefore, the 4th entry 505 of the corresponding row 501 in mapping module 107 stores the starting address '1' of the first micro-operation (i.e., micro-operation 425) corresponding to instruction 405.

The 9th entry 507 of the corresponding row 501 in mapping module 107 stores the starting address '3' of micro-operation 429 corresponding to instruction 407. The 11th entry 509 of the corresponding row 501 in mapping module 107 stores the starting address '4' of micro-operation 431 corresponding to instruction 409. The 12th entry 511 of the corresponding row 501 in mapping module 107 stores the starting address '5' of micro-operation 433 corresponding to instruction 411. The 15th entry 513 of the corresponding row 501 in mapping module 107 stores the starting address '6' of micro-operation 434 corresponding to instruction 413.

Therefore, based on the instruction address offset outputted by CPU core 211, the position of the first micro-operation corresponding to the instruction in the corresponding row of the micro-operation memory 103 can be directly read out from the corresponding entry in the corresponding row of mapping module 107. In this way, when the branch is taken, CPU core 211 outputs the branch target instruction address, where the instruction block address part is matched in tag memory 105 to obtain BNX, which points to the row of the micro-operation memory 103. Based on the offset address part, the micro-operation offset address BNY can be read out from the row pointed to by the BNX in mapping module 107. Therefore, the first micro-operation corresponding to the branch target instruction can be found from micro-operation memory 103. The subsequent micro-operations can be found according to accumulation of the micro-operation offset address BNY described in the previous embodiments.

Figure 5B:
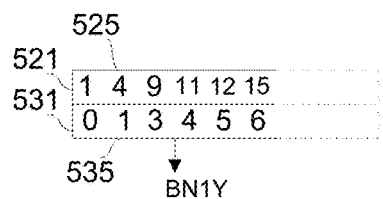
FIG. 5B illustrates another exemplary process for mapping address consistent with the disclosed embodiments.

In addition, the content stored in mapping module 107 can be compressed. The smaller storage capacity can implement the same functionality as shown in FIG. 5A. FIG. 5B illustrates another exemplary process for mapping address consistent with the disclosed embodiments. As shown in FIG. 5B, every two rows in the mapping module 107 constitute a set of mappings relationship, and each set of the mapping relationship corresponds to one row in micro-operation memory 103. Moreover, the number of entries in any one of the two rows in each set of the mapping relationship is the same, and the number of the entries in each row is equal to the number of instructions at most contained in the instruction block. In every set of mapping relationship, the first row stores the block offset of each instruction in the corresponding instruction block in order according to the order of the entries; the second row stores the micro-operation offset address of the first micro-operation corresponding to each instruction in the corresponding instruction block in order according to the order of the entries. Therefore, the corresponding entries in the two rows (that is, the entries in the same column) constitute a corresponding relationship between the instruction block offset and the micro-operation offset address.

For example, row 521 and row 531 constitute a set of mapping relationship. Row 521 includes the instruction block offset, and row 531 includes the micro-operation offset address. The example in FIG. 4 is still used herein. As shown in FIG. 5B, entries from the left to the right in row 521 are '1', '4', '9', '11', '12', and '15' which correspond to the offset addresses in the instruction block containing instruction 403, instruction 405, instruction 407, instruction 409, instruction 411, and instruction 413, respectively. Entries from the left to the right in row 531 are '0', '1', '3', '4', '5', and '6' which correspond to the micro-operation offset addresses in the micro-operation block containing micro-operation 423, micro-operation 425, micro-operation 429, micro-operation 431, micro-operation 433, and micro-operation 435, respectively. The micro-operations are the first micro-operation of each instruction. Therefore, row 521 and row 531 constitute a mapping relationship between instruction block 401 and instruction block 421.

Similarly, based on the instruction address offset outputted by CPU core 211, a matching operation is directly performed in the first row of the corresponding set of the mapping relationship in mapping module 107, and an entry of the second row corresponding to the entry which is successfully matched is outputted as BNY to index the columns in micro-operation memory 103. For, example, when CPU core 211 needs to fetch instruction 405, the block address part in the outputted instruction address is matched by tag memory 105 to obtain BNX. Based on the instruction address offset '4', the BNX is matched in the first row 521 of the mapping relationship corresponding to the BNX, and the first entry 525 is matched successfully. Therefore, the entry 535 '1' of the second row corresponding to the entry 525 is outputted as BNY. The BNX and BNY are used to index the micro-operation memory 103, such that the instruction needed by the CPU core is read out. Other operations are the same as the corresponding operations shown in FIG. 5A, which are not repeated herein.

Figure 5C:
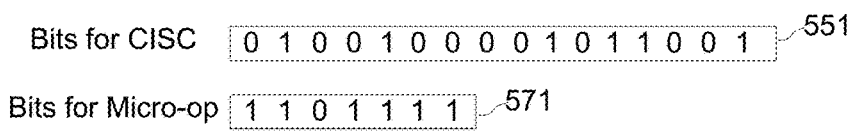
FIG. 5C illustrates another exemplary process for mapping address consistent with the disclosed embodiments.

In addition, mapping module 107 can be further compressed. FIG. 5C illustrates another exemplary process for mapping address consistent with the disclosed embodiments. The present embodiment is similar to the embodiment shown in FIG. 5B. Two rows (e.g., row 551 and row 571) constitute a set of mapping relationship that corresponds to a row in micro-operation memory 103. The difference is that in FIG. 5C, every entry in the first row of each set of mapping relationship (e.g., row 551) corresponds to an instruction block offset. That is, the number of entries is the same as the number of bytes contained in the instruction block. Therefore, there are 16 entries in row 551. Every entry only stores one bit data (that is, '0' or '1'), where '0' represents that the instruction block offset corresponding to the entry is not a starting position of an instruction, and '1' represents that the instruction block offset corresponding to the entry is a starting position of an instruction.

Every entry in the second row (e.g., row 571) of each set of mapping relationship corresponds to a micro-operation block offset, that is, the number of entries is the same as the number of micro-operations at most contained in the micro-operation block. Every entry also stores one bit data (that is, '0' or '1'), where '0' represents that the micro-operation corresponding to the entry is not the first micro-operation of the corresponding instruction, and '1' represents that the micro-operation corresponding to the entry is the first micro-operation of the corresponding instruction.

Through counting respectively the number of '1' in row 551 and row 571, the instruction block offset can be converted to the micro-operation block offset. Specifically, when an instruction block offset is sent from the CPU core, the number of '1' in row 551 is counted starting from the most left entry to the right until the entry corresponding to the instruction block offset is reached. At this time, a counting number of instruction entries can be obtained. Then, the number of '1' in row 571 is counted starting from the most left entry to the right until the counting number reaches the counting number of instruction entries. The last entry that participates in the counting corresponds to the BNY of the first micro-operation in micro-operation memory 103 corresponding to the instruction that corresponds to the instruction block offset.

For example, when CPU core 211 needs to fetch instruction 407, that is, the instruction block offset sent from CPU core 211 is '9', the '1' in row 551 is counted starting from the most left entry to the 9th entry. Because the values in the 1st entry, the 4th entry and the 9th entry are '1', the counting number of the obtained instruction entries is '3'. Then, the '1' in row 571 is counted starting from the most left entry until the counting number reaches '3'. Because the value of No. 0 entry, the 1st entry and the 3rd entry are '1', when counting the 3rd entry, the counting number reaches '3', indicating that the micro-operation corresponding to the 3rd entry is the first micro-operation corresponding to the instruction 407, that is, BNY is equal to 3.

Of course, for the mapping relationship, the counting can be started from the most right to the left, and a similar result can be obtained, which are not repeated herein. In addition, for the mapping relationship, the address can be mapped by using the summation method. As shown in FIG. 5C, the counting number can be set as '0' at the beginning. The counting is started from the most left entry of row 551 until the entry is pointed to by the instruction block offset, and the values of the entries are accumulated to obtain the counting number. Then, starting from the most left entry of row 571, the value of the entry is subtracted from the counting number until the counting number equals to '0' again. At this time, the micro-operation corresponding to the entry that is reached in row 571 is the micro-operation corresponding to the instruction.

Returning to FIG. 2, when an instruction block is sent to instruction cache system 201, according to the method described in FIG. 4, converter 109 converts the instruction block to a micro-operation block, and the compensated branch offset is calculated for every branch instruction in the instruction block. The micro-operation and the compensated branch offset are stored in the memory block determined by the replacement algorithm (such as a LRU algorithm) in micro-operation memory 103, and the instruction block address of the instruction block is stored into the corresponding row in tag memory 105. Meanwhile, a mapping relationship between the instruction and the micro-operations generated by the converter 109 is stored in the corresponding row in the mapping module 107, and the micro-operation address corresponding to the last micro-operation is stored in the ending flag memory 205. At this point, the process for converting an instruction block into the micro-operations and storing the micro-operations in the instruction cache system 210 is completed.

When CPU core 211 does not execute a branch micro-operation, or CPU core 211 executes the branch micro-operation but the branch is not taken, if the micro-operation pointed to by the current BNY is not the last micro-operation in the current micro-operation block, the original instruction block address outputted via bus 221 and selected by selector 207 is sent to tag memory 105 to perform a matching operation to obtain BNX. Based on the BNX and the BNY that is added by 1 outputted by CPU core 211 selected by selector 213, the corresponding micro-operation is read out from micro-operation memory 103 for CPU core 211 execution.

If the micro-operation pointed to by the current BNY is the last micro-operation in the current micro-operation block, according to the previous method, the next instruction block address outputted via bus 221 and selected by selector 207 is sent to tag memory 105 to perform a matching operation. At this time, if the matching operation is successful, it indicates that the micro-operation block corresponding to the next instruction block is stored in the micro-operation memory 103. The '0' outputted by CPU core 211 selected by selector 213 is used as BNY. The corresponding micro-operation is read out from the memory block pointed to by the obtained BNX in micro-operation memory 103 for CPU core 211 execution. If the matching operation is unsuccessful, it indicates that the micro-operation block corresponding to the next instruction block is not stored in the micro-operation memory 103. At this time, the instruction block address is outputted to the lower level memory. When the instruction block is fetched, according to the previous method, after the instruction block is converted into the micro-operation block, the converted micro-operation block is stored into the memory block pointed to by the BNX determined by the replacement algorithm in micro-operation memory 103, and the corresponding content is filled into the row pointed to by the BNX in tag memory 105, mapping module 107 and ending flag memory 205. At the same time, the '0' outputted by CPU core 211 selected by selector 213 is used as BNY. The corresponding micro-operation is read out from the micro-operation block for CPU core 211 execution.

When CPU core 211 executes a branch instruction and the branch is taken, if the micro-operation pointed to by the current BNY is not the last micro-operation in the current micro-operation block, according to the previous method, the branch target instruction block address and the branch target instruction block offset is calculated. Selector 207 selects the branch target instruction block address outputted by CPU core 211 via the bus, and the branch target instruction block address is sent to tag memory 105 to perform a matching operation. If the matching operation is successful, it indicates that the micro-operation block corresponding to the branch target instruction block is stored in the micro-operation memory 103. BNX corresponding to the entry that is matched successfully points to the position of the micro-operation block corresponding to the branch target instruction in micro-operation memory 103, the position of the corresponding mapping information in mapping module 107, and the position of the ending tag information in ending tag memory 205. Then, the branch instruction block offset outputted by CPU core 211 is sent to mapping module 107. Based on the mapping relationship included in the row pointed to by the BNX, the branch instruction block offset is converted to the micro-operation offset address. The converted micro-operation offset address selected by selector 213 is used as BNY. Based on the BNX and BNY, the first micro-operation corresponding to the branch target instruction is read out from the micro-operation memory 103 for CPU core 211 execution.

If the matching operation is unsuccessful, it indicates that the micro-operation block corresponding to the branch target instruction block is not stored in the micro-operation memory 103. At this time, the branch target instruction block address is outputted to the lower level memory. When the branch target instruction block is fetched, according to the previous method, the branch target instruction block is converted into the micro-operation block, and the converted micro-operation block is stored into the memory block pointed to by the BNX determined by the replacement algorithm in micro-operation memory 103. The corresponding content is filled into the row pointed to by the BNX in tag memory 105, mapping module 107 and ending flag memory 205. Then, the branch instruction block offset outputted by CPU core 211 is sent to mapping module 107. Based on the mapping relationship included in the row pointed to by the BNX, the branch instruction block offset is converted to the micro-operation offset address. The converted micro-operation offset address selected by selector 213 is used as BNY. The corresponding micro-operation is read out from the micro-operation block for CPU core 211 execution.

Although a direct addressing mode is used to calculate a branch target address herein, an indirect addressing mode can also be used. When an indirect addressing mode is used, at the beginning, a register value (e.g., a base address register value) needs to be determined, thus calculating the branch target address. In this case, after CPU core 211 calculates the branch target address (for example, an arithmetic unit in CPU core 211 is used to calculate the branch target address), the subsequent operations are completed according to the above method, which are not repeated herein.

The processor system can also be improved by creating a relationship between the micro-operations in the track table, so that before CPU core 211 executes the branch micro-operation, the branch target instruction address can be calculated in advance. The branch target instruction address is mapped to the branch target micro-operation address, and the micro-operation block containing the branch target micro-operation is prefetched. The process for mapping the branch target instruction address to the branch target micro-operation address is not in the critical path that the CPU core fetches the branch instruction target micro-operation, hiding the partial or all waiting time caused by micro-operation cache miss when the branch is taken.

FIG. 6 illustrates a structure schematic diagram of an exemplary processor system based on a track table consistent with the disclosed embodiments. As shown in FIG. 6, the processor system includes an active list 604, a scan converter 608, a track table 610, a tracker 614, a mapping module 107, a micro-operation memory 606, a micro-operation read buffer 607 and a CPU core 611. It is understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

The capacity of micro-operation read buffer 607 is smaller than the capacity of micro-operation memory 606 and the access delay of micro-operation read buffer 607 is shorter. Micro-operation memory 606 and micro-operation read buffer 607 may include any appropriate memory devices. Without limiting, micro-operation memory 606 may act as a cache for the system or a level one cache if other caches exist, and may be separated into a plurality of memory segments called blocks (e.g., memory blocks) for storing micro-operations corresponding to the instructions to be accessed by CPU core 611.

The instruction block read from the lower level memory is converted into the micro-operation block by scan converter 608. The converted micro-operation block may be filled into micro-operation memory 606. Then, based on specific execution, the corresponding micro-operation block is filled from the micro-operation memory 606 to micro-operation read buffer 607 for CPU core 611. As used herein, the term "fill" means to move instructions (or micro-operations) from a lower level memory (e.g., an external memory) to a higher level memory in advance before the CPU executes an instruction, and the term "memory access" means that CPU core 611 reads instructions from the memory (i.e., micro-operation read buffer 607).

There is a one-to-one correspondence between an entry in the active list 604 and a memory block in the micro-operation memory 606. Each entry in the active list 604 stores one instruction block address which is called block number (BNX), indicating that the micro-operation block corresponding to the instruction block address is stored in the corresponding memory block in the micro-operation memory 606. As used herein, the BNX refers to the location of the memory block in the micro-operation memory 606. The instruction block address of the branch target instruction examined and calculated by the scan converter 608 matches with the instruction block address stored in the active list 604 to determine whether the micro-operation block corresponding to the branch target instruction is stored in the micro-operation memory 606. If the micro-operation block corresponding to the instruction block containing the branch target instruction is not yet filled into the micro-operation memory 606, after the instruction block obtained from the lower level memory is converted to the micro-operation block by the scan converter 608, the micro-operation block is filled into the micro-operation memory 606 and a matching pair with the corresponding instruction block address and BNX is created in the active list 604.

The scan converter 608 may examine and convert every instruction filled into the micro-operation memory 606 from the lower level memory and extract certain information, such as instruction (or micro-operation) type, source instruction (or micro-operation) address, and branch offset of the branch instruction, etc. Then, a branch target address is calculated based on the extracted information. For example, an instruction (or micro-operation) type may include unconditional branch instruction (or micro-operation), conditional branch instruction (or micro-operation), other instructions (or micro-operations), etc. The instruction (or micro-operation) type may also include subcategories of the conditional branch instruction (or micro-operation), such as branch on equal instruction (or micro-operation), branch on greater instruction (or micro-operation). Under certain circumstances, unconditional branch instruction (or micro-operation) may be considered as a special case of conditional branch instruction (or micro-operation), with the condition forced to be true. In addition, other information may also be included.

The scan converter 608 is configured to examine and convert the instruction block sent from the lower level memory. The instruction block may be examined at first and then be converted. The instruction block may be converted at first and then be examined. The instruction block may also be examined and converted at the same time. The examining operation refers to decoding the instruction or micro-operation converted from the instruction to recognize the type of the instruction or the micro-operation. The examining principle includes recognizing the branch source instruction or the branch source micro-operation (including condition branch and unconditional branch), calculating and matching, and mapping branch target micro-operation address (constituted by branch target micro-operation block number BNX and block offset BNY). The branch target micro-operation address is stored into an entry pointed out by the branch source micro-operation address in the track table.

The conversion function of scan converter 608 is similar to the conversion function of converter 109 in FIG. 1. The scan converter 608 is also configured to convert the instructions from different instruction sets to instructions in one instruction set. For example, scan converter 608 includes a conversion function (that is, the input instruction in the instruction set B can be converted to the corresponding instruction in the instruction set A). Therefore, the processor may support the instruction set A and the instruction set B at the same time. When the instruction set A is executed, scan converter 608 only executes an examining function and a conversion function from the instructions to the micro-operations but does not execute the instruction set conversion function. When the instruction set B is executed, scan converter 608 not only executes the examining function and the conversion function from the instructions to the micro-operations but also executes the instruction set conversion function. Or when the instruction set B is executed, scan converter 608 may directly convert the instructions in instruction set B to the micro-operations corresponding to the instructions in instruction set A.

The track table 610 contains a plurality of track points. A track point is a single entry in the track table containing information of at least one micro-operation, such as information about micro-operation type, branch target instruction (or micro-operation) address, etc. As used herein, a track table address of a track point corresponds to a micro-operation address of the micro-operation represented by the track point. The track point of a branch micro-operation includes the track table address of the branch target micro-operation, and the track table address corresponds to the branch target micro-operation address. A plurality of continuous track points corresponding to a micro-operation block containing a series of continuous micro-operations in the micro-operation memory 606 is called a track. The micro-operation block and the corresponding track are indexed by the same block number (i.e., BNX). The track table includes at least one track. The total number of track points in a track may equal to the total number of entries in one row of the track table 610. Other configurations may also be used in the track table 610.

The position information of a track point (a micro-operation) in the track table may be represented by the block number (BNX) and the offset address (BNY), where BNX represents a block number of a micro-operation corresponding to the track point, and BNY represents the address offset of the track point (the corresponding micro-operation) in the track (memory block). A track point in the track table corresponds to a pair of BNX and BNY. That is, based on a pair of BNX and BNY, the corresponding track point in the track table may be found. Accordingly, scan converter 608 may extract relevant information in the instruction block and store the relevant information into an entry pointed to by BNY in the track pointed to by BNX corresponding to these micro-operations in track table 610. If the type of the entry (track point) represents a branch micro-operation, based on BNX (target block number) contained in the content, the track of the branch target can be determined. According to BNY (offset address), a particular point (entry) in the target track can be determined. In this way, the branch track point in the track table is an entry of the branch micro-operation that the track point address represented a branch source micro-operation address and the content of the entry represented branch target micro-operation address. The branch target micro-operation address can be obtained by mapping the instruction address, where the instruction address is obtained by a block address containing the branch source micro-operation (equal to the corresponding branch source instruction block address) plus the branch instruction block offset, and plus the branch offset converting the branch target instruction to the target micro-operation. That is, a branch target instruction address=a branch micro-operation block address+a branch instruction block offset+a branch offset. Mapping module 107 maps the branch target instruction address to obtain the branch target micro-operation address.

The upper bit portion 624 (i.e., instruction block address) of the obtained branch target instruction address 622 is sent to active list 604 and is performed a matching operation with the content of active list 604 to obtain the branch target micro-operation block number 634 (BNX) of the track point corresponding to the branch target micro-operation. The low bit portion 626 (i.e., branch target instruction block offset) is sent to mapping module 107 to obtain a branch target micro-operation block offset 636 (BNY) by performing a mapping operation. The BNX and the BNY are stored in an entry representing a branch source in the track table. The branch target micro-operation block number 634 and the branch target micro-operation block offset 636 together are written into the entry pointed by the branch source micro-operation address in the track table as the branch target micro-operation address 632 (BN). The branch source micro-operation address is constituted by block number of the branch source micro-operation (BNX) and the branch source micro-operation block offset (BNY). For example, when scan converter 608 finds that there is a branch instruction starting from byte 3 during the process of examining and converting an instruction block (instruction address is 1200) to be stored in a micro-operation block (the micro-operation block number BNX is 29) of micro-operation memory 606, the branch offset is 67 bytes. Therefore, the branch target instruction address 622 is 1200+67=1267, where upper bit portion 624 (the value is 1260) is sent to active list 604 to perform a matching operation and the obtained branch target block number 634 (BNX) is 81; low bit portion 634 (the value is 7 indicating that 7th byte in the instruction block) is sent to mapping module 107 to perform a mapping operation with the mapping value of row 81 and the obtained corresponding micro-operation block offset 636 is 2 (that is, the 2nd micro-operation in the micro-operation block). Therefore, the branch target micro-operation address 632 is 81-2. When scan converter 608 converts the branch source address starting from byte 3, the corresponding micro-operation obtained by the conversion operation is written into the No. 0 micro-operation (byte 1 and byte 2 are the ending part of the starting instruction in the previous instruction block, so the branch instruction starting from No. 3 byte is the first instruction in the current instruction block). Therefore, the micro-operation address of the branch micro-operation corresponding to the branch instruction is the No. 0 micro-operation in the 29th micro-operation block, that is, 29-0. The scan converter 608 writes the branch target micro-operation address 632 (the value is 81-2) into an entry 29-0 (that is, the No. 0 entry of the 29th track) of track table 610 under the control of micro-operation address bus 620. In addition, scan converter 608 also controls to store the 3rd instruction byte and the No. 0 micro-operation block offset into the row 29 of mapping module 107, for mapping when examining other instructions later. After the process for examining and converting the instruction block is completed, the corresponding ending tag is stored in the corresponding row in ending tag memory 205.

As shown in FIG. 1, 3 mapping steps need to be performed when the branch micro-operation converted from the branch instruction takes a branch, which include the mapping of the branch source micro-operation block offset, the mapping of the middle micro-operation block address and the mapping of the branch target micro-operation block offset. As used herein, because the storage format of the micro-operation block is that one micro-operation block corresponds to one original instruction block, the mapping of the middle micro-operation block address is not needed. In the present embodiments, the mapping of the branch source micro-operation block offset is also not needed, because the original instruction block offset rather than the branch source micro-operation block offset is used when calculating the branch target. When the instruction is converted into the micro-operation, the remaining mapping operation of the branch target micro-operation block address is performed. The content stored in track table 610 is the branch target micro-operation block address after all mapping operations are completed. When CPU core is about to take a branch, the branch target micro-operation address stored in track table 610 is used to perform a direct addressing operation on instruction cache 606 to obtain the branch target micro-operation for CPU core execution, without the need of any mapping and calculating.

When the examined instruction is a branch instruction, the branch target instruction address is calculated. The block address part in the branch target instruction address is sent to active list 604 to perform a matching operation. If the matching operation is successful, the block number (BNX) of the micro-operation block containing the micro-operation corresponding to the branch target instruction is obtained. Based on a mapping relationship stored in the row pointed to by the BNX in mapping module 107, the micro-operation offset address BNY of the branch target micro-operation corresponding to the branch target instruction is obtained.

The BNX and BNY are written into the branch point corresponding to the branch micro-operation in the track table. If the matching is unsuccessful, the branch target instruction address is directly stored in the branch point corresponding to the branch micro-operation.

The micro-operation read buffer 607 stores at least one micro-operation block including the current micro-operation block. Each row in the micro-operation read buffer 607 and each micro-operation block in the micro-operation memory 606 may include the same number or the less number of micro-operations. If the number of the micro-operations in each row of the micro-operation read buffer 607 is the same as the number of the micro-operations in each micro-operation block of the micro-operation memory 606 (that is, one micro-operation row is equal to one micro-operation block), the row in the micro-operation read buffer 607 may be represented by the corresponding micro-operation block number (i.e. BNX). If the number of the micro-operations in each row in the micro-operation read buffer 607 is less than the number of the micro-operations in each micro-operation block in the micro-operation memory 606 (that is, multiple micro-operation rows are equal to one micro-operation block), each row in the micro-operation read buffer 607 may be represented by less significant bit that is one bit lower than least significant bit (LSB) of the corresponding BNX plus at least one address bit. This address bit indicates the position of the row in the micro-operation block, that is, the row offset address in the same micro-operation block. For example, a micro-operation block of BNX '111' includes two rows in the micro-operation read buffer 607, where the number corresponding to the micro-operation row that occupies a lower bit portion of the address is '1110', and the number corresponding to the micro-operation row that occupies an upper bit portion of the address is '1111'.

For illustration purpose, assuming that the number of the micro-operations of each row in the micro-operation read buffer 607 is the same as the number of the micro-operations of each micro-operation block in the micro-operation memory 606.

Based on the micro-operation currently executed by CPU core 611, the micro-operation read buffer 607 may provide micro-operations for CPU core 611 execution in advance before the CPU core executes the micro-operations.

There is a one-to-one correspondence between every track in the track table 610 and every memory block in the micro-operation memory 606. Both the track in the track table 610 and the corresponding memory block in the micro-operation memory 606 are pointed to by a same pointer. Any micro-operation corresponding to the instruction to be executed by CPU core 611 can be filled into the micro-operation memory 606 and micro-operation read buffer 607 before execution. In order to create a relationship between one track in the track table 610 and the next track to be executed in order, an ending track point is created after the track point representing the last micro-operation in every track. The ending track point stores BNX of the next track (micro-operation block) to be executed in order. If multiple micro-operation blocks can be stored in the micro-operation memory 606, the next sequential micro-operation block to be executed by CPU core 611 may be also fetched to the micro-operation memory 606 and the micro-operation read buffer 607 for CPU core 611 execution when the current micro-operation block is executed. The address of the instruction block corresponding to the next micro-operation block is obtained by adding the length of an instruction block address to the instruction block address corresponding to the current micro-operation block. The instruction address corresponding to the next micro-operation block is sent to active list 604 to perform a matching operation to obtain BNX of the micro-operation block corresponding to the instruction block address in the micro-operation memory 103. At the same time, the obtained BNX of the micro-operation block is stored into the ending track point in the current track.

For the ending track point, the address of the instruction block corresponding to the next micro-operation block is obtained by adding the length of the instruction block to the instruction block address. Then, BNX of the next micro-operation block is determined by performing a matching operation following the same method. For the ending track point, BNY of the next track point is always '0'.

When a new track is created, the new track may be placed at an available row of track table 610. If the new track includes a branch point (corresponding to a branch micro-operation), a branch point may be created at an entry of the row. The positions of the row and the entry of the branch point in track table 610 can be determined based on the branch micro-operation address. For example, the row may be determined based on the address of the instruction block corresponding to the branch micro-operation address, and the entry of the row may be determined based on the micro-operation block offset of the branch micro-operation address.

Further, each entry or track point in the row in the track table may have a content format including a type field, a first address (an XADDR) field, and a second address (a YADDR) field. Each entry or track point in the row in the track table may also have another content format including a type field, and a branch target instruction address field. Type field may indicate the type of the micro-operation corresponding to the track point. As previously explained, the type of the micro-operation may include conditional branch micro-operation, unconditional branch micro-operation, and other micro-operations. XADDR field may be called a first-dimension address or simply a first address. YADDR field may be called a second-dimension address or simply a second address.

Further, the content of the new track point may correspond to the branch target micro-operation. In other words, the content of the branch track point stores the branch target micro-operation address information. For example, a block number BNX of a particular row in track table 610 corresponding to a branch target micro-operation is stored as the first address in the content of the branch point. In addition, the offset BNY of the branch target micro-operation within its own micro-operation block is then stored as the second address in the content of the branch point. Based on the instruction block address corresponding to the branch micro-operation address and the branch offset, the micro-operation block offset BNY can be obtained by calculation and conversion in mapping module 107.

The ending point of every track in the track table is marked as a particular track point. The content of the particular track point may include type information that the branch must be taken, and position information of the next track including the next micro-operation to be executed in order. Because the next micro-operation corresponds to the first track point of the next track, the content of the particular track point may only include a content format including a type field and a first address (an XADDR) field, or a constant (such as '0') in addition to a type field and a first address (an XADDR) field.

The processor system can implement the above operations by ending flag memory 205. However, based on the ending track point in track table 610, the last micro-operation in the corresponding micro-operation block may be determined. Therefore, the ending flag memory 205 may be omitted.

Figure 7A:
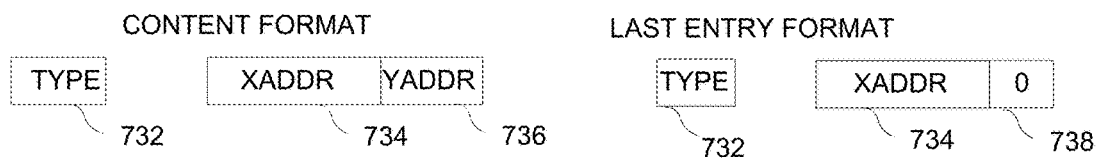
FIG. 7A illustrates a format of an exemplary track point consistent with the disclosed embodiments.

FIG. 7A illustrates a format of an exemplary track point consistent with the disclosed embodiments. As shown in FIG. 7A, the format of a non-ending track point may include a micro-operation type 732, a first address 734 and a second address 736. The micro-operation type of at least two track points in one track may be read out at the same time. Therefore, the micro-operation types of all non-ending track points in the track may be stored together, while the first addresses and the second addresses of these non-ending track points may be stored together. The ending track point may only have a content format including a micro-operation type 732, a first address 734, and a constant 738 with a value '0'. Similarly, micro-operation type 732 of the ending track point and micro-operation types of non-ending track points may also be stored together, while the first address 734 and the constant 738 may be stored following the first address and the second address of all non-ending track points of the track. Further, the second address of the ending track point is the constant 738 with a value '0'; therefore, the constant may not be stored. The second address '0' is produced directly when tracker 614 points to the ending track point.

Figure 7B:
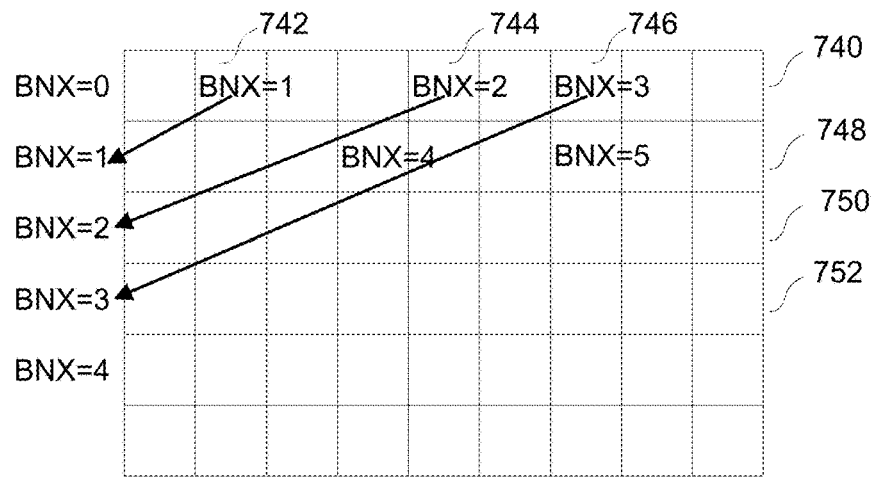
FIG. 7B illustrates an exemplary method for creating new tracks using a track table consistent with the disclosed embodiments.

FIG. 7B illustrates an exemplary method for creating new tracks using a track table consistent with the disclosed embodiments. As shown in FIG. 7B, an existing track 740 (denoted as BNX0) may include three branch points 742, 744 and 746 corresponding to three branch micro-operations. When examining branch point 742, a new track 748 (a next available row denoted as BNX1) is created to store a target micro-operation of branch point 742, and the track number or the row number (i.e., BNX1) in track table 610 is recorded in branch point 742 as the first address. Similarly, when examining branch point 744, another new track 350 (denoted as BNX2) is created in track table 610 and the track number is recorded in branch point 744; when examining branch point 746, another new track 752 (denoted as BNX3) is created in track table 610 and the track number is recorded in branch point 746. Therefore, new tracks corresponding to all branch points in a single track may be created.

As used herein, the second address stored in the track point of each branch micro-operation is an offset of the micro-operation block containing the branch target micro-operation of the branch micro-operation.

The above described various embodiments use a direct addressing mode to calculate the address of the branch target instruction (micro-operation) and implement a prefetching operation for an instruction block (micro-operation block). However, an indirect addressing mode may also be used. When using the indirect addressing mode, at the beginning, the register value (e.g., a base register value) needs to be determined, such that the branch target instruction address can be calculated. The register value is changed based on the result of instruction execution. Therefore, for an indirect addressing branch micro-operation, when a new value is calculated by the instruction for last updating the base register value but the value is not written to the base register, the new value may be obtained by a bypass path to perform the target address calculation and subsequent operations.

Figure 7C:
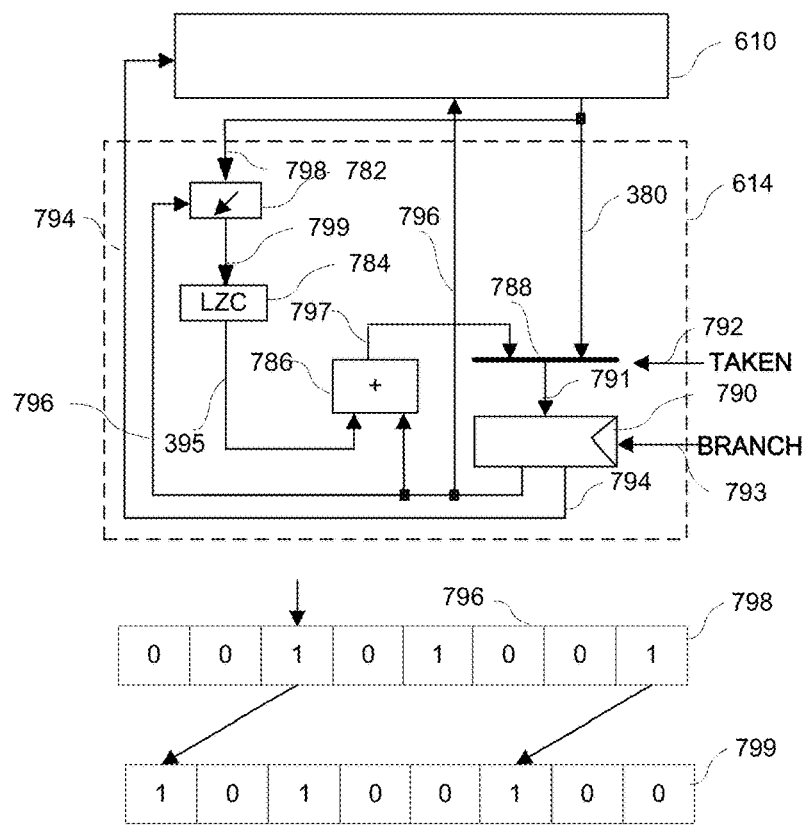
FIG. 7C illustrates an exemplary movement of a read pointer of a tracker consistent with the disclosed embodiments.

FIG. 7C illustrates an exemplary movement of a read pointer of a tracker consistent with the disclosed embodiments. As shown in FIG. 7C, the read pointer of the tracker skips the non-branch micro-operations in the track table, and moves on to the next branch point of the track table to wait for a branch decision result determined by CPU core 611. The parts or components without relevance may be omitted in the present embodiment in FIG. 7C. In the present embodiment, assuming that the micro-operation type and other micro-operation information stored in the track table 610 are arranged from left to right based on the micro-operation block offset from small to large. That is, when these micro-operations are executed in order, the accessing order of the micro-operation information and the corresponding micro-operation type are from left to right. It is also assumed that the instruction type '0' in the track table 610 indicates that the corresponding micro-operation in the track table 610 is a non-branch instruction micro-operation, and the instruction type '1' in the track table 610 indicates that the corresponding micro-operation in the track table 210 is a branch micro-operation.

The entry representing the micro-operation pointed to by a second address 796 (a block offset, BNY) in a track pointed to by a first address 794 (block number, BNX) in the track table 610 may be read out at any time. A plurality of entries, even all entries on behalf of micro-operation type in a track pointed to by the first address 794 in the track table 610 may be read out at any time.

On the right of the entry of the micro-operation with the largest micro-operation address in each row of the track table 610, an ending entry is added to store the address of the next micro-operation to be executed in order. The micro-operation type of the ending entry is always set to '1'. The first address of the micro-operation information in the ending entry is a block number corresponding to the next micro-operation. The second address (BNY) is always set to zero and points to the first entry of the track containing the next micro-operation. The ending entry is defined equivalent as an unconditional branch micro-operation. When the tracker points to an ending entry, an internal control signal is always generated to make selector 788 to select the output 780 of the track table 610, and another internal control signal is also generated to update the value of register 790. The internal signal may be triggered by the special bit in the ending entry of the track table 610 or the ending entry pointed to by the second address 796.

In FIG. 7C, the tracker 614 mainly includes a shifter 782, a leading zero counter 784, an adder 786, a selector 788 and a register 790. A plurality of micro-operation types 798 representing a plurality of instructions read out from the track table 610 are shifted to the left by shifter 782. The shifting bits are determined by the second address pointer 796 outputted by the register 790. The most left bit of the shifted micro-operation type 799 outputted by the shifter 782 is a step bit. The signal of the step bit and BRANCH signal from CPU core 611 together determine the update of the register 790. The selector 788 is controlled by the signal TAKEN. The output 791 of the selector is the next address, which includes the first address portion and the second address portion. When TAKEN is '1' (a branch is taken successfully), the selector 788 selects output 780 of the track table 610 (including the first address and the second address of the branch target micro-operation) as the output 791. When TAKEN is '0' (a branch is not taken successfully), the selector 788 selects the current first address 794 as the first address portion of the output 791 and the output 797 of the adder as the second address portion of the output 791. Micro-operation type 799 is sent to the leading zero counter 784 to calculate the number of '0' micro-operation type (representing the corresponding micro-operation is a non-branch micro-operation) before the next '1' micro-operation type (representing the corresponding micro-operation is a branch micro-operation). The number of '0' micro-operation type is calculated as a (one) '0' regardless of the step bit is a '0' or '1'. The number 795 (step number) of the leading '0' is sent to the adder 786 to be added with the second address 796 outputted by the register 790 to obtain the next branch micro-operation address 797. It should be noted that the next branch micro-operation address is the second address of the next branch micro-operation of the current micro-operation, and non-branch micro-operations before the next branch micro-operation address are skipped by the tracker 614.

When the second address 796 points to an entry representing a micro-operation, the shifter controlled by the second address shifts a plurality of the micro-operation types outputted by the track table 610 to the left. At this moment, the micro-operation type representing the micro-operation read out by the track table 610 is shifted to the most left step bit of the micro-operation type 799. The shifted micro-operation type 799 is sent into the leading zero counter to count the number of the micro-operations before the next branch micro-operation. The output 795 of the leading zero counter 784 is a forward step length of the tracker. The step length is added to the second address 796 by the adder 786. The result of the addition operation is the next branch micro-operation address 797.

When the step bit signal of the shifted micro-operation type 799 is '0', which indicates that the entry of the track table 610 pointed to by the second address 796 is a non-branch micro-operation, the step bit signal controls the update of the register 790. The selector 788 selects the next branch micro-operation address 797 as the second address 796 under the control of TAKEN signal 792 '0' and the first address 794 remains unchanged. The new first and second address point to the next branch micro-operation in the same track, and non-branch micro-operations before the branch micro-operation are all skipped. The new second address controls the shifter 796 to shift the micro-operation type 798, and the micro-operation type bit representing the branch micro-operation is placed in the step bit of micro-operation type 799 for the next operation.

When the step bit signal of the shifted micro-operation type 799 is '1', it indicates that the entry in the track table 610 pointed to by the second address represents a branch micro-operation. The step bit signal does not affect the update of the register 790, while BRANCH signal 793 from CPU core 611 controls the update of the register 790. The output 797 of the adder is the next branch micro-operation address of the current branch micro-operation in the same track, and the output 780 of the memory is the branch target micro-operation address of the current branch micro-operation.

When the BRANCH signal is '1', the output 791 of the selector 788 updates the register 790. If TAKEN signal 792 from the CPU core is '0', it indicates that CPU core 611 determines to execute operations in order at this branch point. The selector 788 selects the next branch micro-operation address 797. The first address 794 outputted by the register 790 remains unchanged, and the next branch micro-operation address 797 becomes a new second address 796. The new first address and the new second address point to the next branch micro-operation in the same track. The new second address controls the shifter 796 to shift the micro-operation type 798, and the micro-operation type bit representing the branch micro-operation is placed in the step bit of micro-operation type 799 for the next operation.

If the TAKEN signal 792 from CPU core 611 is '1', it indicates that CPU core 611 determines to jump to the branch target micro-operation at this branch point. The selector 788 selects the branch target micro-operation address 780 read out from the track table 610 to become the first address 794 outputted by the register 790 and the second address 795. At this time, the BRANCH signal 793 controls the register 790 to latch the first address and the second address as the new first address and the new second address, respectively. The new first address and the new second address may point to the branch target micro-operation addresses that are not in the same track. The new second address controls the shifter 796 to shift the micro-operation type 798, and the micro-operation type representing the branch micro-operation is placed in the step bit of micro-operation type 799 for the next operation.

When the second address points to the ending entry of the track table (the entry of the next row), as previously described, the internal control signal controls the selector 788 to select the output 780 of the track table 610, and update the register 790. At this time, the new first address 794 is the first address of the next track recorded in the ending entry of the track table 610, and the second address is zero.

The second address controls the shifter 796 to shift the micro-operation type 798 by zero bit for starting to perform the next operation. The operation is performed repeatedly. Therefore, the tracker 614 may work together with the track table 610 to skip the non-branch micro-operations in the track table and always point to the branch micro-operation.

Returning to FIG. 6, when read pointer 631 of tracker 614 points to a branch point, the content of the branch point is read out via bus 652. If the branch point stores the branch target micro-operation address BNX and BNY, BNX of the branch target micro-operation in the content of the branch point is used to index micro-operation memory 606 to read out the micro-operation block containing the branch target micro-operation. The micro-operation block containing the branch target micro-operation can be filled into micro-operation read buffer 607, providing the corresponding branch target instruction to CPU core 611 after the branch is taken. Specifically, BNX and BNY on bus 652 are sent to micro-operation read buffer 607 to perform a matching operation. If the matching operation is successful, it indicates that micro-operation read buffer 607 stores the micro-operation block of the branch target instruction. If the matching operation is unsuccessful, micro-operation read buffer 607 sends the BNX address to micro-operation memory 606 via bus 660 to read out the corresponding micro-operation block. The read out micro-operation block is stored into micro-operation read buffer 607 via bus 692. At the same time, the BNX address is also sent to ending flag memory 205 via bus 661 to read out the ending flag of the instruction block. The read out ending flag of the instruction block is sent to micro-operation read buffer 607. The read out ending flag and the corresponding micro-operation block together are stored into micro-operation read buffer 607.

If the branch point stores the branch target instruction address, the branch target instruction address is sent out via bus 652. The block address part is sent to active list 604 to perform a matching operation via bus 654. If the matching operation is successful, BNX of the micro-operation block containing the micro-operation corresponding to the branch target instruction is obtained. Based on a mapping relationship stored in the row pointed to by the BNX in mapping module 107, the micro-operation offset address BNY of the branch target micro-operation corresponding to the branch target instruction is obtained. The BNX and BNY are written into the branch point via bus 632 to replace the previously stored branch target instruction address. At the same time, the BNX is used to index micro-operation memory 606 to read out the micro-operation block containing the branch target micro-operation. The micro-operation block containing the branch target micro-operation can be filled into micro-operation read buffer 607, providing the corresponding branch target instruction to CPU core 611 after the branch is taken.

If the matching operation is unsuccessful, the branch target instruction address is sent to the lower level memory to obtain a corresponding instruction block. At the same time, the replacement logic of active list 604 allocates a block number (BNX) to the instruction block. The upper bit (that is, instruction block address) of the instruction address is stored into the entry pointed to by the BNX in active list 604. After the fetched instruction block is converted into the micro-operation block by the scan converter, the converted micro-operation block via bus 691 is filled into the memory block pointed to by the BNX in micro-operation memory 103, and an address mapping relationship generated during converting process is stored in the row pointed to by the BNX in mapping module 107. At the same time, the micro-operation offset address BNY of the branch target micro-operation corresponding to the branch target instruction is obtained by the mapping relationship. The BNX and the BNY are written into the corresponding entry in the track table via bus 632 to replace the branch target instruction address that is matched unsuccessfully. The BNX is used to index micro-operation memory 606 to read out the micro-operation block containing the branch target micro-operation. The micro-operation block containing the branch target micro-operation can be filled into micro-operation read buffer 607, providing the corresponding branch target instruction to CPU core 611 after the branch is taken.

Track table 610 also sends the content of the ending track point of the next sequential micro-operation block of the currently executed micro-operation block via bus 658. If the ending track point stores the branch target micro-operation address BNX and BNY, BNX and BNY are sent to micro-operation read buffer 607 to perform a matching operation. If the matching operation is successful, it indicates that the next micro-operation block is stored in micro-operation read buffer 607, and there is no need to perform the subsequent operations. If the matching operation is unsuccessful, micro-operation read buffer 607 sends the BNX address to micro-operation memory 606 via bus 660 to read out the corresponding micro-operation block. The read out micro-operation block is stored into micro-operation read buffer 607 via bus 692. At the same time, the address is sent to ending flag memory 205 via bus 661 to read out the ending flag of the instruction block. The read out ending flag of the instruction block is also sent to micro-operation read buffer 607. The read out ending flag and the corresponding micro-operation block together are stored into micro-operation read buffer 607.

If the branch point stores the instruction block address, the instruction block address is sent out via bus 658. The instruction block address is sent to active list 604 to perform a matching operation via bus 654. If the matching operation is successful, BNX of the next micro-operation block is obtained. The BNX is written into the ending track point via bus 632 to replace the previously stored instruction block address. At the same time, the BNX is used to index micro-operation memory 606 to read out the micro-operation block containing the branch target micro-operation. The micro-operation block containing the branch target micro-operation can be filled into micro-operation read buffer 607, providing the corresponding branch target instruction to CPU core 611 after the branch is taken.

If the matching operation is unsuccessful, the instruction block address is sent to the lower level memory to obtain the corresponding instruction block. At the same time, the replacement logic of active list 604 allocates a block number (BNX) to the instruction block. The upper bit (that is, instruction block address) of the instruction address is stored into the entry pointed to by the BNX in active list 604. After the fetched instruction block is converted into the micro-operation block by scan converter 109, the converted micro-operation block via bus 691 is filled into the memory block pointed to by the BNX in micro-operation memory 103, and an address mapping relationship generated during the converting process is stored in the row pointed to by the BNX in mapping module 107. At the same time, the micro-operation offset address BNY of the branch target micro-operation corresponding to the branch target instruction is obtained by the mapping relationship. The BNX is written into the entry of the corresponding ending track point in the track table via bus 632 to replace the instruction block address that is matched unsuccessfully. The BNX is used to index micro-operation memory 606 to read out the next micro-operation block. The micro-operation block can be filled into micro-operation read buffer 607, providing the next micro-operation block to CPU core 611 after the last micro-operation in the current micro-operation block is executed.

When CPU core 611 executes the branch micro-operation pointed to by tracker 614, if the branch micro-operation does not take a branch, TAKEN signal 320 sent by CPU core 611 is '0'. Read pointer 631 of tracker 614 points to the first branch point following the branch micro-operation or the ending track point in the track when there is no branch point in the track points following the branch micro-operation. When TAKEN signal 320 is '0', the token in micro-operation read buffer 607 is continued to be passed to the token transmitter corresponding to the sequential micro-operation following the branch micro-operation, providing the sequential micro-operation following the branch micro-operation in a program sequence to CPU core 611.

When CPU core 611 executes the branch micro-operation pointed to by tracker 614, if the branch micro-operation takes a branch successfully, TAKEN signal 320 sent by CPU core 611 is '1'. Under the control of TAKEN signal 320 ('1'), micro-operation read buffered 607 clears all token transmitters, and the branch target micro-operation address BNX and BNY stored in the branch source entry sent via bus 652 are decoded. The token is passed into the token transmitter corresponding to the branch target micro-operation, providing the branch target micro-operation and the sequential micro-operation following the branch target micro-operation in a program sequence to CPU core 611. At this point, the branch target micro-operation block is stored in micro-operation read buffer 607 via the above process for matching the branch target with the address memory in micro-operation read buffer 607. Under the control of TAKEN signal 320 ('1'), tracker 614 selects the branch target micro-operation address BNX and BNY stored in the branch source entry sent via bus 652 to latch into tracker 614 to become a new tracker address pointer 631, such that the pointer 631 points to the track point corresponding to the branch target micro-operation in the track table. Then, the read pointer of tracker 614 moves on to the first branch point following the branch target micro-operation in the track corresponding to the branch target micro-operation block (the new current micro-operation block) or the ending track point in the track when there is no branch point in the track points following the branch target micro-operation.

If tracker 614 points to the ending track point in the track, the read pointer of tracker 614 updates the position content value in the last track point (that is, the read pointer of tracker 614 points to the first track point of the next track), thus pointing to the new current micro-operation block). When the token in micro-operation read buffer 607 reaches a token transmitter indicated by the ending flag in one micro-operation block, the token is passed to the bus of the next micro-operation block, controlling the corresponding micro-operation via bus 693 to send the corresponding micro-operation to CPU core 611 for execution. If no any branch is successfully taken, the token is passed in order. At the same time, the read pointer of tracker 614 moves on to the first branch point in the track corresponding to the new current micro-operation block or the ending track point in the track when there is no branch point in the track. The above process is repeated. Thus, before CPU core 611 executes the micro-operation, the micro-operation is filled into micro-operation memory 606 and micro-operation read buffer 607, such that the time delay is the shortest when CPU core 611 fetches the micro-operation, improving the performance of CPU core 611.

As used herein, when the entries in the active list 604 are full and a new block address/row number matching pair needs to be created, the active list 604 needs to be replaced. That is, an existing block address/row number matching pair in the active list 604 is replaced by the new block address/row number matching pair; the corresponding micro-operation block in the micro-operation memory 106 is replaced by the new micro-operation block. The content of each branch point in the track table 610 includes the block number of the branch target track point (i.e., the first address) and the offset address (i.e., the second address). If a matching pair and the corresponding micro-operation memory block in the active list 604 corresponding to the block number of the branch target track point stored in the track table 610 are replaced, the block number remains unchanged, but the stored content represented by the block number has been changed. Thus, the track point points to the wrong micro-operation block. An extra correlation table may be added to record whether each matching pair of the active list 604 is used as the information about branch target of the track point in the track table. Based on the information recorded in the correlation table, the active list (or micro-operation memory) only replaces a track that is not used as a branch target as a new track.

Figure 8:
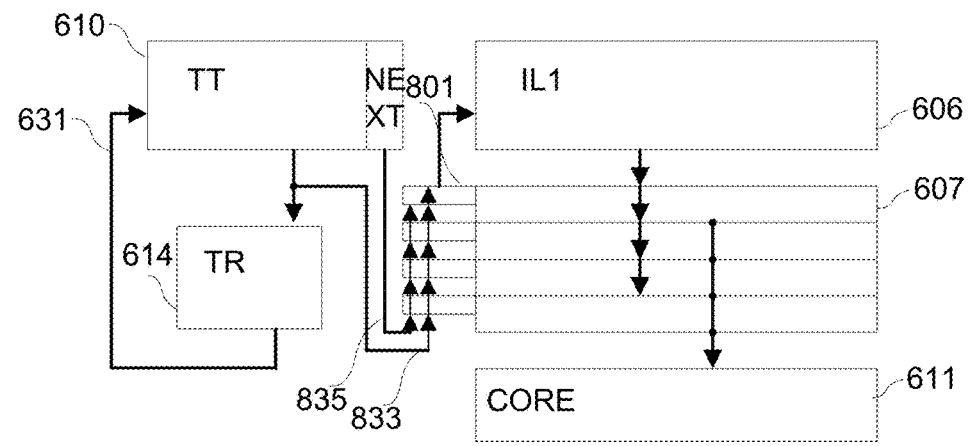
FIG. 8 illustrates a schematic diagram of an exemplary process for filling a micro-operation read buffer and providing directly micro-operations to be executed for a CPU core by the micro-operation read buffer consistent with the disclosed embodiments.

FIG. 8 illustrates a schematic diagram of an exemplary process for filling a micro-operation read buffer and providing directly micro-operations to be executed for a CPU core by the micro-operation read buffer consistent with the disclosed embodiments. As shown in FIG. 8, the environment includes a track table 610, a tracker 614, a micro-operation memory 606, a micro-operation read buffer 607, a control unit 801 corresponding to the micro-operation read buffer 607 and CPU core 611. It is understood that the various components are listed for illustrative purposes, other components may be included and certain components may be combined or omitted.

In FIG. 8, read pointer 631 of tracker 614 moves along the track corresponding to the current micro-operation block in track table 610 and stops at the first branch point following the track point corresponding to the current micro-operation. The content 833 of the track point is read out and sent to control unit 801. At the same time, the content (i.e., the address 835 of the first track point of the track corresponding to the next micro-operation block) of the ending track point read out from the current track is also sent to control unit 801.

Control unit 801 stores the block address corresponding to the micro-operation stored in every row in the micro-operation read buffer 607. In the present embodiment, every row in the micro-operation read buffer 607 stores a micro-operation block of micro-operation memory 606, and the content of the branch point pointed to by read pointer 631 of tracker 614 is BNX and BNY. That is, the branch target micro-operation block stored in the micro-operation read buffer 607 is used as an example. When the content of the branch point is a branch target instruction address, based on the previous method, the branch target instruction block is obtained from the lower level memory. The obtained branch target instruction block is converted and filled into micro-operation memory 606, and the content of the branch point is updated to BNX and BNY, which are not repeated herein.

Control unit 801 matches the received address of the branch target track point with the first address (BNX) in the address of the first track point on the next track. If the branch target track point BNX matches successfully with BNX of the next track, it indicates that the corresponding micro-operation block is stored in micro-operation read buffer 607; otherwise, the corresponding BNX needs to be sent to the micro-operation memory 606 to read out the corresponding micro-operation block, and the corresponding micro-operation block is filled into an available row in micro-operation read buffer 607. The replacement algorithm for determining the available row in micro-operation read buffer 607 can refer to replacement algorithm for determining the available row used in the active list 604, which is not repeated herein.

Figure 9:
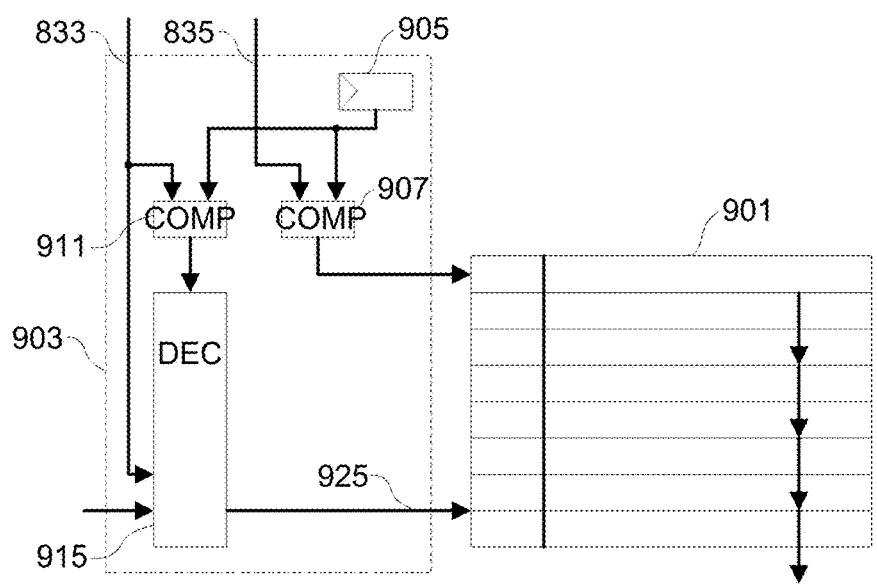
FIG. 9 illustrates a schematic diagram of an exemplary control unit performing a matching operation consistent with the disclosed embodiments.

Further, according to the second address (BNY) in the branch target track point address, the corresponding branch target micro-operation may be found in micro-operation read buffer 607. FIG. 9 illustrates an exemplary control unit performing a matching operation consistent with the disclosed embodiments. For illustration purposes, FIG. 9 shows a micro-operation block 901 in the micro-operation read buffer 607 and a sub logic 903 in control unit 801 corresponding to the micro-operation block. The micro-operation block 901 is constituted by 8 micro-operations. The 8 micro-operations correspond to each entry in the micro-operation block 901 from top to bottom according to an ascending order of micro-operation addresses. Sub logic 903 in control unit 801 includes a first address memory 905, a comparator 907, a comparator 911, and a target decoder 915. The first address memory 905 stores block number (BNX) corresponding to micro-operation block 901. The comparator 907 matches BNX of the next micro-operation block received from bus 835 with BNX in the first address memory 905. If the matching operation is successful, a matching successful signal outputted by comparator 907 points to the first micro-operation of micro-operation block 901 (that is, a topmost micro-operation in FIG. 9). It indicates that micro-operation block 901 is a next micro-operation block of a currently executed micro-operation block, and the micro-operation pointed to is the next micro-operation needed by CPU core 611 after the current micro-operation block is executed. If the matching operation is unsuccessful, a signal outputted by comparator 907 is invalid. That is, the micro-operation block 901 is not the next micro-operation block of the current micro-operation block.

Comparator 911 matches BNX of the branch target micro-operation received from bus 833 with BNX in the first address memory 905. If the matching operation is successful, it indicates that micro-operation block 901 is a micro-operation block containing the branch target micro-operation. A matching successful signal outputted by comparator 911 as an enable signal is sent to target decoder 915. The enable signal controls target decoder 915 to decode BNY of the branch target micro-operation received from bus 833. According to the decoding result 925, a micro-operation (i.e., the branch target micro-operation) in the micro-operation block 901 is pointed to. If the matching operation is unsuccessful, it indicates that the micro-operation block 901 is not a micro-operation block containing the branch target micro-operation. Therefore, an enable signal is not outputted to target decoder 915, preventing target decoder 915 from performing a decoding operation.

Returning to FIG. 8, when read pointer 631 of tracker 614 points to a new track, at the beginning, the content of ending track point 835 of the track is read out and sent to control unit 801 to perform a matching operation. If the matching operation is unsuccessful, it indicates that the next micro-operation block corresponding to the track is not stored in the micro-operation read buffer 607. Therefore, control unit 801 sends the BNX of the next micro-operation block to the micro-operation memory 606 to read out the corresponding micro-operation block. The corresponding micro-operation block is filled into the micro-operation read buffer 607. A position of the next micro-operation block in the micro-operation read buffer 607 can be determined at the same time. If the matching operation is successful, it indicates that the next micro-operation block corresponding to the track is stored in the micro-operation read buffer 607. Therefore, the position of the next micro-operation blocking the micro-operation read buffer 607 can be directly determined.

According the above described method, the read pointer 631 of tracker 614 moves on in advance and stops at the first branch point following the track point corresponding to the current micro-operation, and reads out the BNX and BNY of the branch target track point from the track table 610. At this point, the BNX and BNY of the branch target track point are sent to control unit 801 to perform a matching operation according to the method described in FIG. 9. If the matching operation is unsuccessful, it indicates that the micro-operation block containing the branch target micro-operation is not stored in the micro-operation read buffer 607. Therefore, control unit 801 sends the BNX (i.e., BNX of the micro-operation block containing the branch target micro-operation) of the branch target track point to the micro-operation memory 606 to read out the corresponding micro-operation block. The corresponding micro-operation block is filled into the micro-operation read buffer 607. The position of the branch target micro-operation in the micro-operation read buffer 607 can be determined.

If the matching operation is successful, it indicates that the micro-operation block containing the branch target micro-operation is stored in the micro-operation read buffer 607. Therefore, the position of the branch target micro-operation in the micro-operation read buffer 607 can be directly determined.

Thus, by performing the matching operation in the control unit 801, the first micro-operation of the next micro-operation block and the branch target micro-operation can be found in the micro-operation read buffer 607.

The clock received by control unit 801 is formed by combining a system clock with executive conditions of pipelines of CPU core 611. That is, in any one system clock cycle, if CPU core 611 needs to read a micro-operation, the control unit 801 receives a valid clock signal. If CPU core 611 does not need to read a new micro-operation temporally because of the suspended pipeline and other reasons, the control unit 801 does not receive the clock signal. Thus, the clock signal indicates whether CPU core 611 needs to obtain micro-operations at present. Therefore, control unit 801 can provide a micro-operation to CPU core 611 in each valid clock cycle according to the clock signal. Specifically, control unit 801 stores a token signal. The token signal corresponds to the micro-operation in the micro-operation read buffer 607 currently outputted to CPU core 611. That is, the micro-operation corresponding to the token signal is a current micro-operation needed by CPU core 611. Control unit 801 passes the token signal in every valid clock cycle. Thus, the token signal is transmitted and corresponded to the micro-operation needed by CPU core 611 for the next time. Therefore, according to the position of the token signal, control unit 801 controls micro-operation read buffer 607 to output the correct micro-operation to CPU core 611 in advance.

It should be noted that the above process is only an example that control unit 801 provides a micro-operation to CPU core 611 in advance according to the needs. Other appropriate handshake signals or communication protocols can be taken to ensure that control unit 801 provides the micro-operation to CPU core 611 in advance before the CPU core executes the micro-operations according to the needs. Various alternations, modifications, or equivalents to the technical solutions of the disclosed embodiments can be obvious to those skilled in the art and can be included in this disclosure.

Figure 10:
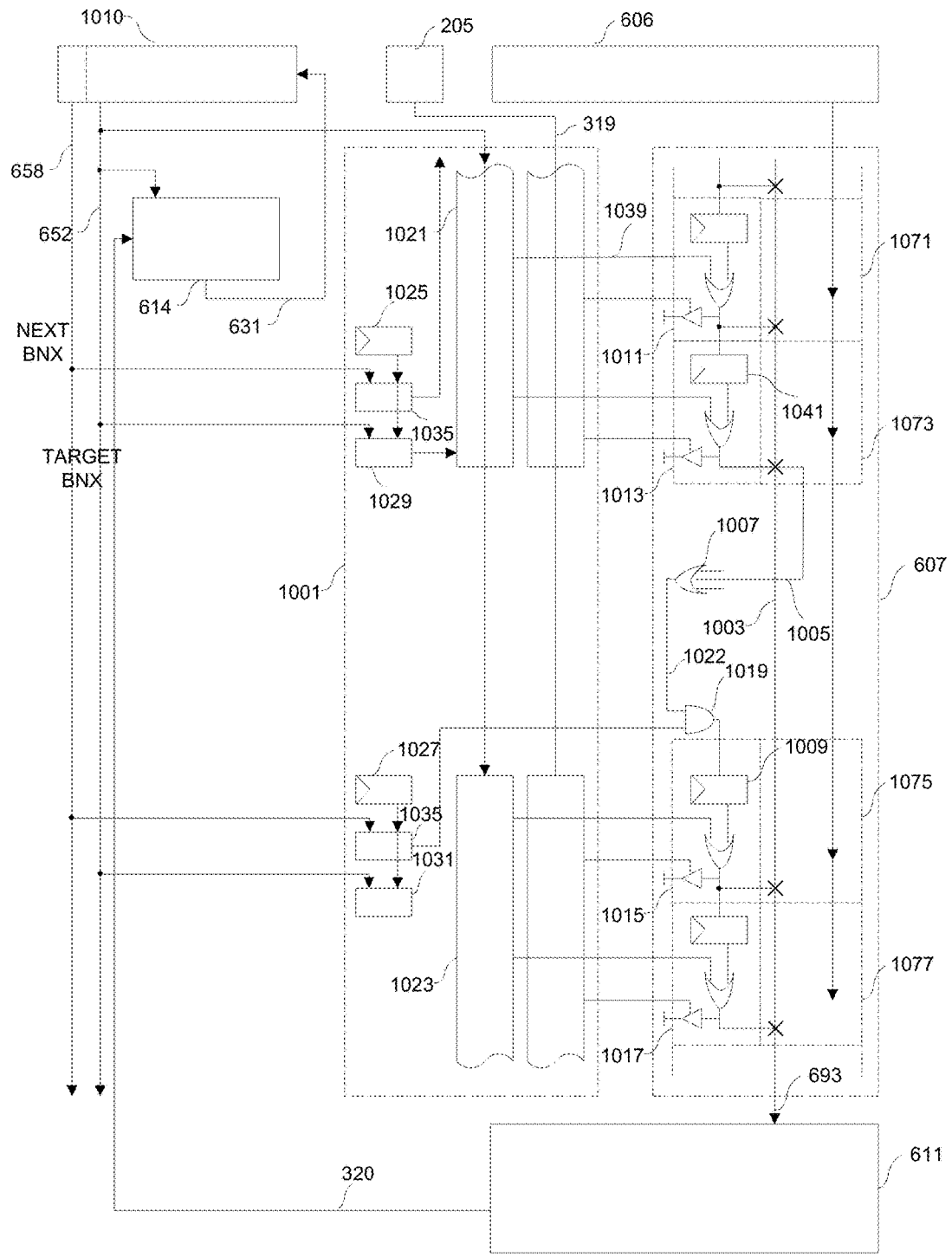
FIG. 10 illustrates a schematic diagram of an exemplary process for passing a token signal consistent with the disclosed embodiments.

FIG. 10 illustrates a schematic diagram of an exemplary process for passing a token signal consistent with the disclosed embodiments. As shown in FIG. 10, the environment includes a track table 1010, a tracker 614, a micro-operation memory 606, a micro-operation read buffer 607 containing the token transmitters, and a control unit 1001. It is understood that the various components are listed for illustrative purposes, other components may be included and certain components may be combined or omitted. Token transmitter 1011, token transmitter 1013, token transmitter 1015, and token transmitter 1017 correspond to micro-operation 1071, micro-operation 1073, micro-operation 1075, and micro-operation 1077, respectively. Micro-operation memory 606 and tracker 614 shown in FIG. 10 are the same as micro-operation memory 606 and tracker 614 in the previous embodiments.

In one embodiment, the input of the token signal register in the first token transmitter corresponding to each micro-operation block is from an AND gate. One input of the AND gate is from global bus 1022, and another input of the AND gate is from the output of next BNX comparator corresponding to the micro-operation block.

When the branch is not taken, the token transmitters in micro-operation read buffer 607 continue to pass the token signal in order, providing the instruction corresponding to the token transmitter containing the token signal to CPU core 611 for execution. Thus, CPU core 611 executes the micro-operations in order.

When the token signal is passed from the last token transmitter corresponding to the current micro-operation block to the first token transmitter corresponding to the next micro-operation block, it is assumed that micro-operation 1073 is the last micro-operation in the current micro-operation block and micro-operation 1075 is the first micro-operation in the next micro-operation block in FIG. 10. When the token signal is in token transmitter 1013 corresponding to micro-operation 1073, the token signal controls micro-operation 1073 to be outputted from bus 1003. Meanwhile, the token signal is outputted from bus 1005 to OR logic 1007. Other inputs of OR logic 1007 are from the last token transmitters corresponding to other micro-operation blocks in micro-operation read buffer 607. That is, the number of micro-operation blocks in micro-operation read buffer 607 and the number of inputs of OR logic 1007 are equal and have one-to-one correspondence. Thus, after the token signal is passed to the last token transmitter corresponding to any micro-operation block, the token signal is passed to OR logic 1007 as the output of OR logic 1007.

Further, the output of OR logic 1007 is sent to the first token transmitter corresponding to every micro-operation block in the micro-operation read buffer 607, such as token transmitter 1015. The other input of the first token transmitter corresponding to every micro-operation block is from the comparator that is used to determine the next micro-operation block corresponding to the micro-operation block (e.g., comparator 1033 and comparator 1035). The BNX read out from the ending track point of the current track in the track table 1010 is sent to all next BNX comparators in the control unit 1001 to match with the BNX of the corresponding micro-operation blocks. Because the token transmitter 1015 corresponds to the first micro-operation of the next micro-operation block, only the next BNX comparator 1035 among all the next BNX comparators in control unit 1001 outputs a result indicating that the matching operation is successful (that is, '1'), and other next BNX comparators output a result indicating that the matching operation is unsuccessful (that is, '0'). Thus, AND gate 1019 before token transmitter 1015 outputs '1'. The output '1' is written into token signal register 1009, and the values of the token signal registers in all other token transmitters are '0'. The token signal can be correctly passed to the token transmitter corresponding to the first micro-operation in the next micro-operation block, such that correct instructions are outputted continuously to CPU core 611 for execution.

On the other hand, when the branch is taken and the token signal needs to be passed from the token transmitter corresponding to the current micro-operation to the token transmitter corresponding to the branch target micro-operation, it is assumed that token transmitter 1017 is the token transmitter containing the token signal when the branch is taken and micro-operation 1073 is the corresponding branch target micro-operation. When CPU core 611 generates a TAKEN signal 320 indicating that the branch is taken, the TAKEN signal 320 is sent to the reset ports of all token signal registers to clear all token signals. At the same time, the branch target track point BNX read out from the track table 1010 is also sent to all target BNX comparators to perform a matching operation. As used herein, because micro-operation 1073 is the corresponding branch target micro-operation when the branch is taken, only the comparison result of the target BNX comparator 1029 corresponding to this micro-operation block is '1', controlling target decoder 1021 to decode the BNY of the branch target track point. Based on the decoding result, the output 1039 of target decoder 1021 is '1'. The token signal visor gate is written into the token signal register 1041, providing the branch target micro-operation 1073 for CPU core 611 via bus 1003 in the next clock cycle.

Returning to FIG. 6, when an instruction block is obtained from the lower level memory, scan converter 608 examines the instruction block and extracts the relative information from the instruction block. For the direct branch instruction, the branch target instruction address is obtained by the sum of the instruction block address, the instruction block offset and the branch offset. Meanwhile, the instruction block is converted to the micro-operation block. Accordingly, based on the BNX determined by the replacement algorithm, the micro-operation block is filled into the memory block pointed to by the BNX in micro-operation memory 606. The block address is filled into the row pointed to by the BNX in active list 604. The corresponding mapping relationship is stored in the row pointed to by the BNX in mapping module 107.

The block address part in the branch target instruction address is sent to active list 604 to perform a matching operation. If the matching operation is successful, the BNX is obtained. Based on a mapping relationship stored in the row pointed to by the BNX in mapping module 107, the block offset of the branch target instruction address is converted to the micro-operation offset address BNY. The BNX and BNY are stored into the branch point corresponding to the branch micro-operation in the track table 610. If the matching operation is unsuccessful, the branch target instruction address is directly stored in the branch point corresponding to the micro-operation. The process is repeated until the whole instruction block is examined, extracted, converted and filled.

Micro-operation read buffer 607 outputs the micro-operations to CPU core 611 for execution according to the above described method. Read pointer 631 of tracker 614 moves on in advance to the branch point in track table 610 corresponding to the first branch micro-operation following the micro-operation currently executed by CPU core 611 in a program sequence and reads out the content of the branch point. At the same time, read pointer 631 of tracker 614 reads out the content of the ending track point.

When the content of the branch point read out from track table 610 includes BNX and BNY, the BNX is sent to every control unit in micro-operation read buffer 607 to perform a matching operation. If the matching operation is successful, a target decoder in the control unit that matches successfully decodes the BNY. Thus, the branch target micro-operation can be found in micro-operation read buffer 607. If the matching operation is unsuccessful, based on the BNX, the corresponding micro-operation block is read out from micro-operation memory 606. The read out micro-operation is filled into the memory block determined by the replacement algorithm in micro-operation read buffer 607. At the same time, the target decoder in the control unit corresponding to the memory block decodes the BNY. Thus, the branch target micro-operation can be found in micro-operation read buffer 607.

When the content of the branch point read out from track table 610 includes the branch target instruction address, the block address part in the branch target instruction address is sent to active list 604 to perform a matching operation. If the matching operation is successful, the obtained BNX is sent to every control unit in micro-operation read buffer 607 to perform a matching operation. If the matching operation is successful, the target decoder in the control unit that matches successfully decodes the BNY. Thus, the branch target micro-operation can be found in micro-operation read buffer 607. The process is the same as the previous description, which are not repeated herein.

If the matching operation is unsuccessful, the instruction block corresponding to the branch target micro-operation is read out from the lower level memory according to the previous method. The instruction block corresponding to the branch target micro-operation is converted, examined, and filled accordingly. Thus, the BNX and BNY corresponding to the branch target micro-operation are obtained. At the same time, the obtained corresponding micro-operation block is filled into the memory block determined by the replacement algorithm in micro-operation read buffer 607. The target decoder in the control unit corresponding to the memory block decodes the BNY. Thus, the branch target micro-operation can be found in micro-operation read buffer 607.

Accordingly, based on the different content of the ending track point read out from track table 610, the similar operations are performed. The process is similar to the process for processing the branch point. The difference is that for the ending track point, BNY corresponding to the content in the ending track point is always '0'. Therefore, the needed micro-operation can be found in the micro-operation block pointed to by the BNX without the need of decoding BNY.

Thus, before CPU core 611 executes the branch micro-operation, the branch target micro-operation of the branch micro-operation can be found in micro-operation read buffer 607. Similarly, before CPU core 611 executes the last micro-operation in the micro-operation block, the next sequential micro-operation of the last micro-operation can be found in micro-operation read buffer 607.

When the token signal is passed to a branch micro-operation, the branch micro-operation is sent to CPU core 611 in advance. Then, the token signal is passed in order, and the corresponding micro-operations are sent to CPU core 611 for execution until CPU core 611 executes the branch micro-operation and generates a result. If the result shows that the branch is not taken, the transmission of the token signal is continued and the corresponding micro-operation is sent to CPU core 611 for execution. In tracker 614, under the control of TAKEN signal 792, selector 788 selects the output of the adder 786. Under the control of BRANCH signal 793, the output of the adder 786 is stored in the register 790 to update the read pointer 794, making the read pointer 794 to point to the next branch point. The subsequent operations are the same as the operations previously described.

If the execution result shows that the branch is taken, CPU core 611 clears the execution results or the intermediate results of the executed micro-operations following the branch micro-operation. At the same time, according to the previously described method, the token signal is passed to the token transmitter corresponding to the target micro-operation, and the target micro-operation and the subsequent micro-operations are sent to CPU core 611 for execution. In the tracker 614, under the control of TAKEN signal 792, selector 788 selects the output of the track table 610. Under the control of BRANCH signal 793, the output of the track table 610 is stored in the register 790 to update the read pointer 794, making the read pointer 794 to point to the track point corresponding to the branch target micro-operation. Therefore, the BNX of the new next track and the BNX and BNY of the next branch point are all read out and sent to the micro-operation read buffer 607, such that the corresponding next micro-operation block and the branch target micro-operation block can be found in the micro-operation read buffer 607. The subsequent operations are the same as the operations previously described.

Optionally, the micro-operation read buffer 607 may only provide the next micro-operation block, while the branch target micro-operation block is provided by the micro-operation memory 606. In this case, the BNX of the branch target micro-operation is sent to the micro-operation memory 606 to index micro-operation memory 606 and find the branch target micro-operation block. Based on the BNY of the branch target micro-operation, the branch target micro-operation is found in the branch target micro-operation block for CPU core 611 execution. At this time, if the branch is not taken, read pointer 794 of tracker 614 points to the next branch point to read out BNX and BNY of the branch target micro-operation. Based on the same method, the corresponding branch target micro-operation block is found in micro-operation memory 606, and the branch target micro-operation is provided for CPU core 611 execution. If the branch is taken successfully, the branch target micro-operation block is filled into the micro-operation read buffer 607, and the token signal is passed into the token transmitter corresponding to the branch target micro-operation in the micro-operation read buffer 607. Also, the branch target micro-operation is sent to CPU core 611 for execution. The subsequent operations are the same as the operations previously described.

With the execution of CPU core 611, if there is no branch point among the remaining track points in the current track, read pointer 794 of tracker 614 points to the ending track point. The content (i.e., BNX and '0' of the next track) of the ending track point is used as the value of read pointer 794, making read pointer 794 point to the next track. Then, according to the previously described method, read pointer 794 moves on and points to the first branch point in the track.

When the token signal reaches the token transmitter corresponding to the last micro-operation of the current micro-operation block and the corresponding micro-operation is outputted, the token signal is passed to the token transmitter corresponding to the first micro-operation of the next micro-operation block. Then, the process for outputting the corresponding micro-operation and passing the token signal is continued until read pointer 794 of tracker 614 points to the first branch point.

Other kind of processor systems can be formed by combining some components in the above processor system to achieve the same functionality.

Figure 11:
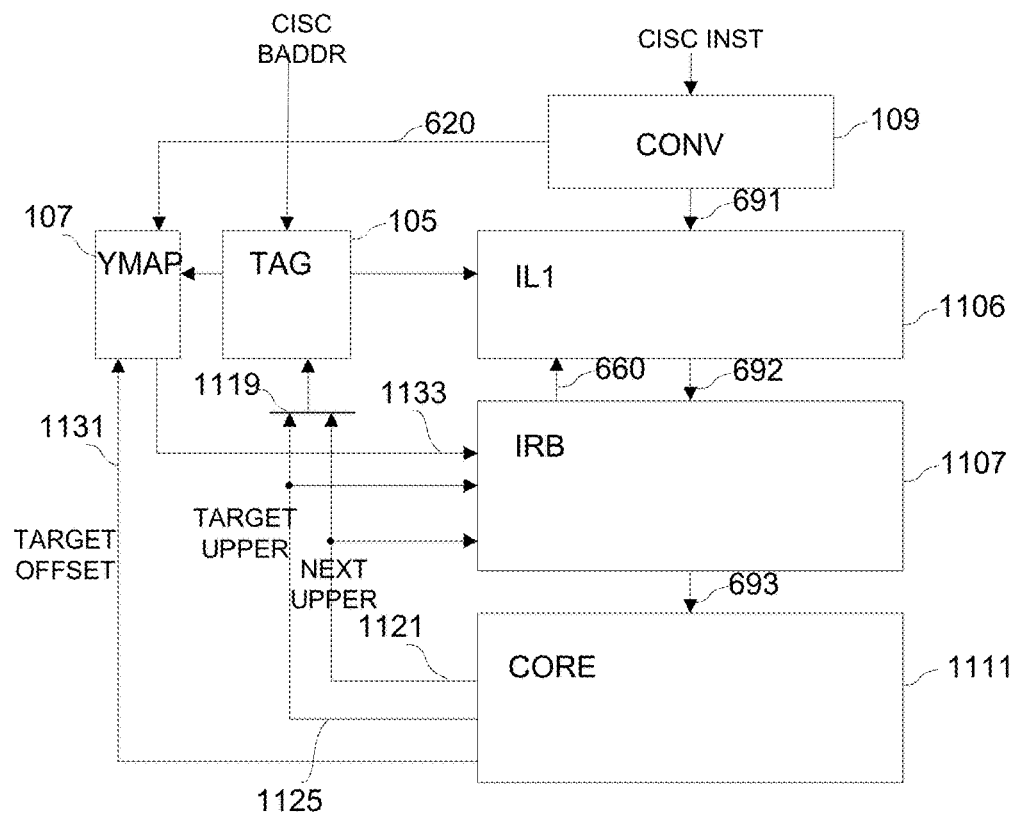
FIG. 11 illustrates a structure schematic diagram of an exemplary processor system consistent with the disclosed embodiments.

FIG. 11 illustrates a structure schematic diagram of an exemplary processor system consistent with the disclosed embodiments. As shown in FIG. 11, the processor system may include a tag memory 105, a mapping module 107, a converter 109, a micro-operation memory 1106, a micro-operation read buffer 1107 and a CPU core 1111. The functions of tag memory 105 and mapping module 107 in FIG. 11 are the same as the functions of tag memory 105 and mapping module 107 in FIG. 2. It is understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

The structures and functions of micro-operation memory 1106 and micro-operation read buffer 1107 in FIG. 11 are the same as the structures and functions of micro-operation memory 606 and micro-operation read buffer 607 in FIG. 2. The difference is that there is a one-to-one correspondence between every row in the tag memory 105 and every row in the micro-operation memory 1106. The corresponding micro-operation block in micro-operation memory 1106 can be found based on BNX that matches successfully with the block address in tag memory 105 by the method described in FIG. 2. The content stored in the register in the control unit in micro-operation read buffer 1107 is not the BNX corresponding to the micro-operation block but the instruction block address of the micro-operation block. In addition, an ending flag representing the last micro-operation in the micro-operation block is stored in the last micro-operation corresponding to every micro-operation block in micro-operation memory 1106 and the token transmitter corresponding to the last micro-operation in every micro-operation block in micro-operation read buffer 1107. Thus, when the token signal is passed to the last micro-operation in the micro-operation block, micro-operation read buffer 1107 not only outputs the corresponding micro-operation to CPU core 1111 for execution, but also outputs the ending flag to update the instruction block address.

In addition, for the branch micro-operation, the content stored in micro-operation read buffer 1107 is not the corresponding branch offset but the compensated branch offset. The compensated branch offset can be obtained by the previous method.

Figure 12:
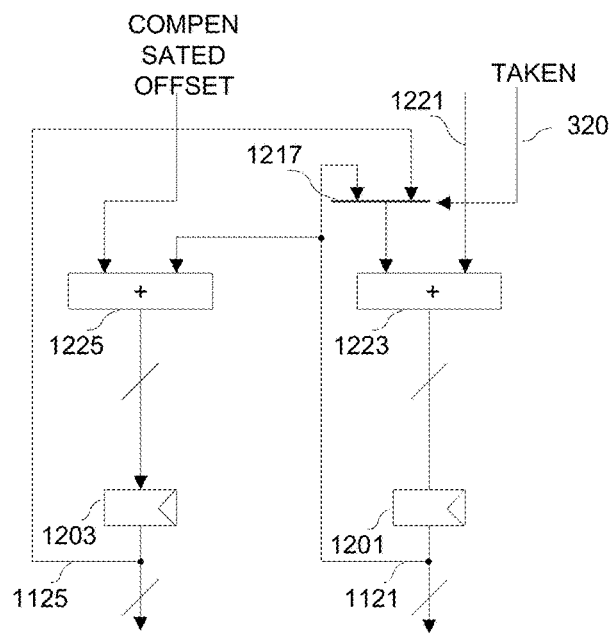
FIG. 12 illustrates a schematic diagram of an exemplary instruction address generation module consistent with the disclosed embodiments.

The structure and function of CPU core 1111 in FIG. 11 are similar to the structure and function of the CPU core in FIG. 2. The difference is that the instruction address generation module in CPU core 1111 only generates the block address part in the instruction address. FIG. 12 illustrates a schematic diagram of an exemplary instruction address generation module consistent with the disclosed embodiments.

As shown in FIG. 12, when a micro-operation is executed in order, register 1201 outputs an instruction block address; when a branch target instruction is executed, register 1203 outputs an instruction block address. Selector 1217 is controlled by TAKEN signal 320 which indicates whether a branch is taken.

Specifically, when the CPU core 1111 executes the sequential micro-operations, if a micro-operation currently executed by CPU core 1111 is not the last micro-operation in the micro-operation block, selector 1217 selects the value outputted from register 1201 to feed back to register 1201. Thus, the value of register 1201 is kept unchanged (that is, the instruction block address outputted from register 1201 is unchanged). That is, the value outputted from bus 1121 is the original instruction block address.

If a micro-operation currently executed by CPU core 1111 is the last micro-operation in the micro-operation block, selector 1217 selects the value outputted from register 1201 as one input of adder 1223. The other input of adder 1223 is signal 1221 ('1') from micro-operation read buffer 1107 representing that the current micro-operation is the last micro-operation in the micro-operation block, such that the instruction block address stored in register 1201 is added by 1 to obtain a new instruction block address. The new instruction block address is written back into register 1201. The value outputted from bus 1121 is the next instruction block address.

If CPU core 1111 executes a branch micro-operation and the branch is taken, adder 1225 obtains the address of a new instruction block by adding the current instruction block address sent from register 1201 to the upper bit portion of the compensated branch offset sent from micro-operation read buffer 1107. The value outputted from bus 1125 is the branch target instruction block address.

It should be noted that the instruction block address generation module is inside CPU core 1111, and the instruction block addresses respectively outputted by the instruction block address generation module via bus 1121 and bus 1125 are selected and performed a matching operation in a tag memory 105. However, the instruction block address generation module can also exist separately outside CPU core 1111. The operating process of the instruction block address generation module outside CPU core 1111 is the same as the operating process of the instruction block address generation module inside CPU core 1111, which are not repeated here.

Returning to FIG. 11, the instruction block addresses respectively outputted by CPU core 1111 via bus 1121 and bus 1125 are selected by selector 119 and sent to the control unit in micro-operation read buffer 1107 to perform a matching operation with the instruction block addresses stored in micro-operation read buffer 1107, determining whether the micro-operation block corresponding to the instruction block corresponding to the block address is stored in micro-operation read buffer 1107. If the micro-operation block corresponding to the instruction block corresponding to the block address is not stored in micro-operation read buffer 1107, based on the above method, the micro-operation block corresponding to the instruction block corresponding to the block address is stored in micro-operation read buffer 1107 before CPU core executes the micro-operation block. The instruction block address is also sent to tag memory 105 to perform a matching operation to determine whether the micro-operation block corresponding to the instruction block corresponding to the block address is stored in micro-operation memory 1106 and the corresponding block number BNX when the micro-operation block corresponding to the instruction block corresponding to the block address is stored in micro-operation memory 1106. As the transmission of the taken signal, micro-operation read buffer 1107 outputs the corresponding micro-operations in order for CPU core 1111 execution. The process may refer to the process in FIG. 6.

Specifically, when the CPU core 1111 executes the micro-operations according to the order of the addresses but the last micro-operation in the current micro-operation block is not executed, because the instruction block address is unchanged, the instruction block address does no need to be performed the corresponding matching operation in micro-operation read buffer 1107 and tag memory 105. The token signal in micro-operation read buffer 1107 is passed in every token transmitter corresponding to the current micro-operation block in order, providing the corresponding micro-operations for CPU core 1111 execution.

When the next sequential micro-operation block is executed, selector 1119 selects the instruction block address (i.e., the address of the instruction block corresponding to the next micro-operation block) from bus 1121. The instruction block address is performed a matching operation in micro-operation read buffer 1107.

If the instruction block address is matched successfully in the control unit in micro-operation read buffer 1107, the corresponding micro-operation block is the next micro-operation block.

If the instruction block address is matched unsuccessfully in the control unit in micro-operation read buffer 1107, the instruction block address is sent to tag memory 105 to perform a matching operation. In this case, if the matching operation is successful, BNX is obtained. The micro-operation block pointed to by the BNX in micro-operation memory 1106 is filled into the memory block determined by the replacement algorithm in micro-operation read buffer 1107, such that micro-operation read buffer 1107 contains the next micro-operation block.

If the instruction block address is matched unsuccessfully in tag memory 105, the low bit of instruction block address is filled with '0' to from a complete instruction address (that is, the instruction address of the first instruction corresponding to the instruction block address). Based on the previous method, the instruction address is sent to the lower level memory to obtain the corresponding instruction block. The obtained instruction block is converted to the micro-operation block via converter 109, and the micro-operation block is filled into the memory block pointed to by the BNX determined by the replacement algorithm in micro-operation memory 1106. The mapping relationship obtained by a conversion operation is stored in the row pointed to by the BNX in the mapping module. At the same time, the micro-operation block in micro-operation memory 1106 is filled into the memory block determined by the replacement algorithm in micro-operation read buffer 1107, such that micro-operation read buffer 1107 contains the next micro-operation block.

Thus, when the token signal is passed to the token transmitter corresponding to the last micro-operation in the current micro-operation block (that is, when CPU core 1111 executes the last micro-operation), the token signal is passed from the token transmitter corresponding to the last micro-operation in the current micro-operation block to the token transmitter corresponding to the first micro-operation in the next micro-operation block under the control of the ending flag. Then, as the transmission of the Token signal, micro-operation read buffer 1107 outputs the corresponding micro-operation in order for CPU core 1111 execution.

When micro-operation read buffer 1107 outputs the branch micro-operation to CPU core 1107 for execution, the address of branch target instruction block may be calculated by adding the upper bit portion of the compensated offset address to the block address of the branch micro-operation as shown in FIG. 12. The address of branch target instruction block is sent to the control unit in micro-operation read buffer 1107 to perform a matching operation. The address of branch target instruction block is also sent to tag memory 105 to perform a matching operation.

If the address of branch target instruction block is matched successfully in the control unit in micro-operation read buffer 1107, the micro-operation block that is matched successfully is the branch micro-operation block corresponding to the branch target instruction. At this time, because micro-operation memory 1106 contains all the micro-operation blocks in micro-operation read buffer 1107, BNX can be obtained successfully by performing a matching operation on the instruction block address in tag memory 105. Then, the low bit portion 1131 of the compensated branch offset is used as the instruction block offset. The instruction block offset is sent to mapping module 107. Based on the mapping relationship included in the row pointed to by the BNX, the instruction block offset is converted to the micro-operation offset address 1133. Based on the micro-operation offset address 1133, the branch target micro-operation can be found in the micro-operation block that is matched successfully in micro-operation read buffer 1107.

If the address of branch target instruction block is matched unsuccessfully in the control unit in micro-operation read buffer 1107, the instruction block address is sent to tag memory 105 to perform a matching operation. In this case, if the matching operation is successful, BNX is obtained. The micro-operation block pointed to by the BNX in micro-operation memory 1106 is filled into the memory block determined by the replacement algorithm in micro-operation read buffer 1107, such that micro-operation read buffer 1107 contains the branch target micro-operation block. At the same time, the low bit portion 1131 of the compensated branch offset is used as the instruction block offset. The instruction block offset is sent to mapping module 107. Based on the mapping relationship included in the row pointed to by the BNX, the instruction block offset is converted to micro-operation offset address 1133. Based on micro-operation offset address 1133, the branch target micro-operation can be found in the branch target micro-operation block in micro-operation read buffer 1107.

Thus, when the execution result of the branch micro-operation is not yet generated by CPU core 1111, according to the order of the addresses, the token signal continues to be passed in order and the corresponding micro-operations are outputted to CPU core 1111 for execution. When CPU core 1111 executes the branch micro-operation and generates the execution result of the branch micro-operation, if the branch is not taken, the token signal continues to be passed in order and the corresponding micro-operation is outputted to CPU core 1111 for execution; if the branch is taken, CPU core 1111 clears the execution results or the intermediate results of the executed micro-operations following the branch micro-operation. At the same time, according to the previously described method in FIG. 6, the transmission of the token signal is suspended. The token signal is injected into token transmitters corresponding to the BNX and the BNY in micro-operation read buffer 1107, such that micro-operation read buffer 1107 outputs the corresponding branch target micro-operation for CPU core 1111 execution. Then, as the transmission of the Token signals, micro-operation read buffer 1107 outputs the corresponding micro-operations in order for CPU core 1111 execution.

Figure 13:
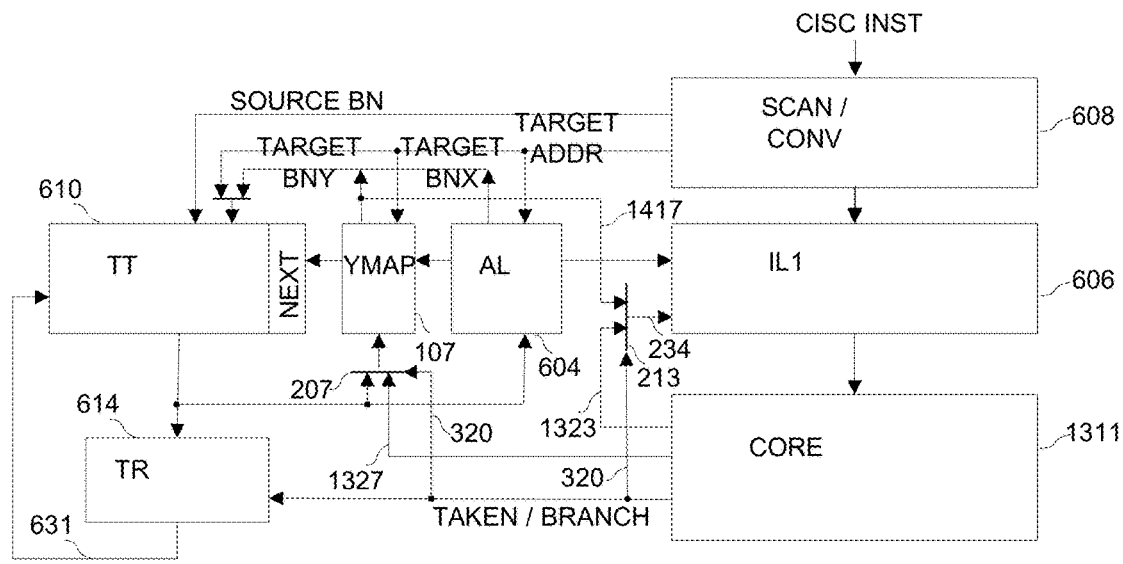
FIG. 13 illustrates a structure schematic diagram of another exemplary processor system consistent with the disclosed embodiments.

FIG. 13 illustrates a structure schematic diagram of another exemplary processor system consistent with the disclosed embodiments. As shown in FIG. 13, the processor system includes an active list 604, a scan converter 608, a track table 610, a tracker 614, a mapping module 107, a micro-operation memory 606, a selector 207, a selector 213 and a CPU core 1311. The structures and functions of active list 604, scan converter 608, track table 610, tracker 614, mapping module 107, and micro-operation memory 606 in FIG. 13 are the same as the structures and functions of the corresponding components in FIG. 6. The structures and functions of selector 207 and selector 213 in FIG. 13 are the same as the structures and functions of the corresponding components in FIG. 2.

Figure 14:
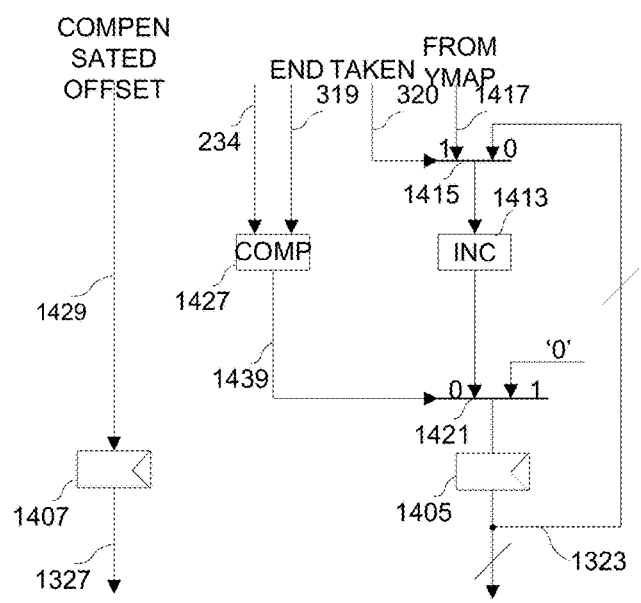
FIG. 14 illustrates a schematic diagram of another exemplary instruction address generation module consistent with the disclosed embodiments.

The structure and function of CPU core 1311 in FIG. 13 are similar to the structure and function of the CPU core in FIG. 2. The difference is that the instruction address generation module in CPU core 1311 only generates the offset address part in the instruction address. FIG. 14 illustrates a schematic diagram of another exemplary instruction address generation module consistent with the disclosed embodiments.

As shown in FIG. 14, when a micro-operation is executed in order, register 1405 outputs micro-operation offset address 1323; when a branch target instruction is executed, register 1407 outputs instruction offset address 1327. Selector 1415 is controlled by TAKEN signal 320 which indicates whether a branch is taken. Selector 1421 is controlled by the output of comparator 1427.

Specifically, when the CPU core 1311 executes the sequential micro-operation, selector 1415 selects the output 1323 sent from register 1405. The output 1323 sent from register 1405 is sent to incrementer 1413 to be added by 1. The obtained value (i.e., the next micro-operation offset address) is sent to selector 1421. The other input of selector 1421 is zeros. One input of comparator 1427 is from BNY 234 sent from mapping module 107, and the other input of comparator 1427 is from ending flag 319 (i.e., ending track point position) stored in track table 610. When the comparison result 1439 of comparator 1427 is unmatched, it indicates that the micro-operation offset address added by 1 is not the ending track point. Therefore, selector 1421 selects the output of incrementer 1413 under the control of the comparison result 1439, and the output of incrementer 1413 is stored in register 1405, such that the micro-operation offset address is added by 1. When the comparison result 1439 of comparator 1427 is matched, it indicates that the micro-operation offset address added by 1 is the ending track point. Therefore, selector 1421 selects '0' under the control of the comparison result 1439, and the '0' is stored in register 1405, such that the micro-operation offset address is cleared to '0'. The micro-operation offset address 1323 outputted by register 1405 is used as BNY. The BNY is used to index columns in micro-operation memory 606 when CPU core 1311 executes the micro-operations in order.

When read pointer 631 of tracker 614 points to a branch point, the content of the branch point is read out from track table 610. If the content of the branch point contains BNX and BNY, the BNY can be used to index micro-operation memory 606. If the content of the branch point contains the branch target instruction address, the low bit portion 1429 of the branch target instruction address is stored in register 1407 and outputted as instruction offset address 1327.

It should be noted that the instruction address generation module is inside CPU core 1311. However, the instruction address generation module can also exist separately outside CPU core 1311. The operating process of the instruction address generation module outside CPU core 1311 is the same as the operating process of the instruction address generation module inside CPU core 1311, which are not repeated here.

Returning to FIG. 13, the process is similar to the process in FIG. 6. Scan converter 608 examines and converts the received instruction block. A corresponding track is created in track table 610. The micro-operation block obtained by performing a conversion operation is stored in micro-operation memory 606. Read pointer 631 of tracker 614 points to the first branch point following the track point corresponding to the current micro-operation, and the content of the branch point is read out.

If the content of the branch point contains BNX and BNY, the micro-operation pointed to by the BNX and the BNY in micro-operation memory 606 is a branch target micro-operation. At the same time, the BNY is sent to the instruction address generation module shown in FIG. 14 as the input 1417 of selector 1415.

If the content of the branch point contains the branch target instruction address, the instruction block address part in the branch target instruction address is sent to active list 604 to perform a matching operation. If the matching operation is successful, the block number (BNX) corresponding to the branch target instruction block is obtained. The instruction offset address in the branch target instruction address is sent to mapping module 107. Based on a mapping relationship stored in the row pointed to by the BNX in mapping module 107, the instruction offset address is converted to the micro-operation offset address (BNY). The micro-operation pointed to by the BNX and the BNY in micro-operation memory 606 is the branch target micro-operation. At the same time, the BNY is sent to the instruction address generation module shown in FIG. 14 as the input 1417 of selector 1415.

If the matching operation is unsuccessful, the branch target instruction address is sent to the lower memory to obtain the corresponding instruction block. When the corresponding instruction block is obtained, scan converter 608 examines the instruction block. A corresponding track is created in track table 610. The obtained instruction block is converted to the micro-operation block, and the micro-operation block is filled into the memory block pointed to by the BNX and determined by the replacement algorithm in micro-operation memory 606. At the same time, a mapping relationship generated by a conversion operation is stored in the row pointed to by the BNX in mapping module 107. And micro-operation offset address BNY corresponding to the branch target instruction is also generated. Thus, the micro-operation pointed to by the BNX and the BNY in micro-operation memory 606 is a branch target micro-operation. At the same time, the BNY is sent to the instruction address generation module shown in FIG. 14 as the input 1417 of selector 1415.

When the branch micro-operation is not yet executed by CPU core 1311 or when the branch micro-operation is executed by CPU core 1311 but the execution result is not yet generated, a micro-operation pointed to by the BNY outputted by register 1405 in the instruction address generation module is provided for CPU core 1311 execution, where the micro-operation is in the micro-operation block in micro-operation memory 606 pointed to by the BNX in read pointer 631 of tracker 614.

When CPU core 1311 executes the branch micro-operation and generates the execution result of the branch micro-operation, if the branch is not taken, read pointer 631 of tracker 614 moves on and points to the next branch point, and the above operation is performed repeatedly. If the branch is taken successfully, CPU core 1311 clears the execution results or the intermediate results of the executed micro-operations following the branch micro-operation. Based on the BNX and the BNY included in the content of the branch point in track table 610, the branch target micro-operation is read out from micro-operation memory 606 and provided for CPU core 1311 execution. At the same time, the value of read pointer 631 of tracker 614 is updated to the BNX and the BNY. Read pointer 631 of tracker 614 continues to move on until read pointer 631 points to the first branch point following the branch target micro-operation. The BNY is also sent to the instruction address generation module as the input 1417 of selector 1415. After the BNY is selected by selector 1415, the BNY is sent to incrementer 1413 to calculate the BNY corresponding to the next micro-operation. Subsequent operations are the same as the operations shown in the previous embodiments, which are not repeated herein.

Figure 15A:
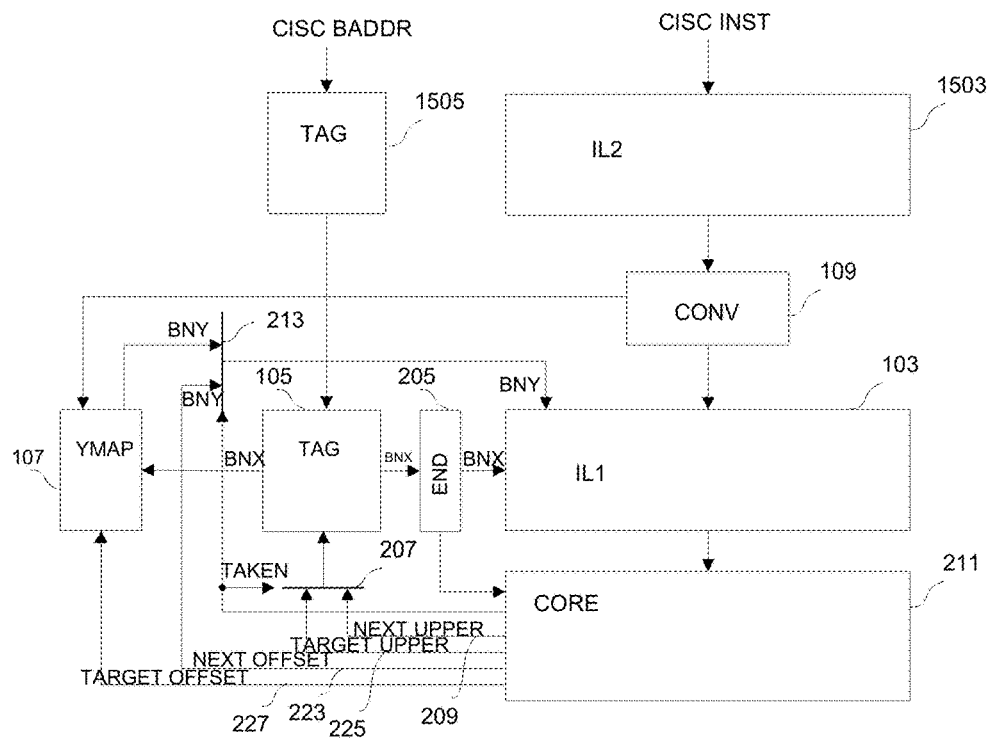
FIG. 15A illustrates a schematic diagram of an exemplary processor system containing multi-level cache consistent with the disclosed embodiments.

The disclosed system and method in FIG. 2 can be extended to support a system with more levels of cache. FIG. 15A illustrates a schematic diagram of an exemplary processor system containing multi-level cache consistent with the disclosed embodiments.

As shown in FIG. 15A, the processor system includes a micro-operation memory 103, a tag memory 105, an ending flag memory 205, a mapping module 107, a converter 109, a level two (L2) instruction memory 1503, a L2 tag memory 1505, and a CPU core 211. The structures and functions of the micro-operation memory 103, the tag memory 105, the ending flag memory 205, the mapping module 107, the converter 109, and the CPU core 211 are the same as the structures and functions of the corresponding components in FIG. 2.

Micro-operation memory 103 is equivalent to a level one (L1) cache that stores the micro-operations. Tag memory 105 is equivalent to a L1 tag memory. L2 instruction memory 1503 is a L2 cache that stores the instructions. L2 tag memory 1505 is a tag memory corresponding to L2 instruction memory 1503.

The converter 109 locates between micro-operation memory 103 and L2 instruction memory 1503. Only the instruction block which is outputted from L2 instruction memory 1503 and filled into micro-operation memory 103 can be converted and a mapping relationship is generated. Therefore, the operating process of the L1 cache system (including micro-operation memory 103, tag memory 105, ending flag memory 205, mapping module 107 and converter 109) is similar to the operating process of the L1 cache system in FIG. 2. Whereas, the operating process of the L2 cache system (including L2 instruction memory 1503 and L2 tag memory 1505) is the same as the operating process of the traditional L2 cache system. The operating process of the L1 cache system and the operating process of the L2 cache system are omitted herein.

The converter 109 may also be placed outside the L2 cache, such that the L2 cache also stores micro-operations.

Figure 15B:
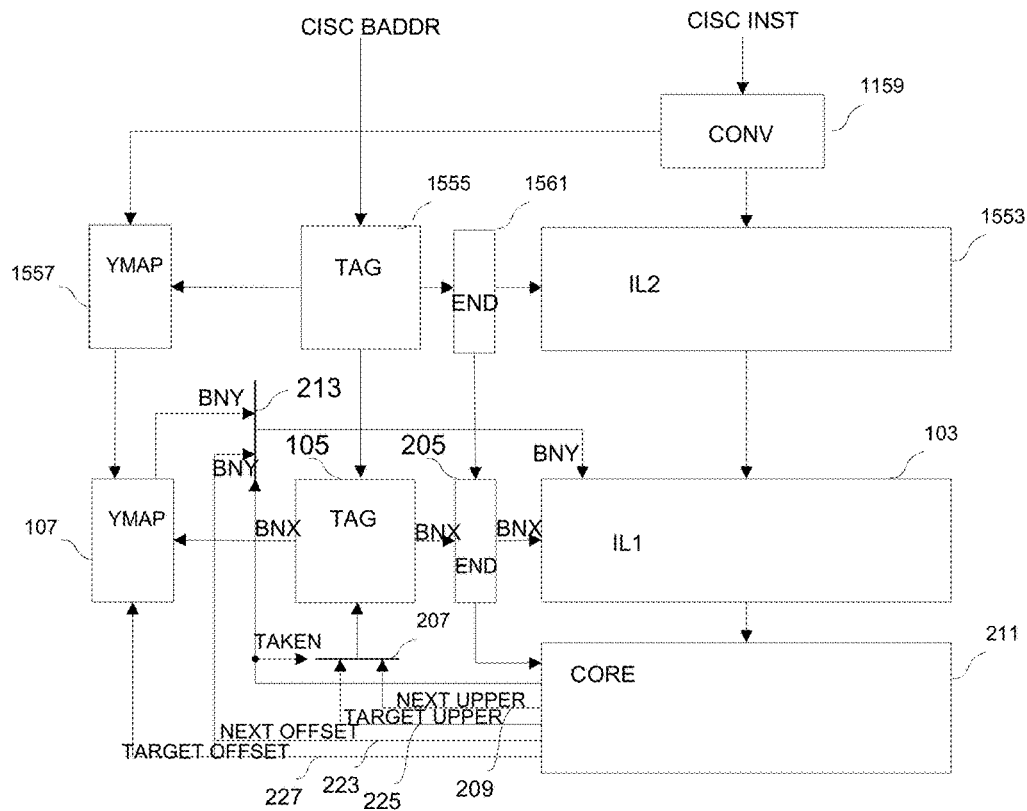
FIG. 15B illustrates a structure schematic diagram of another exemplary processor system with multi-level cache consistent with the disclosed embodiments.

FIG. 15B illustrates a structure schematic diagram of another exemplary processor system with multi-level cache consistent with the disclosed embodiments. As shown in FIG. 15B, the processor system includes a micro-operation memory 103, a tag memory 105, an ending flag memory 205, a mapping module 107, a converter 1559, a L2 micro-operation memory 1553, a L2 tag memory 1555, a mapping module 1557, an ending flag memory 1561, and a CPU core 211. The structures and functions of the micro-operation memory 103, the tag memory 105, the ending flag memory 205, the mapping module 107, and the CPU core 211 are the same as the structures and functions of the corresponding components in FIG. 15A.

Micro-operation memory 103, tag memory 105, ending flag memory 205, and mapping module 107 constitute a L1 cache system. L2 micro-operation memory 1553, L2 tag memory 1555, mapping module 1557, and ending flag memory 1561 constitute a L2 cache system. Micro-operation memory 103 is equivalent to a level one (L1) cache that stores the micro-operations. Tag memory 105 is equivalent to a L1 tag memory. Compared to the corresponding components in FIG. 15A, the difference is that L2 micro-operation memory 1553 is a L2 cache that stores the micro-operations; L2 tag memory 1555 is a tag memory corresponding to L2 micro-operation memory 1553; and mapping module 1557 stores mapping relationships between every micro-operation offset address in micro-operation memory 1553 and the corresponding instruction offset address.

The converter 1559 locates outside L2 micro-operation memory 1553. After the instruction block sent from the lower memory is converted to the micro-operation block by converter 1559, the micro-operation block is filled into the memory block determined by the replacement algorithm in L2 micro-operation memory 1503. Accordingly, the instruction block address and the mapping relationship generated by the conversion operation are filled into the corresponding row in L2 tag memory 1555 and the corresponding row in mapping module 1557, respectively. The position information of the last micro-operation in the micro-operation block is filled into the corresponding row in ending flag memory 1561.

Specifically, when the block address of the micro-operation needed by CPU core 211 is matched successfully in tag memory 105, that is, the needed micro-operation is in micro-operation memory 1553, the process that CPU core fetches and executes the instruction is the same as the process shown in FIG. 2, which is not repeated herein.

When the block address of the micro-operation needed by CPU core 211 is matched unsuccessfully in tag memory 105, the block address is sent to L2 tag memory 1555 to perform a matching operation. If the matching operation is successful, a L2 block number BN2X is obtained. Based on the BN2X, L2 micro-operation memory 1553 is indexed, and the corresponding micro-operation is read out and filled into the memory block in micro-operation memory 103, where the memory block is pointed to by the L1 block number BN1X determined by the replacement algorithm. At the same time, the mapping relationship pointed to by the BN2X is read out from mapping module 1557 and filled into the row pointed to by the BN1X in mapping module 107. Therefore, the operation that the micro-operation block from L2 cache is filled into L1 cache is completed. Then, the process that CPU core 211 fetches the micro-operation from L1 cache is the same as the process described previously.

If the block address is matched unsuccessfully in L2 tag memory 1555, the low bit portion of the block address is filled with '0' to constitute a complete instruction address (that is, the instruction address of the first instruction corresponding to the instruction block address). As previously described, the instruction address is sent to the lower level memory to obtain the corresponding instruction block. When the obtained instruction block is sent to L2 cache, converter 1559 converts the instruction block to the micro-operation block, generates the corresponding relationship and obtains the ending flag (that is, the position information of the last micro-operation). The instruction block address is filled into the row pointed to by the BN2X which is determined by the replacement algorithm in L2 tag memory 1555; the micro-operation block is filled into the memory block pointed to by the BN2X in L2 micro-operation memory 1553; the mapping relationship is filled into the row pointed to by the BN2X in mapping module 1557; and the ending flag is filled into the row pointed to by the BN2X in ending flag memory 1561. Thus, the process for filling the instruction block to L2 cache is completed.

The instruction block address, the micro-operation block, the mapping relationship and the ending flag are also filled into the row or the memory block pointed to by the BN1X which is determined by the replacement algorithm in tag memory 105, micro-operation memory 103, mapping module 107 and ending flag memory 205 of the L1 cache, respectively. The filling process and the process that the CPU core 211 fetches the micro-operation from L1 cache are the same as the process shown in the previous embodiments, which are not repeated herein.

It should be noted that the structures and the operation process described in this embodiment can be extended to apply to a system with more levels of cache.

Figure 16:
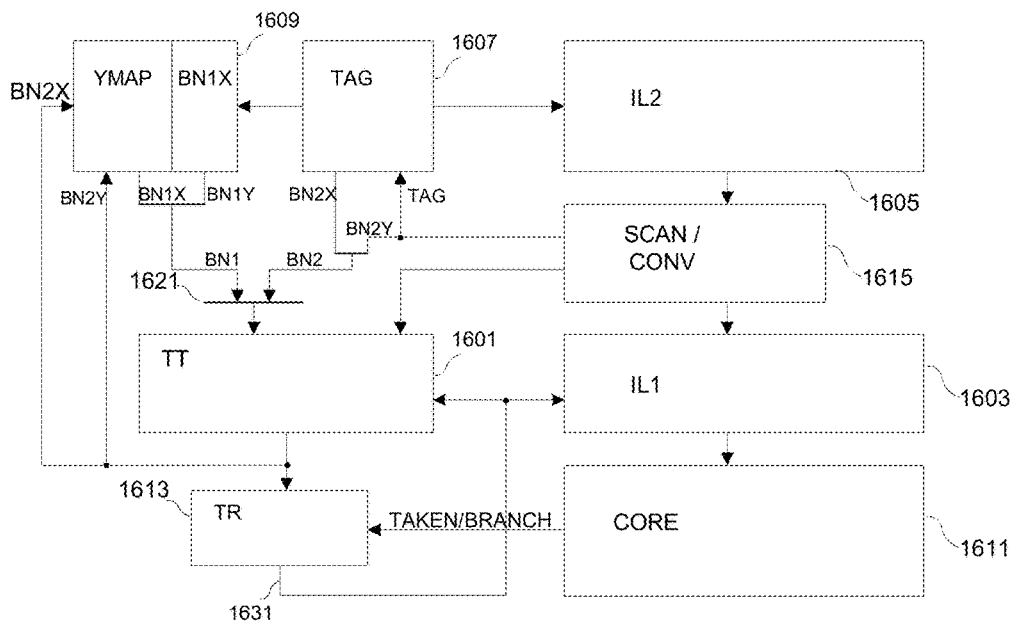
FIG. 16 illustrates a schematic diagram of another exemplary processor system containing multi-level cache consistent with the disclosed embodiments.

The disclosed system and method in FIG. 6 can be extended to apply to a system with more levels of cache to improve overall system efficiency. FIG. 16 illustrates a schematic diagram of another exemplary processor system containing multi-level cache consistent with the disclosed embodiments.

As shown in FIG. 16, the processor system includes a track table 1601, a L1 micro-operation memory 1603, a L2 instruction memory 1605, a tag memory 1607, a mapping module 1609, a tracker 1613, a scan converter 1615 and a CPU core 1611. Track table 1601, L1 micro-operation memory 1603, tracker 1613, and scan converter 1615 constitute a L1 cache system. L2 instruction memory 1605, tag memory 1607, and mapping module 1609 constitute a L2 cache system. It should be understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

There is a one-to-one correspondence between every memory block in L2 instruction memory 1605 and every row in tag memory 1607 as well as every row in mapping module 1609, which are pointed to by the same BN2X. The memory block in L2 instruction memory 1605 is configured to store instruction blocks. The block address of the instruction block is stored in the corresponding row of tag memory 1607. The offset address in the L2 instruction block containing the instruction in L2 instruction memory 1605 is BN2Y (that is, the low bit portion of the instruction address).

Similarly, there is a one-to-one correspondence between every memory block in L1 micro-operation memory 1603 and every row (track) in track table 1601, which are pointed to by the same BN1X. The memory block in L1 micro-operation memory 1603 stores the micro-operation block corresponding to the instruction block. The memory block of L1 micro-operation memory 1603 is used to store micro-operation block corresponding to the instruction block. The offset address in the L1 micro-operation block containing the micro-operation in L1 micro-operation memory 1603 is BN1Y.

As used herein, the block size of the L2 instruction block is the same as the block size of the instruction block corresponding to the L1 micro-operation block. The mapping module 1609 stores a mapping relationship of every L1 micro-operation block with every L2 instruction block in L2 cache, and a mapping relationship of every instruction offset address with every micro-operation offset address in every L1 micro-operation block.

Specifically, if a micro-operation block corresponding to a L2 instruction block is stored in the L1 cache system, the row in mapping module 1609 that is pointed to by the BN2X of the L2 instruction block is valid. The row stores the BN1X of the micro-operation block in L1 cache and the mapping relationship of the micro-operation block. If a micro-operation block corresponding to a L2 instruction block is not stored in the L1 cache system, the row in mapping module 1609 that is pointed to by the BN2X of the L2 instruction block is invalid. Thus, when the row pointed to by the BN2X is valid, the mapping module 1609 outputs the corresponding BN1X and BN1Y based on the received BN2X and the BN2Y.

Scan converter 1615 is configured to examine the instruction block that is filled from L2 instruction memory 1605 to L1 micro-operation memory 1603, create the corresponding track in the row pointed to by the BN1X in track table 1601, and convert the instruction block to the micro-operation block. Scan converter 1615 is also configured to fill the micro-operation block into the memory block pointed to by the BN1X that is determined by the replacement algorithm in the micro-operation memory 1603, and fill the mapping relationship obtained by the conversion operation and the BN1X into the row pointed to by the BN2X of the filled instruction block in mapping module 1609. The mapping relationship and the BN1X are recorded as valid.

The content of the branch point stored in track table 1601 may be position information of the branch target micro-operation in the L1 cache system (i.e., BN1X and BN1Y), or position information of the branch target instruction in the L2 cache system (i.e., BN2X and BN2Y). Specifically, the block address part of the branch target instruction address calculated and obtained by scan converter 1615 is sent to tag memory 1607 to perform a matching operation. If the matching operation is successful, BN2X corresponding to the branch target instruction is obtained. Based on the BN2X and the low bit portion of the branch target instruction address, mapping module 1609 is indexed. If the content read out is valid, it indicates that the micro-operation block corresponding to the instruction block containing the branch target instruction is stored in the L1 cache system, and the corresponding BN1X is obtained. BN1Y is obtained by the conversion operation the mapping relationship in the row pointed to by the BN2X. The BN1X and the BN1Y are selected by selector 1621 and stored in the branch point as content of the track point. If the content read out is invalid, it indicates that the micro-operation block corresponding to the instruction block containing the branch target instruction is not stored in L1 cache system. The BN2X and the low bit portion of the branch target instruction address (BN2Y) are directly selected by selector 1621 and stored in the branch point as content of the track point.

If the matching operation is unsuccessful, the low bit portion of the instruction block address is filled with '0' to constitute a complete instruction address (that is, the instruction address of the first instruction corresponding to the instruction block address). As previously described, the instruction address is sent to the lower level memory to obtain the corresponding instruction block. When the obtained instruction block is sent to L2 cache, the instruction block address is filled into the row pointed to by the BN2X which is determined by the replacement algorithm in tag memory 1607; the instruction block is filled into the memory block pointed to by the BN2X, and the row pointed to by the BN2X in mapping module 1609 is set to invalid. The BN2X and the low bit portion of the branch target instruction address (BN2Y) are selected by selector 1621 and stored in the branch point as the content of the track point.

Read pointer 1631 of tracker 1613 moves on and points to the first branch point following the micro-operation currently executed by CPU core 1611 in track table 1601. The content of the branch point is read out. If the content of the branch point is BN1X and BN1Y, it indicates that the branch target micro-operation of the branch instruction is stored in the L1 cache system and can be directly read by CPU core 1611. If the content of the branch point is BN2X and BN2Y, it indicates that the branch target micro-operation of the branch instruction may be not stored in the L1 cache system. At this point, the BN2X and the BN2Y are sent to mapping module 1609 to index the content in mapping module 1609. If the row pointed to by the BN2X in mapping module 1609 is valid, the corresponding BN1X can be read out, and the BN2Y is converted to the BN1Y based on the mapping relationship. Thus, the branch target micro-operation of the branch instruction is stored in the L1 cache system and can be directly read by CPU core 1611. At the same time, the BN1X and the BN1Y are selected by selector 1621 and filled into the branch point as the content of the track point.

If the row pointed to by the BN2X in mapping module 1609 is invalid, it indicates that the branch target micro-operation of the branch instruction is not stored in the L1 cache system. At this point, L2 instruction memory 1605 sends the instruction block pointed to by the BN2X to scan converter 1615. The instruction block is examined and converted to the micro-operation block by scan converter 1615. A corresponding track is created in the row pointed to by the BN1X determined by the replacement algorithm in track table 1601. The obtained micro-operation block is filled into the memory block pointed to by the BN1X in L1 micro-operation memory 1603. The BN1X and the mapping relationship obtained by the conversion operation are stored in the row pointed to by the BN2X in mapping module 1609 and recorded as valid. Thus, the branch target micro-operation of the branch instruction is stored in the L1 cache system and can be directly read by CPU core 1611. The BN1X and the BN1Y are selected by selector 1621 and filled into the branch point as the content of the track point.

CPU core 1611 outputs the micro-operation offset address according to the previous method and reads out the needed micro-operation from the memory block pointed to by read pointer 1631 of tracker 1613 in micro-operation memory 1603. The operating process in other situations (e.g., when CPU core 1611 executes micro-operations in order; when CPU core 1611 executes a branch micro-operation) is the same as the operating process in the previous embodiments, which is not repeated herein. In addition, in order to obtain the micro-operation, CPU core 1611 outputs the micro-operation offset address herein. However, the micro-operation read buffer may also directly output the micro-operations for CPU core 1611 execution in the two level cache structure, which is not repeated herein.

In FIG. 16, there is a one-to one correspondence between the row in mapping module 1609 and the row in tag memory 1607 as well as the memory block in L2 instruction memory 1605. Therefore, the mapping relationships in some rows may be invalid. In order to decrease the capacity of mapping module 1609, the rows in mapping module 1609 may be modified to have one-to-one correspondence with the row in the track table as well as the memory block in L1 micro-operation memory. Thus, the mapping relationship in every row in mapping module 1609 is valid.

Figure 17:
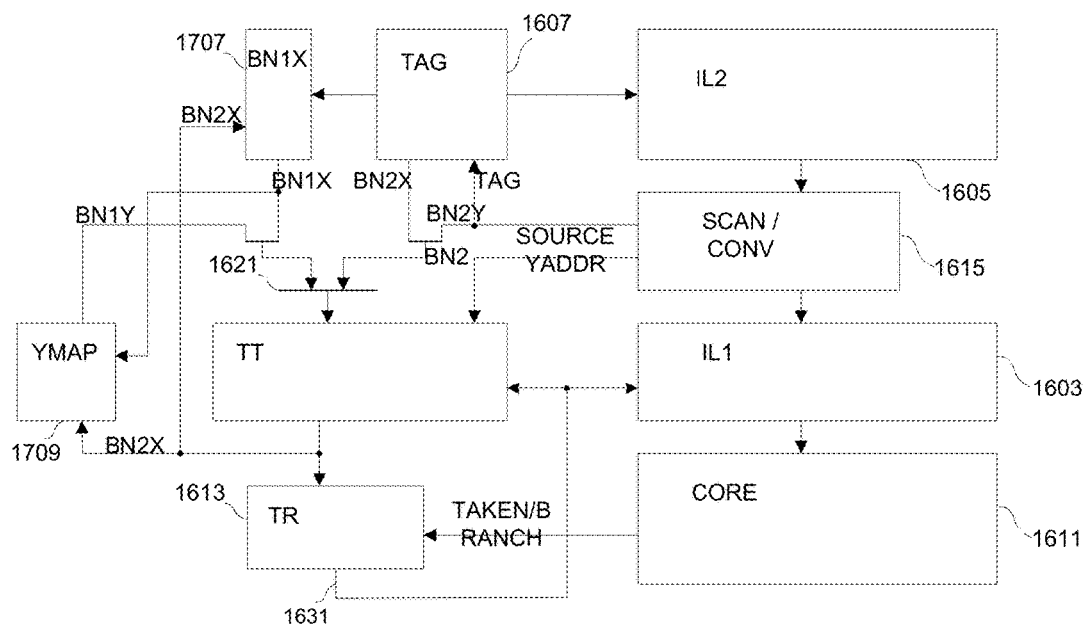
FIG. 17 illustrates another processor system containing multi-level cache consistent with the disclosed embodiments.

FIG. 17 illustrates another processor system containing multi-level cache consistent with the disclosed embodiments. The processor system includes a track table 1601, a L1 micro-operation memory 1603, a L2 instruction memory 1605, a tag memory 1607, a block number memory 1707, a mapping module 1709, a tracker 1613, a scan converter 1615 and a CPU core 1611. Track table 1601, L1 micro-operation memory 1603, tracker 1613, mapping module 1709, and scan converter 1615 constitute a L1 cache system. L2 instruction memory 1605, tag memory 1607, and block number memory 1707 constitute a L2 cache system. It should be understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

Track table 1601, L1 micro-operation memory 1603, L2 instruction memory 1605, tag memory 1607, tracker 1613, scan converter 1615 and CPU core 1611 are the same as the corresponding components in FIG. 16. The difference is that there is a one-to-one correspondence between the row in block number memory 1707 and the row in tag memory 1607 as well as the memory block in L2 instruction memory 1605, which are pointed to by the same BN2X. Specifically, if a micro-operation block corresponding to a L2 instruction block is stored in a L1 cache system, the row in block number memory 1707 pointed to by the BN2X of the L2 instruction block is valid, where the row stores the BN1X of the micro-operation in a L1 cache system. If the micro-operation block corresponding to the L2 instruction block is not stored in the L1 cache system, the row in block number memory 1707 pointed to by the BN2X of the L2 instruction block is not valid. Thus, based on the received BN2X, block number memory 1707 outputs the corresponding BN1X when the row pointed to by the BN2X is valid. There is a one-to-one correspondence between the row in mapping module 1709 and the row in track table 1601 as well as the memory block in L1 micro-operation memory 1603, which are pointed to by the same BN1X. Mapping module 1709 in FIG. 17 is similar to mapping module 107 in FIG. 6, which is configured to store an address mapping relationship between the instruction block and the micro-operation block. Thus, mapping module 1607 in FIG. 16 is divided into block number memory 1707 and mapping module 1709. Therefore, the same functionality can be implemented by a smaller area.

When the block address part of the branch target instruction address calculated by scan converter 1615 is sent to tag memory 1607 to perform a matching operation, if the matching is successful, BN2X is obtained. Block number memory 1707 is indexed based on the BN2X. If the row read out is valid, it indicates that the micro-operation block corresponding to the instruction block pointed to by the BN2X is stored in the memory block pointed to by the BN1X in L1 micro-operation memory 1603. At this time, the low bit portion (that is, BN2Y) of the branch target instruction address is converted to BN1Y based on the mapping relationship pointed to by the BN1X in mapping module 1709. The BN1X and the BN1Y are selected by selector 1621 and then filled into the branch point as the content of the track point. If the row read out is invalid, the BN2X and the BN2Y are directly selected by selector 1621 and the filled into the branch point as the content of the track point.

Similarly, when the content of the branch point pointed to by read pointer 1631 of tracker 1613 are BN2X and BN2Y, the BN2X is sent to block number memory 1707 to index the block number memory 1707. If the row pointed to by the BN2X in block number memory 1707 is valid, the corresponding BN1X can be read out. Based on the mapping relationship pointed to by the BN1X in mapping module 1709, BN2Y is converted to BN1Y. Thus, the branch target micro-operation of the branch instruction is stored in the L1 cache system and can be directly read by CPU core 1611. At the same time, the BN1X and the BN1Y are selected by selector 1621 and then filled into the branch point as the content of the track point.

If the row pointed to by the BN2X in block number memory 1707 is invalid, it indicates that the branch target micro-operation of the branch instruction is not stored in the L1 cache system. At this time, L2 instruction memory 1605 sends the instruction block pointed to by the BN2X to scan converter 1615. The instruction block is examined and converted to the micro-operation block by scan converter 1615. A corresponding track is created in the row pointed to by the BN1X determined by the replacement algorithm in track table 1601. The obtained micro-operation block is filled into the memory block pointed to by the BN1X in L1 micro-operation memory 1603. The mapping relationship obtained by the conversion operation is stored in the row pointed to by the BN1X in mapping module 1709. At the same time, the BN1X is filled into the row pointed to by the BN2X in block number memory 1707 and recorded as valid. Thus, the branch target micro-operation of the branch instruction is stored in the L1 cache system and can be directly read by CPU core 1611. The BN1X and the BN1Y are selected by selector 1621 and then filled into the branch point as the content of the track point.

Other operations are the same as the corresponding operations shown in FIG. 16, which are not repeated herein.

Figure 18:
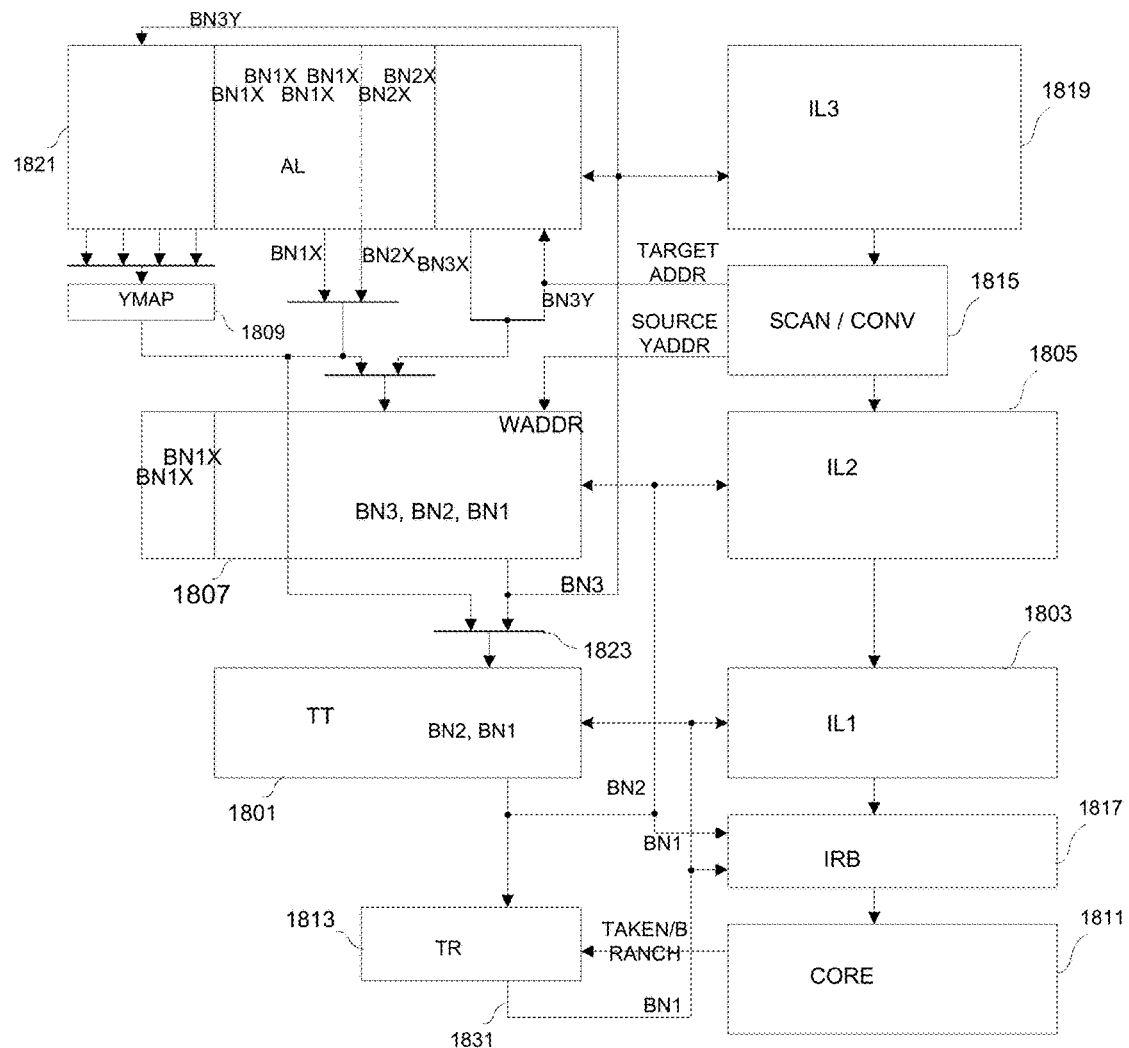
FIG. 18 illustrates a schematic diagram of another exemplary processor system containing multi-level cache consistent with the disclosed embodiments.

The disclosed system and method in FIG. 16 or FIG. 17 can be extended to apply to a system with more levels of cache to improve overall system efficiency. FIG. 18 illustrates a schematic diagram of another exemplary processor system containing multi-level cache consistent with the disclosed embodiments.

As shown in FIG. 18, the processor system includes a L1 track table 1801, a L1 micro-operation memory 1803, a L2 micro-operation memory 1805, a L2 track table 1807, a mapping module 1809, a tracker 1813, a scan converter 1815, a micro-operation read buffer 1817, a L3 instruction memory 1819, a tag memory 1821, and a CPU core 1811. L1 track table 1801, L1 micro-operation memory 1803, a tracker 1813, and micro-operation read buffer 1817 constitute a L1 cache system. Scan converter 1815, L2 micro-operation memory 1805, L2 track table 1807, and mapping module 1809 constitute a L2 cache system. L3 instruction memory 1819 and tag memory 1821 constitute a L3 cache system. It should be understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software.

There is a one-to-one correspondence between every memory block in L1 micro-operation memory 1803 and every row in L1 track table 1801, which are pointed to by the same BN1X. L1 micro-operation memory 1803 stores L1 micro-operation blocks, and the corresponding tracks are created in L1 track table 1801.

There is a one-to-one correspondence between every row in L2 track table 1807 and every memory block in L2 micro-operation memory 1805 as well as every row in mapping module 1809, which are pointed to by the same BN2X. L2 micro-operation memory 1805 stores L2 micro-operation blocks, and the corresponding tracks are created in L2 track table 1807. Every row in mapping module 1809 stores a mapping relationship between the micro-operation offset address of the corresponding micro-operation block in L2 micro-operation memory 1805 and the instruction address. Every row in L2 track table 1807 also stores the information about whether the corresponding L2 micro-operation block is stored in the L1 cache system. As used herein, the capacity of the L1 instruction block corresponding to the L1 micro-operation block is half of the capacity of the L2 instruction block corresponding to the L2 micro-operation block. The capacity of the L2 instruction block corresponding to the L2 micro-operation block is half of the capacity of the L3 instruction block. The process for other situations may be obtained based on the description herein.

Specifically, every row in L2 track table 1807 may store at most two corresponding BN2X. For example, if two L1 micro-operation blocks corresponding to one L2 micro-operation block are stored in L1 micro-operation memory 1803, BN1X corresponding to each L1 micro-operation block is stored in the row pointed to by the BN2X of the L2 micro-operation block in L2 track table 1807. For another example, if only one L1 micro-operation block in the two L1 micro-operation blocks is stored in L1 micro-operation memory 1803, BN1X corresponding to the stored L1 micro-operation block is stored in the row pointed to by the BN2X in L2 track table 1807, whereas the other entry that stores BN1X in the row is invalid. For another example, if both the two L1 micro-operation blocks are not stored in L1 micro-operation memory 1803, the two entries that store BN1X in the row pointed to by the BN2X in L2 track table 1807 are invalid.

There is a one-to-one correspondence between every memory block in L3 instruction memory 1819 and every row in tag memory 1821, which are pointed to by the same BN3X. L3 instruction memory 1819 stores L3 instruction blocks, and every corresponding instruction block address is stored in the row pointed to by the same BN3X in tag memory 1821. The row of tag memory 1821 also stores information about whether the micro-operation block corresponding to the instruction block is stored in the L1 or L2 cache system. It should be noted that the micro-operation blocks stored in the L1 cache system is a subset of the micro-operation blocks stored in the L2 cache system. Therefore, if a valid BN1X exists in tag memory 1821, a corresponding valid BN2X certainly exists. In addition, based on the inclusion relationship of the L2 micro-operation block and the L1 micro-operation block, mapping module 1809 can also convert BN2Y to BN1Y, or convert directly BN3Y to BN1Y.

Specifically, every row in tag memory 1821 stores at most two corresponding BN2X and four corresponding BN1X. For example, if two L2 micro-operations corresponding to two L2 instruction blocks corresponding to one L3 instruction block are stored in L2 micro-operation memory 1805, the BN2X corresponding to each L2 micro-operation block is stored into the row pointed to by the BN3X of the L3 instruction block in tag memory 1821. For another example, if only one L2 micro-operation block in the two L2 micro-operation blocks is stored in L2 micro-operation memory 1805, the BN2X corresponding to the stored L2 micro-operation block is stored in the row pointed to by the BN3X in tag memory 1821, whereas the other entry that stores the BN2X in the row is invalid. For another example, if both the L2 micro-operation blocks are not stored in L2 micro-operation memory 1805, the two entries that store the BN2X in the row pointed to by the BN3X in tag memory 1821 are invalid. Similarly, based on storage situation of the L1 micro-operation blocks corresponding to the four L1 instruction blocks corresponding to the L3 instruction block in the L1 cache system, four entries that store the BN1X in the row pointed to by the BN3X of the L3 instruction block in tag memory 1821 can be set all valid (that is, BN1X exists), partial valid (that is, BN1X exists), or all invalid.

Scan converter 1815 is configured to examine the instruction block that is filled from L3 instruction memory 1819 to L2 micro-operation memory 1805, create the corresponding track in the row pointed to by the BN2X determined by the replacement algorithm in L2 track table 1807, and convert the instruction block to the micro-operation block. Scan converter 1815 is also configured to fill the micro-operation block into the memory block pointed to by the BN2X in L2 micro-operation memory 1805, fill the BN2X into the row pointed to by the BN3X in tag memory 1821, and fill the mapping relationship obtained by the conversion operation into the row pointed to by the BN2X in mapping module 1809.

The content of the branch point stored in L1 track table 1807 may be position information of the branch target micro-operation in the L1 cache system (i.e., BN1X and BN1Y), or position information of the branch target micro-operation in the L2 cache system (i.e., BN2X and BN2Y), or position information of the branch target instruction in the L3 cache system (i.e., BN3X and BN3Y).

Specifically, the block address part of the branch target instruction address calculated and obtained by scan converter 1815 is sent to tag memory 1821 to perform a matching operation. If the matching operation is successful in tag memory 1821, BN3X corresponding to the branch target instruction is obtained. Based on the offset address (i.e., BN3Y) of the branch target instruction, position information that the branch target instruction locates in which the L1 instruction block (or L2 instruction block) contained in the L3 instruction block is read out. Also, the corresponding BN1X or the corresponding BN2X stored in the row matched successfully in tag memory 1821 is read out.

If the valid BN1X and the corresponding BN2Y can be read out, it indicates that the micro-operation block corresponding to the instruction block containing the branch target instruction is stored in the L1 cache system. Based on the mapping relationship in the row pointed to by the BN2X in mapping module 1809, the BN3Y is converted to the BN1Y. The BN1X and the BN1Y are selected by selector 1821 and then used as the content of the track point. The content of the track point is filled into the branch point in L2 track table 1807.

If only BN2X read out is valid but the BN1X read out is invalid, it indicates that the micro-operation block corresponding to the instruction block containing the branch target instruction is stored in the L2 cache system. Based on the mapping relationship in the row pointed to by the BN2X in mapping module 1809, the BN3Y is converted to the BN2Y. The BN2X and the BN2Y are selected by selector 1821 and then used as the content of the track point. The content of the track point is filled into the branch point in L2 track table 1807.

If the valid BN1X or the valid BN2X cannot be read out, it indicates that the micro-operation block corresponding to the instruction block containing the branch target instruction is not stored in the L1 or L2 cache system. The BN3X and the BN3Y are directly selected by selector 1821 and then used as the content of the track point. The content of the track point is filled into the branch point in L2 track table 1807.

The content of the branch point stored in L1 track table 1801 may be position information of the branch target micro-operation in the L1 cache system (i.e., BN1X and BN1Y), or position information of the branch target micro-operation in the L2 cache system (i.e., BN2X and BN2Y).

When the read pointer of tracker 1813 points to the branch point in L1 track table 1801, the content of the branch point is read out. If the content of the branch point is BN1X and BN1Y, it indicates that the branch target micro-operation of the branch instruction is stored in the L1 cache system and can be directly read by CPU core 1811. If the content of the branch point is BN2X and BN2Y, it indicates that the branch target micro-operation of the branch instruction may be not stored in the L1 cache system. At this point, the BN2X is sent to L2 track table 1807 to index L2 track table 1807. Based on the BN2Y, the corresponding BN1X in the two BN1X stored in the row is read out.

If the BN1X read out is valid, it indicates that the micro-operation block is stored in the L1 cache system. At this point, based on the mapping relationship in the row pointed to by the BN2X in mapping module 1809, the BN2Y is converted to the BN1Y. The BN1X and the BN1Y are selected by selector 1821 and then used as the content of the track point. The content of the track point is filled into the branch point in L1 track table 1801.

If the BN1X read out is invalid, it indicates that the micro-operation block is not stored in L1 cache system. At this time, the corresponding L1 micro-operation block contained in the L2 micro-operation block which is pointed to by the BN2X in L2 micro-operation memory 1805 is filled into the memory block pointed to by the BN1X determined by the replacement algorithm in L1 micro-operation memory 1803, and the corresponding L1 track in the track pointed to by the BN2X in L2 track table 1807 is filled into the row pointed to by the BN1X in L1 track table 1801. During the process, if the content filled in the track point is BN1X and BN1Y, or BN2X and BN2Y, the content of the track point selected by selector 1823 may be directly filled into the corresponding track point in L1 track table 1801.

If the content filled in the track point is BN3X and BN3Y, based on the BN3Y, position information that the branch target instruction locates in which the L1 instruction block (or L2 instruction block) contained in the L3 instruction block is determined. Also, the corresponding BN1X or the corresponding BN2X stored in the row pointed to by the BN3X in tag memory 1821 is read out. If the valid BN1X and the corresponding BN2X can be read out (or only valid BN2X can be read out), it indicates that the micro-operation block pointed to by the BN3X and the BN3Y is stored in the L1 cache system (or the L2 cache system). Based on the mapping relationship in the row pointed to by the BN2X in mapping module 1809, the BN3Y is converted to the BN1Y (or BN2Y). The BN1X and the BN1Y (or the BN2X and the BN2Y) are selected by selector 1823 and then used as the content of the track point. The content of the track point is stored into the track point in L1 track table 1801.

If the valid BN1X or the valid BN2X cannot be read out, it indicates that the micro-operation block pointed to by the BN3X and the BN3Y is not stored in the L1 or L2 cache system. Based on the BN3Y, the L2 instruction block in the L2 cache system to be filled in L3 instruction block pointed to by the BN3X in L3 instruction memory 1819 can be determined. Scan converter 1815 is configured to examine and convert the L2 instruction block, create the corresponding track in the row pointed to by the BN2X which is determined by the replacement algorithm in L2 track table 1807, and convert the instruction block to the micro-operation block. Scan converter 1815 is also configured to fill the L2 micro-operation block into the memory block pointed to by the BN2X in L2 micro-operation memory 1805, and fill the mapping relationship obtained by the conversion operation into the row pointed to by the BN2X in mapping module 1809. Based on the mapping relationship, the BN3Y is converted to the BN2Y. The BN2X and the BN2Y are selected by selector 1823 and then used as the content of the track point. The content of the track point is stored into the track point in L1 track table 1801.

Through the above process, the BN1X and the BN1Y or the BN2X and the BN2Y as the content of the branch point in L1 track table can be ensured. Also, the content of the branch point pointed to by read pointer 1831 of tracker 1813 is BN1X and BN1Y. That is, the micro-operations possibly to be executed recently by CPU core 1811 are all filled into L2 micro-operation memory 1805, and the micro-operations possibly to be executed immediately by CPU core 1811 are all filled into L1 micro-operation memory 1803, thereby hiding or shortening the partial or all waiting time caused by providing the micro-operations for CPU core 1811.

Other operations are the same as the corresponding operations shown in the previous embodiments, which are not repeated herein.

Figure 19:
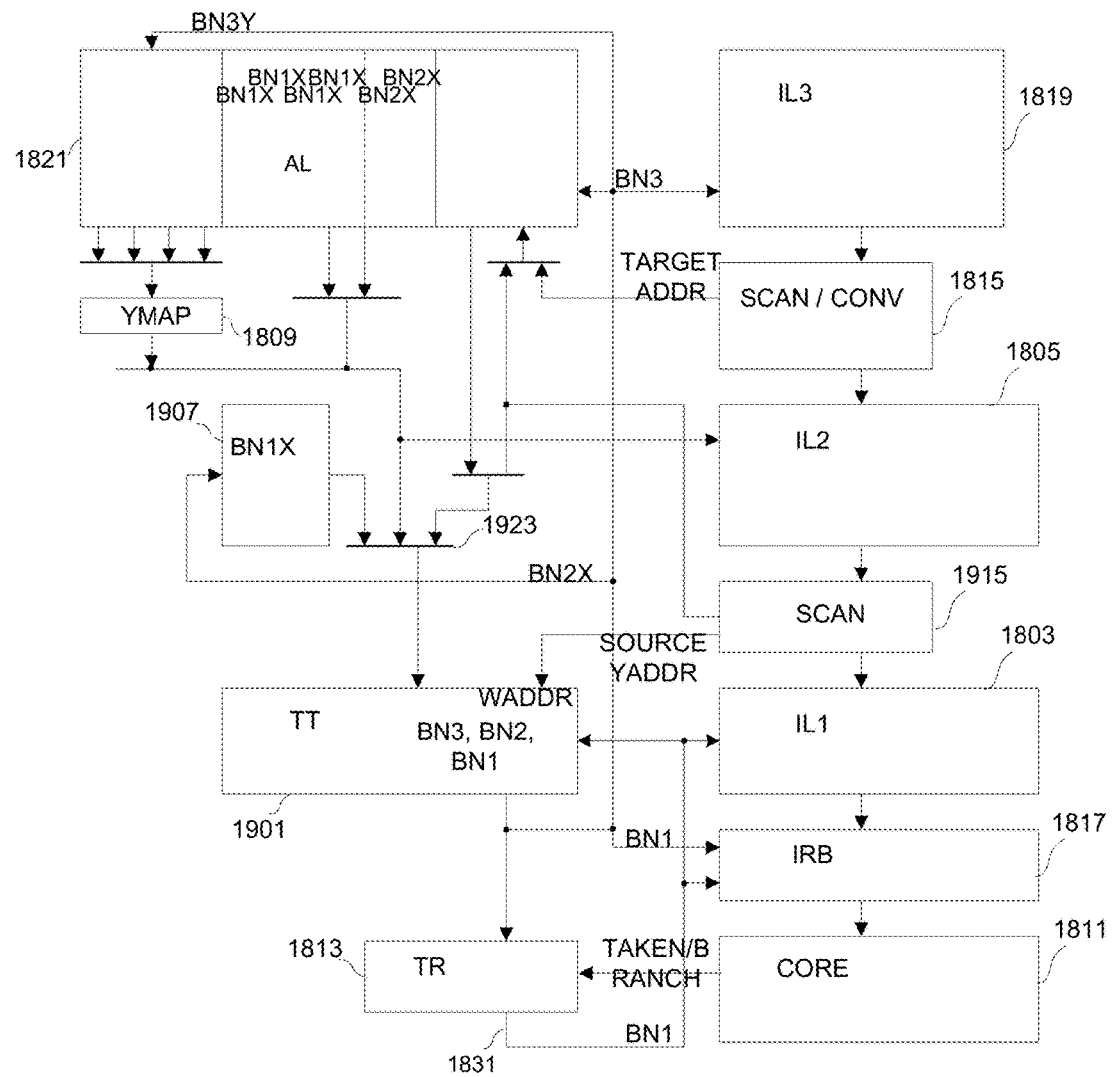
FIG. 19 illustrates another processor system containing multi-level cache consistent with the disclosed embodiments.

FIG. 19 illustrates another processor system containing multi-level cache consistent with the disclosed embodiments. The processor system includes a L1 track table 1901, a L1 micro-operation memory 1803, a L2 micro-operation memory 1805, a block number memory 1907, a mapping module 1809, a tracker 1813, a scan converter 1815, a scanner 1915, a micro-operation read buffer 1817, a L3 instruction memory 1819, a tag memory 1821, and a CPU core 1811. Scanner 1915, L1 track table 1901, L1 micro-operation memory 1803, a tracker 1813, and micro-operation read buffer 1817 constitute a L1 cache system. Scan converter 1815, L2 micro-operation memory 1805, block number memory 1907, and mapping module 1809 constitute a L2 cache system. L3 instruction memory 1819 and tag memory 1821 constitute a L3 cache system.

It should be understood that the various components are listed for illustrative purposes, other components may be included and certain components may be combined or omitted. Further, the various components may be distributed over multiple systems, may be physical or virtual, and may be implemented in hardware (e.g., integrated circuitry), software, or a combination of hardware and software. CPU core 1811, L1 micro-operation memory 1803, L2 micro-operation memory 1805, mapping module 1809, tracker 1813, scan converter 1815, micro-operation read buffer 1817, L3 instruction memory 1819, and tag memory 1821 are the same as the corresponding components in FIG. 18.

L1 track table 1901 is similar to L1 track table 1801 in FIG. 18. There is a one-to-one correspondence between every memory block in L1 micro-operation memory 1803 and every row in L1 track table 1901, and the memory block in L1 micro-operation memory 1803 and the row in L1 track table 1901 are pointed to by the same BN1X. The difference is that the content of the branch point stored in L1 track table 1901 may be position information of the branch target micro-operation in the L1 cache system (i.e., BN1X and BN1Y), or position information of the branch target micro-operation in the L2 cache system (i.e., BN2X and BN2Y), or position information of the branch target micro-operation in the L3 cache system (i.e., BN3X and BN3Y).

In addition, L2 track table 1807 shown in FIG. 18 is not included in FIG. 19. Whereas the block number memory 1907 is configured to store information about the L1 block number corresponding to every L2 block number (that is, information about the L1 block number in L2 track table 1807 in FIG. 18). Scanner 1915 is configured to examine the L1 micro-operation block that is filled from L2 micro-operation memory 1805 to L1 micro-operation memory 1803, create the corresponding track in L1 track table 1901.

Specifically, when the L1 micro-operation block sent from L2 micro-operation memory 1805 is stored into the memory block pointed to by the BN1X which is determined by the replacement algorithm in L1 micro-operation memory 1803, scanner 1915 examines the micro-operation block and calculates the branch target instruction address of the branch micro-operation block. The block address portion of the branch target instruction address is sent to tag memory 1821 to perform a matching operation. The low bit portion of the branch target instruction address is the instruction offset address BN3Y.

If the matching operation is successful in tag memory 1821 and BN3X is obtained, and the valid BN1X and the corresponding BN2X can be read out (or only valid BN2X can be read out), it indicates that the micro-operation block pointed to by the BN3X and the BN3Y is stored in the L1 cache system (or the L2 cache system). Based on the mapping relationship in the row pointed to by the BN2X in mapping module 1809, the BN3Y is converted to the BN1Y (or BN2Y). The BN1X and the BN1Y (or the BN2X and the BN2Y) are selected by selector 1823 and then used as the content of the track point. The content of the track point is stored into the track point in L1 track table 1801.

If the matching operation is unsuccessful in tag memory 1821, it indicates that the micro-operation block corresponding to the branch target instruction block is not stored in the L1 or L2 cache system. At this time, the branch target instruction address is sent to the lower level memory. When the branch target instruction block is filled into the memory block pointed to by the BN3X which is determined by the replacement algorithm in L3 instruction memory 1819, the BN3X and the BN3Y are selected by selector 1923 and then used as the content of the track point. The content of the track point is filled into the track point in L1 track table 1901.

When the read pointer of tracker 1813 points to the branch point in L1 track table 1901, the content of the branch point is read out. If the content of the branch point is BN1X and BN1Y, it indicates that the branch target micro-operation of the branch instruction is stored in the L1 cache system and can be directly read by CPU core 1811.

If the content of the branch point is BN2X and BN2Y, it indicates that the branch target micro-operation of the branch instruction may be not stored in the L1 cache system. At this point, the BN2X is sent to block number memory 1907 to index the content in block number memory 1907. Based on the BN2Y, the corresponding BN1X in the two BN1X stored in the row is read out. If BN1X read out is valid, it indicates that the micro-operation block is stored in the L1 cache system. At this point, based on the mapping relationship in the row pointed to by the BN2X in mapping module 1809, the BN2Y is converted to the BN1Y. The BN1X and the BN1Y are selected by selector 1923 and then used as the content of the track point. The content of the track point is filled into the track point in L1 track table 1901. If the BN1X read out is invalid, it indicates that the micro-operation block is not stored in L1 cache system. At this time, the corresponding L1 micro-operation block in the L2 micro-operation block pointed to by the BN2X in L2 micro-operation memory 1805 is filled into the memory block pointed to by the BN1X which is determined by the replacement algorithm in L1 micro-operation memory 1803. Scanner 1915 is configured to examine the micro-operation block and create the corresponding track in the row pointed to by the BN1X in L1 track table 1901. At the same time, based on the mapping relationship pointed to by the BN2X in mapping module 1809, BN2Y is converted to BN1Y. During the process, the BN1X and the BN1Y are selected by selector 1923 and then used as the content of the track point. The content of the track point is filled into the branch point in L1 track table 1901.

If the content of the branch point read out is BN3X and BN3Y, it indicates that the branch target micro-operation of the branch instruction may be not stored in the L1 cache system (or the L2 cache system). At this point, the BN3X is sent to tag memory 1821 to index tag memory 1821. Based on the BN3Y, the corresponding BN1X and BN2X are read out from the four BN1X and two BN2X stored in the row. If the BN1X read out is valid (at this time, BN2X is also valid), it indicates that the micro-operation block is stored in the L1 cache system. At this point, based on the mapping relationship in the row pointed to by the BN2X in mapping module 1809, the BN3Y is converted to the BN1Y. The BN1X and the BN1Y are selected by selector 1923 and then used as the content of the track point. The content of the track point is filled into the branch point in L1 track table 1901. If BN1X read out is invalid but the BN2X read out is valid, it indicates that the micro-operation block is stored in the L2 cache system. At this time, the L1 corresponding micro-operation block in the L2 micro-operation block pointed to by the BN2X in L2 micro-operation memory 1805 is filled into the memory block pointed to by the BN1X which is determined by the replacement algorithm in L1 micro-operation memory 1803. Scanner 1915 is configured to examine the micro-operation block and create the corresponding track in the row pointed to by the BN1X in L1 track table 1901. At the same time, the BN1X is filled into the corresponding position in the row pointed to by the BN3X in the tag memory. Based on the mapping relationship in the row pointed to by the BN2X in mapping module 1809, the BN3Y is converted to the BN1Y. The BN1X and the BN1Y are selected by selector 1923 and then used as the content of the track point. The content of the track point is filled into the branch point in L1 track table 1901. If BN2X read out is invalid, it indicates that the micro-operation block is not stored in the L2 cache system. At this time, scan converter 1815 is configured to examine and convert the corresponding L2 instruction block in the L3 instruction block pointed to byte BN3X in L3 instruction memory 1819. The L2 micro-operation block obtained by the conversion operation is filled into the memory block pointed to by the BN2X determined by the replacement algorithm in L2 micro-operation memory 1805. The mapping relationship obtained by the conversion operation is store in the row pointed to by the BN2X in mapping module 1907. During the process, according to the previously described method, the obtained branch target instruction blocks of the branch micro-operation are filled into L3 instruction memory 1819. Then, according to the previously described method, the L2 micro-operation block is filled into L1 micro-operation memory 1803 to obtain the corresponding BN1X and BN1Y. The BN1X and the BN1Y are selected by selector 1923 and then used as the content of the track point. The content of the track point is filled into the branch point in L1 track table 1901. In addition, the BN1X and the BN2X are stored into the row pointed to by the BN3X in tag memory 1821, and the BN1X is stored into the row pointed to by the BN2X in block number memory 1907.

Other operations are the same as the corresponding operations shown in the previous embodiments, which are not repeated herein.

The disclosed system and method in FIG. 18 or FIG. 19 can be extended to apply to a system with more levels of cache to improve overall system efficiency.

During the process that a converter converts an instruction to a micro-operation block, a corresponding relationship between an instruction block offset and the micro-operation block offset is filled into mapping module 107. Specifically, the corresponding relationship is created by determining the starting address of every instruction in the instruction block. The format of the mapping module shown in FIG. 5C is used as an example herein. It is assumed that an instruction block consists of 8 bytes (the No. 0 byte to the 7th byte from left to right), while a micro-operation block consists of 6 micro-operations (the No. 0 micro-operation to the 5th micro-operation from left to right). The mapping module with other formats (e.g., the format of the mapping module in FIG. 5A or FIG. 5B) can be obtained according to this method.

Figure 20A:
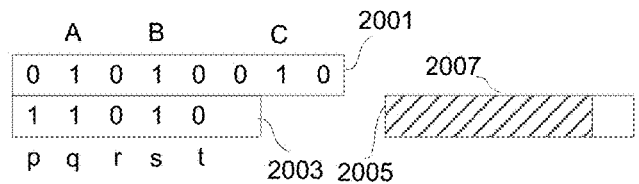
FIG. 20A illustrates a schematic diagram of an exemplary process for generating a mapping relationship consistent with the disclosed embodiments.

FIG. 20A illustrates a schematic diagram of an exemplary process for generating a mapping relationship consistent with the disclosed embodiments. As shown in FIG. 20A, in a mapping module, two rows (e.g., row 2001 and row 2003) constitute a set of mapping relationship that corresponds to a row (e.g., row 2005) in micro-operation memory 103. Every entry in row 2001 in every set of mapping relationship corresponds to the instruction block offset. That is, the number of entries in every row in the mapping module is the same as the number of bytes contained in the instruction block. The No. 0 entry to the 7th entry in row 2001 from left to right correspond to the No. 0 byte to the 7th byte in the instruction block from left to right, respectively. Every entry in row 2003 corresponds to a micro-operation in row 2005. That is, the No. 0 entry to the 5th entry in row 2003 from left to right correspond to the No. 0 micro-operation to the 5th micro-operation in row 2005 from left to right, respectively. In row 2001 and row 2003, the most left entry is least significant bit (LSB) of the address, and the most right entry is most significant bit (MSB) of the address.

The instruction set may include instructions having different length. The instruction block corresponding to row 2001 includes 3 instructions (that is, instruction A occupies 2 bytes; instruction B occupies 3 bytes; instruction C occupies 2 bytes), and the first byte in the instruction block belongs to the last instruction in the previous instruction block in order. The corresponding instruction A in row 2001 is converted to one micro-operation (micro-operation p). The corresponding instruction B in row 2001 is converted to two micro-operations (micro-operation q and micro-operation r). The corresponding instruction C in row 2001 is converted to two micro-operations (micro-operation s and micro-operation t). Therefore, values of the 1st entry, the 3rd entry, and the 6th entry are '1' in row 2001 and values of other entries in row 2001 are '0'; values of the No. 0 entry, the 1st entry, and the 3rd entry are '1' in row 2003 and values of other entries in row 2003 are '0'. Every entry in row 2003 corresponds to every micro-operation in row 2005 in micro-operation memory 103, so row 2005 includes 5 micro-operations (as shown in shaded area 2007 in FIG. 20A).

Figure 20B:
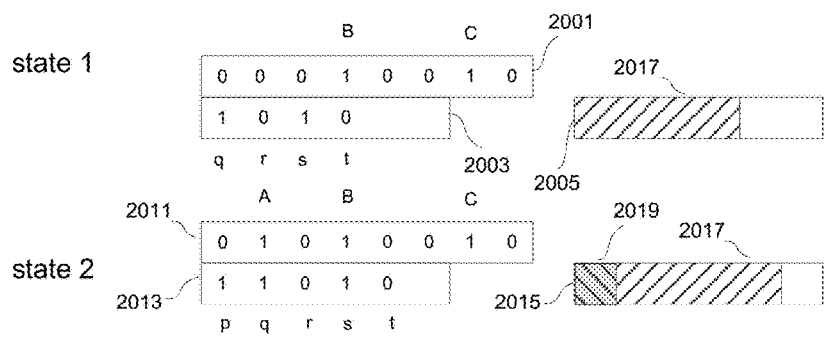
FIG. 20B illustrates a schematic diagram of another exemplary process for generating a mapping relationship consistent with the disclosed embodiments.

FIG. 20B illustrates a schematic diagram of another exemplary process for generating a mapping relationship consistent with the disclosed embodiments. As shown in FIG. 20B, it is assumed that a branch target instruction is instruction B. That is, a branch target address is an address (i.e., the third byte in an instruction block) corresponding to instruction B, and this is the first branch that uses the instruction block as a branch target. Instruction B and instruction C may be found from the addresses, and the length of the two instructions may be obtained, respectively. Specifically, when the converter converts the instruction block containing the branch target instruction, the branch target instruction address (that is, the 3rd byte) is the starting position of an instruction (that is, instruction B). The subsequent part of the instruction block starting from the position is detected. It can be found that the 4th byte and the 5th byte also belong to instruction B; the 6th byte is the starting position of instruction C; and the 7th byte also belongs to instruction C. Therefore, '10010' is filled into positions starting from the 3rd entry in row 2001 in the mapping module, indicating the byte positions corresponding to instruction B and instruction C.

Meanwhile, according to the above described method, the converter converts respectively instruction B and instruction C to two micro-operations, and obtains the corresponding relationship '1010'. The corresponding relationship '1010' is filled into positions starting from LSB of the address in row 2003, as shown in state 1 in FIG. 20B. Because this is the first branch that uses the instruction block as a branch target, other entries in row 2001 and row 2003 are filled into '0'. Based on the method described in FIG. 5C, through counting respectively the number of '1' in row 2001 and row 2003, the instruction block offset can be converted to the micro-operation block offset. Accordingly, 4 micro-operations obtained by the conversion operation are also filled into the positions starting from LSB of the address in row 2005 in the micro-operation memory (as shown in shaded area 2007 in FIG. 20B).

Then, it is assumed that the branch target instruction of the branch instruction is the instruction (e.g., instruction A) in the instruction block that is not converted and not filled into the micro-operation memory. There are two processing methods. The first method is that the converter starts to repeat the above process from the position (i.e., the 1st byte) corresponding to instruction A. That is, after the converter detects respectively the starting position and the length of instruction A, instruction B and instruction C, the obtained '1010010' is filled into the positions starting from the entry (i.e., the 1st entry) corresponding to instruction A in row 2001. The micro-operation corresponding relationship '11010' obtained by the conversion operation is also filled into the positions starting from LSB of the address in row 2003 in the micro-operation memory, and the remaining entries of row 2001 and row 2003 are filled with zeros. The 5 micro-operations obtained by the conversion operation are also filled into positions starting from LSB of the address in row 2005 in the micro-operation memory to cover respectively the previous content in row 2001, row 2003 and row 2005. At this time, the content in row 2001, row 2003 and row 2005 are shown as row 2011, row 2013 and row 2015 in state 2 in FIG. 20B, respectively. Shaded area 2017 in row 2015 stores the 4 micro-operations corresponding to instruction B and instruction C. Shaded area 2019 in row 2015 stores the 1 micro-operation corresponding to instruction A.

The second processing method is that the difference value (that is, '2') of the instruction byte between the position (that is, '3') of the 1st '1' in row 2001 and the byte position (that is, '1') of the current branch target instruction in the instruction block is calculated. The converter converts the continuous bytes starting from the byte position (that is, '1') of the branch target instruction in the instruction block to the micro-operations, where the number of the continuous bytes is the calculated difference value of the instruction byte. Two shifters (not shown in FIG. 20B) use respectively the number of micro-operations (that is, '1') obtained by the conversion operation as the number of shifting bits to shift row 2003 and row 2005 to the right (that is, shift right by 1 position, respectively). The corresponding relationship is filled into the empty positions starting from LSB of the address in row 2003, where the empty positions are obtained by the right shift operation. The micro-operations obtained by the conversion operation are filled into the empty positions from LSB of the address in row 2005, where the empty positions are obtained by the right shift operation. At the same time, the converter detects the starting position and the length of instruction A and obtains '10'. The obtained '10' is filled into the positions starting from the entry (i.e., the 1st entry) corresponding to instruction A in row 2001, and the content of the remaining entries keeps unchanged. Thus, the obtained result is the same as the result in the first method as shown in row 2011, row 2013, and row 2015 in state 2 in FIG. 20B. Or, a register (not shown in FIG. 20B) records the starting instruction byte position every conversion operation. When the next conversion operation is performed, the previously recorded starting instruction byte position minus the current starting instruction byte position obtains the difference value of the instruction byte. The subsequent operations are performed according to the above method, which are not repeated herein.

When the scanner examines the branch instruction, based on the currently stored address corresponding relationship, the obtained branch target instruction address is sent to the mapping module and converted to the micro-operation address. Every micro-operation address corresponds to one micro-operation in the micro-operation memory. The micro-operation addresses are also stored into the track table for directly calling the micro-operation addresses when a branch is taken in the future. Therefore, after row 2015 in the micro-operation memory is shifted to the right, the micro-operation address corresponding to the micro-operation (e.g., 'q', 'r', 's', and 't') is also changed. At this point, the content of the track points in the track table of the branch micro-operations using these micro-operations (that is, 'q' and 's') as the branch targets must be accordingly modified, ensuring that the branch targets BN contained in the track points of the branch micro-operations point to the shifted micro-operations. Thus, based on the content of the track points outputted by the track table, the correct micro-operations can be directly found in the micro-operation memory.

If some instructions in the instruction block are converted and the branch target instructions of one or more branch instructions in the instruction block are the instructions that are not converted and not filled into the micro-operation memory, the corresponding content of the mapping module, the micro-operation memory and the track table can be updated based on the above method, ensuring that the correct micro-operation can be found in the micro-operation memory after the instruction block offset is correctly mapped to the micro-operation block offset.

In addition, during the process of creating the track on the micro-operation block, when the BNY address of the first micro-operation of the next micro-operation block is generated, whether the position of the next byte of the last byte of the last instruction of the current micro-operation block is '1' in row 2001 corresponding to the next micro-operation block is detected. If the position of the next byte of the last byte of the last instruction of the current micro-operation block is not '1', the conversion operation is further performed according to the previous method. If the position of the next byte of the last byte of the last instruction of the current micro-operation block is '1', the block offset of the first micro-operation of the next micro-operation block is stored in the BNY of the ending track point in the micro-operation block being processed currently.

After a corresponding relationship is created in the mapping module, when the subsequent instruction blocks are converted into the micro-operations, the branch offset (in bytes) of the branch instruction is calculated and converted into micro-operation addresses, and the micro-operation addresses are stored into the track table. The method that instruction block address of the branch target address is converted to the micro-operation block address is described in the embodiments in FIG. 1 and FIG. 2. The method that an address converter in the instruction block determines the micro-operation block offset BNY using the corresponding relationship in FIG. 20A is described as the followings.

Figure 20C:
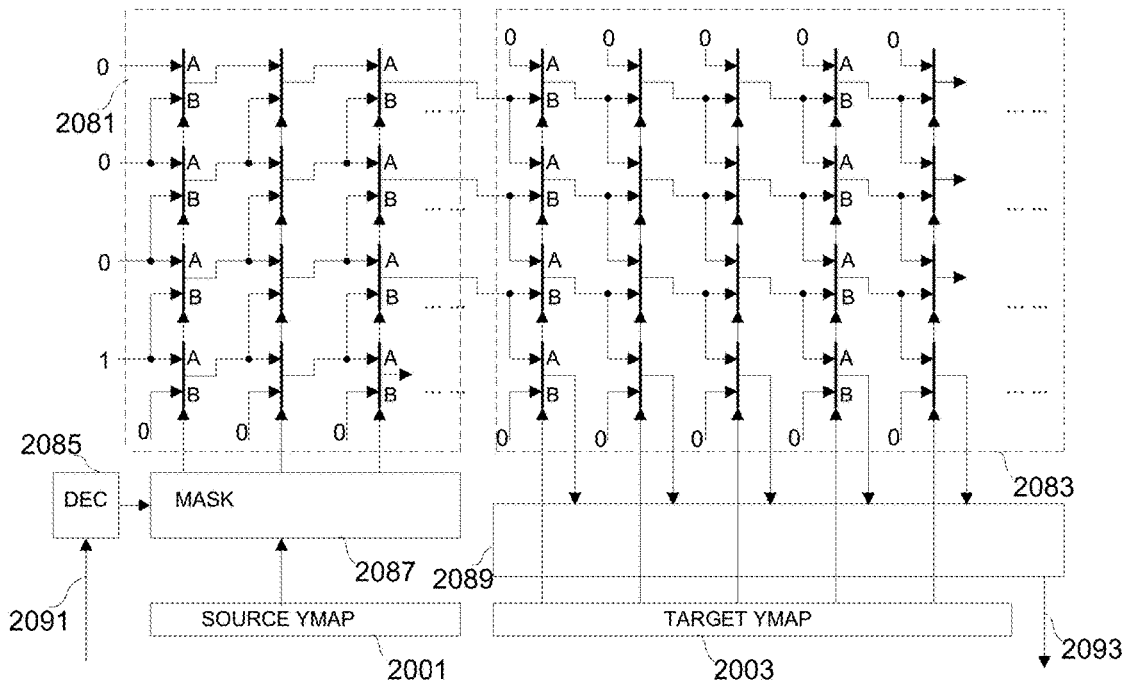
FIG. 20C illustrates an exemplary address converter in the instruction block consistent with the disclosed embodiments.

FIG. 20C illustrates an exemplary address converter in the instruction block consistent with the disclosed embodiments. The process for converting an external instruction offset address to an internal instruction offset address is used as an example herein. The format of the mapping relationship sent from the mapping module is shown in FIG. 20A.

The number of columns in the selector in selector array 2081 is the same as the number of offset addresses contained in the external instruction block, and the number of rows in the selector in selector array 2081 is the number of columns added by one, i.e., 9 rows and 8 columns. For clarity, FIG. 20C only shows 4 rows and 3 columns, which are the first 4 rows from bottom to top and the first 3 columns from left to right, respectively. A row number of the row on the bottom is 0, and the row numbers of the rows from bottom to top are increased by 1 in order. The column number of the column on the left most is 0, and the column numbers of the columns from left to right are increased by 1 in order. Each column corresponds to an external instruction offset address. Input A and input B of every selector in the No. 0 column are '0', except the input A of selector in No. 0 column and No. 0 row is '1'. Input B of every selector in the No. 0 row is '0'. Input A of every selector in other columns is from the output of the selector in the previous column and in the same row, and input B of every selector in other columns is from the output of the selector in the previous column and the immediate lower row.

The structure of selector array 2083 is similar to the structure of selector array 2081. The number of the rows in selector array 2083 is the same as the number of the rows in selector array 2081. The difference is that the number of columns in the selector in selector array 2083 is the same as the number of instructions contained in the internal instruction block, that is, 6 columns. Similarly, for clarity, FIG. 20C only shows 4 rows and 5 columns, which are the first 4 rows from bottom to top and the first 5 columns from left to right, respectively. The naming of the row number and the column number in selector array 2083 is the same as that in selector array 2081. In addition, input B of every selector in the No. 0 row in selector array 2083 is '0'. Input A of every selector in the topmost row (the topmost row should be the 8th row, but the in FIG. 20C the 4th row is the topmost row illustration purpose) is '0', and the output of every selector in the No. 0 row (the bottom row) is sent to encoder 2089 to perform an encoding operation according to the position of the output column which has the value '1'. Input A of any other selector is from the output of the selector in the previous column and in the immediate upper row, and input B of any other selector is from the output of the selector in the previous column and in the same row. Input A in the No. 0 column is from the output of the selector in the immediate upper row in the selector array 2081, and input B in the No. 0 column is from the output of the selector in the same row in the selector array 2081.

Decoder 2085 decodes an external instruction offset address 2091 to obtain a mask value. The mask value is sent to masker 2087. Because one external instruction block contains 8 offset addresses, the width of the mask value is 8-bit, where the value of the mask bit corresponding to the external instruction offset address and the values of the mask bits before the mask bit are '1', and the values of the mask bits following the mask bit corresponding to the external instruction offset address are '0'. Then, perform a bitwise AND operation on the mask value and row 2001 in the mapping relationship sent from the mapping module. Thus, part the values on row 2001 on and before the offset address of the external instruction are preserved, and the part of are cleared to zero. An 8-bit control word is obtained and sent to selector array 2081.

Each bit of the 8-bit control word controls the selectors in one column in selector array 2081. When the bit is '1', every selector in the corresponding column selects input B; when the bit is '0', every selector in the corresponding column selects input A. That is, for the selectors in every column in selector array 2081, if the corresponding control bit is '1', the output of the selector in the previous column and the immediate lower row is selected as the input, such that all outputs of the selectors in the previous column shifted up by one row and the bottom row filled with '0' are used as the outputs of the selectors in the current column; if the corresponding control bit is '0', the output of the selector in the previous column and the same row is selected as the input, such that all outputs of the selectors in the previous column are used as the outputs of the selectors in the current column. Thus, the number of the rows that are shifted up for the inputs of selectors in the first column in selector array 2081 is the same as the number of '1' in the control word. That is, the only one '1' in the inputs of selector array 2081 is shifted up by the corresponding number of rows. Because the number of columns and the number of rows in selector array 2081 are equal to the number of offset addresses contained in the external instruction block, the output of selector array 2081 contains only one '1', and the position of the '1' in the row is determined by the number of '1' in the control word.

Meanwhile, row 2003 in the mapping relationship sent from the mapping module is used as the control word and sent to selector array 2083. Selector array 2083 is similar to selector array 2081. Every bit of the 8-bit control word controls the selectors in one column in selector array 2083. When the bit is '1', every selector in the corresponding column selects input A; when the bit is '0', every selector in the corresponding column selects input B. That is, for the selectors in every column in selector array 2083, if the corresponding control bit is '1', the output of the selector in the previous column and the upper row is used as the input, such that all outputs of the selectors in the previous column shifted down by one row and the topmost row filled with '0' are selected as the outputs of the selectors in the current column; if the corresponding control bit is '0', the output of the selector in the previous column and the same row is used as the input, such that all outputs of the selectors in the previous column are selected as the outputs of the selectors in the current column. Thus, the input of selector array 2083 is shifted down by one row every time encounters a '1' in the control word. That is, the only one '1' of the input is shifted down by one row. Therefore, when encoder 2089 receives '1' sent from the bottom row of selector array 2083, according to the position of the column containing the '1', the corresponding internal instruction offset address 2093 is generated.

Taking the mapping relationship in FIG. 20A as an example, if the value of the external instruction offset address 2091 is '3' (the fourth byte in the external instruction block, i.e., instruction B), the mask value outputted by mask 2087 '11110000' and '01010010' in row 2001 are bitwise AND together to obtain the value '01010000', which has two '1' in the control word. Thus, the '1' in the input of selector array 2081 is shifted up by 2 rows. That is, '1' outputted by selector array 2081 is in the No. 2 row. Therefore, the '1' reaches encoder 2089 after the '1' passes selector columns corresponding to 2 control bits with value '1' in selector array 2083. Because the value in row 2003 is '11010', input '1' is shifted down by one row in the No. 0 column and the 1st column in selector array 2083, respectively. Finally, the value outputted from the 1st column to encoder 2089 is '1', which corresponds to the second instruction in the internal instruction block (offset address is '1'). Encoder 2089 obtains '1' based on the encoding. Therefore, the value '3' of the external instruction offset address is converted to internal instruction q's offset address '1'. Then the value '1' of the internal instruction offset address is outputted via bus 2093.

When a branch instruction is converted to the corresponding micro-operation, the micro-operation block address BNX is the same as the instruction block address. For the micro-operation block offset BNY, according to the micro-operation block address BNX, the corresponding relationship read out from the mapping module is respectively used as content of row 2001 and content of row 2003 and sent to the address converter in the instruction block. The instruction block offset is inputted via bus 2091, and the micro-operation block offset BNY is outputted via bus 2093. The BNX and the BNY are stored into the track table as BN.

Figure 20D:
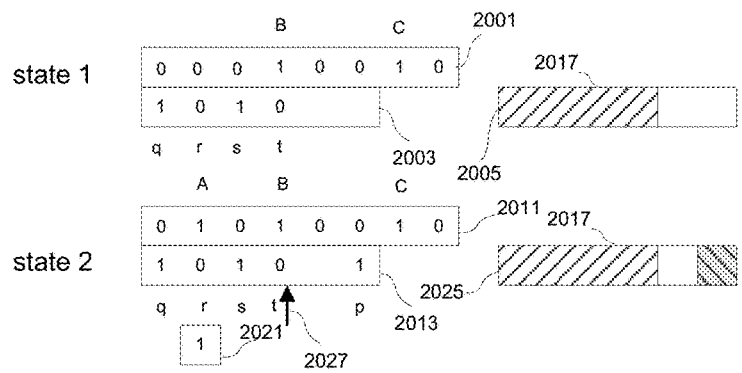
FIG. 20D illustrates a schematic diagram of another exemplary process for generating a mapping relationship consistent with the disclosed embodiments.

FIG. 20D illustrates a schematic diagram of another exemplary process for generating a mapping relationship consistent with the disclosed embodiments. FIG. 20D is similar to FIG. 20B. The corresponding relationship obtained and the micro-operation block are filled into the positions starting from LSB of the address in row 2003 and row 2005, respectively. The difference is that an ending point in row 2003 is recorded in FIG. 20D.

The first conversion process for certain instruction block is the same as the process in FIG. 20B. However, in the next conversion process, the content of row 2001 and the content of row 2003 do not need to be shifted to the right, but new content is directly filled into unused entries and the corresponding filling position information is recorded and updated. When the instruction block offset needs to be mapped to a micro-operation block offset, based on the previously recorded filling position information and the corresponding relationship stored in row 2001 and row 2003 in the mapping module, the address mapping operation is performed. Further, because the content stored in the micro-operation memory is not shifted to the right, the content of the track point of the branch micro-operation stored in the track table does not need to be changed.

Specifically, the process for taking two branches (instruction B is used as a branch target instruction at the first time, and instruction A is used as a branch target instruction at the second time) shown in FIG. 20B is used as an example herein. The filling process in row 2001 in the mapping module in FIG. 20D is the same as the filling process in FIG. 20B. As shown in state 1 in FIG. 20D, when processing the first branch, the obtained position information '10010' is filled into the positions starting from the third entry in row 2001 in order, and other entries is filled with zeros. As shown in state 2 in FIG. 20D, when processing the second branch, the obtained position information '10' is filled into the positions starting from the first entry in row 2011 in order, and the content of other entries keeps unchanged.

As shown in row 2003 and row 2005 in state 1 in FIG. 20D, for row 2003 in the mapping module, the filling process for processing the first branch is the same as the filling process for processing the first branch in FIG. 20B. In addition, when processing the first branch, an ending position (as used herein, the ending position is '3', the position pointed to by pointer 2027 in FIG. 20D) of the micro-operations in row 2003 (or row 2005) also needs to be recorded. When the read pointer of the tracker points to the ending position of the track table, it indicates that the pointer reaches the last micro-operation in the micro-operation block. Then, the read pointer of the tracker points to the track corresponding to the next micro-operation block in address order.

When processing the second branch, at the beginning, as shown in FIG. 20B, based on the obtained difference value of the instruction byte, the converter converts the continuous bytes (that is, the first and the second byte) starting from the byte position (that is, '1') of the branch target instruction in the instruction block to the micro-operations, where the number of the continuous bytes is the calculated difference value of the instruction byte. The obtained corresponding relationship (that is, '1') is filled into the positions starting from MSB of the address in row 2003 as shown row 2023 in state 2 in FIG. 20D. Accordingly, as shown row 2025 in state 2 in FIG. 20D, the micro-operation 'p' obtained by the conversion operation corresponding to instruction A is filled into the corresponding position (the rightmost entry) in row 2005 in the micro-operation memory.

The count (that is, '1') filled starting from MSB of the address also needs to be recorded, such that the count is used as a shift amount when the mapping module converts the instruction block offset to the micro-operation block offset, as shown in shift amount 2021 in FIG. 20D. The shift amount 2021 is the count of rotate left of the starting micro-operation in the row. Shift amount 2021 is '1' herein. That is, the first micro-operation in the row that should be in LSB position is shifted left by one bit to MSB position. Thus, the complete address corresponding relationship for the two branches is created in the mapping module. In addition, MSB (i.e., the 5th entry) of the address in row 2013 (or row 2025) may not correspond to the last micro-operation in the micro-operation block (the actual position of the last micro-operation is pointed to by pointer 2027). Therefore, as long as pointer 2027 does not point to MSB of the address, after a tracking operation is performed on the micro-operation corresponding to MSB of the address and the corresponding value is outputted, the tracker continues to perform a tracking operation starting from LSB of the address (i.e., the No. 0 entry) in the same row (track).

When the track table outputs the content of the branch track point, based on the first address in the content, the corresponding relationship can be found in the mapping module. Based on the corresponding relationship, the address converter in the instruction block converts the second address (i.e., the byte address of the instruction) to the micro-operation address, such that the correct micro-operation can be found in the micro-operation memory. Specifically, the corresponding relationship contained in row 2011 and row 2023 corresponding to the first address is used as an example herein. For example, when an address conversion operation is performed in the mapping module, at the beginning, values in row 2011 and row 2023 are read out. Then, based on shift amount 2021, a shifter (not shown in the Figure) rotates the value in row 2023 to the right. The block offset address converter shown in FIG. 20C converts the instruction block offset to a corresponding value which is outputted via bus 2093. Finally, the length of the micro-operation block is used as a modulus. The modulus outputted by bus 2093 minus shift amount 2021 obtains an actual position of the micro-operation corresponding to the instruction block offset in row 2025 in the micro-operation memory.

The process in row 2011, row 2013, row 2025 and shift amount 2021 in FIG. 20D is used as an example. If the branch target of certain branch instruction is instruction A, the scanner examines instruction A and generates the instruction block offset ('1'). After the values in row 2011 and row 2013 are read out, based on the value ('1') of shift amount 2021, the content in row 2013 is rotated to the right by one bit via a shifter to obtain '11010'. The obtained '11010' and '01010010' in row 2011 are sent to the address converter in the instruction block. After the address converter in the instruction block converts the inputted instruction block offset ('1'), '0' is outputted from bus 2093. Because the length of the micro-operation block is 6, modulus '6' minus shift amount 2021'1' (for '0' outputted by bus 2093) obtains '5'. The obtained '5' represents that the fifth micro-operation in row 2025 corresponds to instruction A. Thus, the obtained '5' may be used as the second address of the branch target micro-operation of the branch micro-operation corresponding to the branch instruction and written into the corresponding track point in the track table. Then, based on the content of the track point outputted by the track table, the micro-operation can be directly found, without updating repeatedly the content in the track table as shown in FIG. 20B.

Figure 20E:
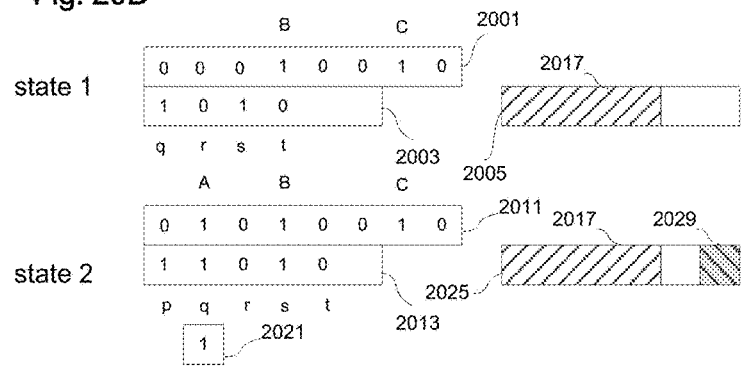
FIG. 20E illustrates a schematic diagram of another exemplary process for generating a mapping relationship consistent with the disclosed embodiments.

FIG. 20E illustrates a schematic diagram of another exemplary process for generating a mapping relationship consistent with the disclosed embodiments. The process in FIG. 20E is implemented by combining the process in FIG. 20B and the process in FIG. 20D. That is, the address corresponding relationship is created in the mapping module and shift amount is recorded using the method in FIG. 20B; the content of the track point is stored in track table and the micro-operation is stored in the micro-operation block using the method in FIG. 20D. Thus, after processing the first branch, the content stored in the mapping module is shown in row 2001 and row 2003 in state 2 in FIG. 20E, and the content stored in the micro-operation memory is shown in row 2005 in state 2 in FIG. 20E. After processing the second branch, the content stored in the mapping module is shown in row 2011 and row 2013 in state 2 in FIG. 20E, and the content stored in the micro-operation memory is shown in row 2025 in state 2 in FIG. 20E. The number of the recorded shifting bits is shown in row 2021 in FIG. 20E. The micro-operation position information stored in row 2013 in the mapping module is the shifted position information (aligned by LSB), whereas the track point stored in the track table is not the shifted track point and the micro-operation stored in the micro-operation is not the shifted micro-operation.

When the mapping module converts the address, the values of row 2011 and row 2023 are read out and sent to the address converter in the instruction block in FIG. 20C. Then, based on the method in FIG. 20D, the corresponding operation is performed on the output of bus 2093 of the address converter in the instruction block to obtain the micro-operation block offset. Based on the micro-operation block offset, row 2025 in the micro-operation memory is indexed to read out the corresponding micro-operation.

Thus, in FIG. 20B, the corresponding shift operation is possibly performed in the process for creating the address corresponding relationship and filling the micro-operation. The corresponding shift operation does not need to be performed in the process for converting the address using the address corresponding relationship and reading out the micro-operation. In FIG. 20D, in the process for creating the address corresponding relationship, filling the micro-operation and reading out the micro-operation, the shift operation does not need to be performed. In the process for converting the address using the address corresponding relationship, the corresponding shift operation possibly need to be performed. In FIG. 20E, in the process for creating the address corresponding relationship, the corresponding shift operation possibly need to be performed. In the process for filling the micro-operation, converting the address using the address corresponding relationship, and reading out the micro-operation, the shift operation does not need to be performed. Therefore, based on specific situations, different methods are selected.

In addition, using the methods shown in FIG. 20B and FIG. 20E, because the shift operation is performed when the address corresponding relationship is created, the address corresponding relationship is aligned based on LSB. The second address (BNY) in the ending track point corresponding to the sequential previous instruction block must be '0'. However, using the method shown in FIG. 20D, the address corresponding relationship is not aligned based on LSB, so the second address (BNY) in the ending track point corresponding to the sequential previous instruction block may be not '0'. For example, in FIG. 20D, the position of the first micro-operation in the micro-operation block corresponds to the 5th entry in row 2023. The second address (BNY) in the ending track point corresponding to the sequential previous instruction block is '5'.

Figure 20F:
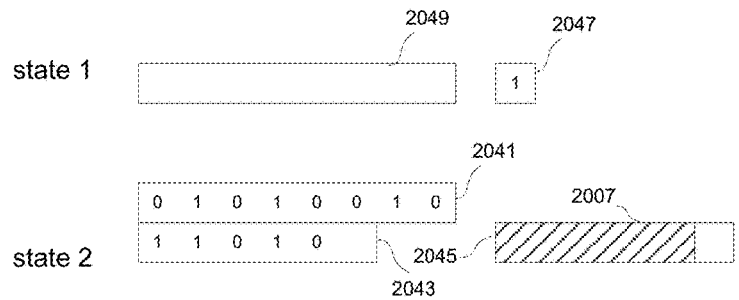
FIG. 20F illustrates a schematic diagram of an exemplary process for generating a mapping relationship for the next sequential instruction block consistent with the disclosed embodiments.

FIG. 20F illustrates a schematic diagram of an exemplary process for generating a mapping relationship for the next sequential instruction block consistent with the disclosed embodiments. As shown in FIG. 20F, if part of the last instruction in the instruction block is in the next sequential instruction block, part of the content in the next sequential instruction block is assigned to the branch target instruction block. The mapping module not only stores address corresponding relationships but also records the length of the content of the last instruction in every instruction block that locates in the next instruction block. Thus, when the branch target instruction is performed an address mapping operation, the corresponding information of the sequential previous instruction block can be searched in the mapping module. If the corresponding information of the sequential previous instruction block exists in the mapping module, the length recorded in the information can be read out. Based on the length, the starting position of the first instruction in the instruction block can be found in the branch target instruction block. The branch target instruction block is converted starting from the position, avoiding converting the same instruction block multiple times that possibly occurs in FIG. 20B, FIG. 20D, or FIG. 20E.

When instruction B is a branch instruction, at the beginning, the converter searches whether the address corresponding relationship is created for the sequential previous instruction block of the branch target instruction block (i.e., the instruction block containing instruction B) in the mapping module.

If the address corresponding relationship is not created for the sequential previous instruction block, according to the method in FIG. 20B, FIG. 20D, or FIG. 20E, the address corresponding relationship is created in the mapping module and filled into the micro-operation memory. The details are not repeated herein.

If the address corresponding relationship (e.g., row 2049 in FIG. 20F) is created for the sequential previous instruction, the length 2047 of the last instruction in the sequential previous instruction block that is in the next instruction block may be read out. The length 2047 of the last instruction is '1' herein, it indicates that the content of the byte (i.e., the No. 0 byte) containing '1' starting from LSB of the address in the branch target instruction block belongs to the previous instruction block. Therefore, the first instruction in the branch target instruction block starts from the first byte. Thus, the converter may directly convert the instruction starting from the first byte until all instructions in the instruction block is converted completely.

Specifically, because the position of the starting instruction is known, the converter may detect the positions of all the three instructions in the branch target instruction block. The obtained '01010010' is filled into the corresponding positions in row 2001, as shown in row 2041 in FIG. 20F. At the same time, the 5 micro-operations obtained by the conversion operation corresponding to the 3 instructions are filled into the positions starting from LSB of the address in row 2005. The corresponding relationship '10010' obtained by the conversion operation is also filled into the positions starting from LSB of the address in row 2003, as shown in row 2045 and row 2043 in FIG. 20F. If the instructions are converted from one row of instructions to a next row of instructions in order, a starting byte of the next row of instructions may be calculated from a starting position of a last instruction of the row of instructions and the length of the instruction, which is the same as the process in the embodiment.

During the process, if all of the last instruction in the branch target instruction block is in the branch target instruction block, the length corresponding to the branch target instruction block is generated and recorded as '0' for the future use. If part of the last instruction in the branch target instruction block is in the next sequential instruction block, the bytes contained in the part of the last instruction located in the next sequential instruction block is used as the length corresponding to the branch target instruction block and recorded for the future use.

Figure 20G:
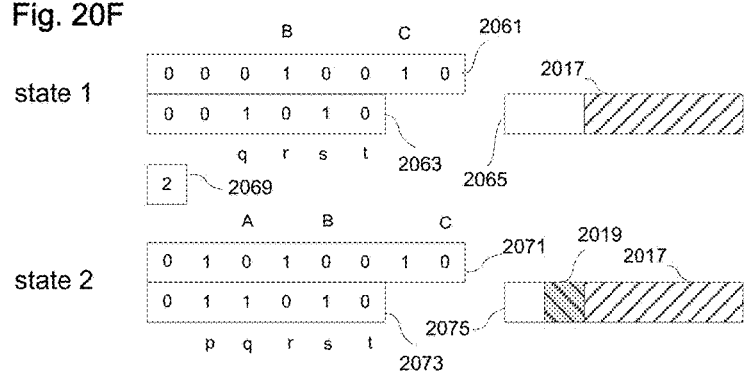
FIG. 20G shows another process for generating a mapping relationship consistent with the disclosed embodiments.

In addition, the above methods can also be improved in order to avoid performing the corresponding shift operation when the address corresponding relationship is created or micro-operations are read out. FIG. 20G shows another process for generating a mapping relationship consistent with the disclosed embodiments. The process for generating a mapping relationship in FIG. 20G is similar to the process in FIG. 20B. Based on positions of branch target instructions, instructions in a branch instruction block are converted and filled into a mapping module and micro-operation memory by segmentation. The difference is that the micro-operation and position information obtained by the conversion operation are filled into the positions starting from MSB of the address in row 2005 and 2003 in reverse order, respectively.

The filling operation in reverse order can be implemented by the following two methods. The filling operation on the micro-operations in reverse order is used as an example herein. In the first method, a converter converts instructions to be converted in the instruction block in order. The corresponding micro-operations are generated in order and stored in a buffer memory (not shown in FIG. 20G). After the last instruction in the instruction block is converted, the filling operations are performed starting from the last micro-operation stored in the buffer memory to MSB of the address in row 2005 in reverse order until all the micro-operations in the buffer memory are filled. In the second method, at the beginning, instructions to be converted are performed instruction parsing operations in order, and the position of the starting byte of every instruction is determined. Then, a converter converts instructions to be converted from the last instruction in the instruction block in reverse order. The corresponding micro-operations are generated in order and the filling operations are performed starting from MSB of the address in row 2005 in the same reverse order until all the instructions to be converted are converted and filled.

The process for taking two branches shown in FIG. 20B is used as an example herein. When processing the first branch, the converter detects the subsequent part of the instruction block starting from instruction B, and finds instruction B and instruction C. The obtained position information '10010' is filled into the positions corresponding to these instructions in row 2001. Meanwhile, according to the above described method, the converter converts instruction B and instruction C to two micro-operations, respectively, and obtains the corresponding relationship '1010'. The corresponding relationship '1010' is filled into the positions starting from MSB of the address in row 2003 in reverse order, and the starting position (i.e., the 2nd entry) for filling the content is recorded. Because this is the first branch that uses the instruction block as a branch target, the other entries in row 2001 and row 2003 are filled with zeros. The result is shown as row 2061 in state 1 shown in FIG. 20G. Based on the method described in FIG. 5C, through counting respectively the number of '1' in row 2001 and row 2003, the instruction block offset can be converted to the micro-operation block offset. Accordingly, the 4 micro-operations obtained by the conversion operation are also filled into the positions starting from MSB of the address in row 2005 in a reverse order in the micro-operation memory shown in shaded area 2017 in row 2065 of state 1 in FIG. 20G.

Similar to the methods shown in FIG. 20B, there are also two processing methods for processing the second branch. In the first method, at the beginning, the converter starts to repeat the above process from the position (i.e., the 1st byte) corresponding to instruction A. That is, after the converter detects respectively the starting position and the length of instruction A, instruction B and instruction C, the obtained '1010010' is filled into the positions starting from the entry (i.e., the first entry) corresponding to instruction A in row 2001. The micro-operation corresponding relationship '11010' obtained by the conversion operation is also filled into the positions starting from MSB of the address in row 2003, and the remaining entries of row 2001 and row 2003 are filled with zeros. The 5 micro-operations obtained by the conversion operation are also filled into the positions starting from MSB of the address in row 2005 in reverse order in the micro-operation memory to cover respectively the previous content in row 2001, row 2003 and row 2005. At this time, the result in corresponding row is shown as row 2071, row 2073 and row 2075 in state 2 in FIG. 20G, respectively. Shaded area 2017 in row 2075 stores the 4 micro-operations corresponding to instruction B and instruction C. Shaded area 2019 in row 2075 stores the 1 micro-operation corresponding to instruction A.

The second processing method is that the last position of every filling operation in row 2061 and row 2063 are recorded in register 2068 and register 2069, respectively (in this case, after performing the first filling operation, the two positions correspond to the starting position of instruction B and the starting position of micro-operation q, respectively), and the converter only converts the instructions until a byte before the last position of the previous filling operation. That is, instruction A is converted. The position information of instruction A is filled into the positions starting from the last position (i.e., the 3rd byte) that is recorded in the previous filling operation in row 2003 in reverse order, and the content of the remaining positions keep unchanged. The corresponding relationship (i.e., '1') obtained by the conversion operation is filled into the positions starting from the last position (i.e., the 2nd byte) that is recorded in the previous filling operation in row 2003 in reverse order, and the content of the remaining positions keep unchanged. At the same time, the micro-operations corresponding to instruction A obtained by the conversion operation are filled into the positions starting from the starting position (i.e., the 2nd byte) that is recorded in row 2005 in reverse order, and the content of the remaining positions keep unchanged. Thus, the obtained result is the same as the result in the first method as shown in row 2071, row 2073, and row 2075 in state 2 in FIG. 20G.

In addition, the address corresponding relationship in FIG. 20G is aligned based on MSB (not LSB), so the position corresponding to the first micro-operation may be not '0'. That is, the second address (BNY) in the ending track point corresponding to the sequential previous instruction block may be not '0'. Specifically, in FIG. 20G, the position of the first micro-operation in the micro-operation block corresponds to the 1st entry in row 2023, therefore the second address (BNY) in the ending track point corresponding to the sequential previous instruction block is '1'. As used herein, the next row address of the ending track point also includes BNY, which is the same as shown in FIGS. 20D and 20E.

The disclosed methods can convert the instructions to the micro-operations. But the disclosed methods may also be extended to instruction conversion among different instruction sets. Based on the address corresponding relationship stored in the mapping module, an offset address converter can convert an instruction block offset of one type instruction (that is, external instruction) to an instruction block offset of another type instruction (that is, internal instruction). The variable length instruction and the micro-operation can be regarded as a special case of the external instruction and the internal instruction, respectively.

Without departing from the spirit and scope of this invention, other modifications, equivalents, or improvements to the disclosed embodiments are obvious to those skilled in the art and are intended to be encompassed within the scope of the present disclosure.

INDUSTRIAL APPLICABILITY

The systems and methods provided in this disclosure can be applied in various applications that need to convert instruction sets. The systems and methods may directly provide the converted instructions for CPU core, reducing the depth of a pipeline and improving efficiency of the pipeline.

What is claimed is:

1. A system for mapping addresses of first instructions of a first instruction set to addresses of second instructions of a second instruction set, comprising:
    a first memory configured to contain first instructions, each first instruction having a corresponding first instruction address in the first memory;
    a converter coupled to the first memory and configured to convert first instructions to second instructions;
    a second memory coupled to the converter and configured to contain second instructions;
    a processor core coupled to the second memory and configured to process the second instructions; and
    a mapping module coupled to the converter, the processor core and the second memory,
    wherein:
    instruction block is a group of contiguous instructions that have the same upper bit portion of instruction address, the upper bit portion of instruction address is a block address, a lower bit portion is a block offset;
    the second memory is configured to be equipped with a plurality of second memory blocks, each second memory block is configured to contain a block of second instructions of the second instruction set, a block of second instructions of the second instruction set corresponds to a block of first instructions of the first instruction set in the first memory, and a block address of first instruction address is capable of addressing a block of second instructions;
    the converter is further configured to extract the block offset mapping relationship between a first instruction of a first instruction block and a corresponding second instruction of a second instruction block; and
    the mapping module is equipped with a storage element configured to contain the extracted block offset mapping relationships of each instruction block.

2. The system according to claim 1, wherein:
    the processor core produces a first instruction address;
    the block address of the first instruction address is configured to address the storage element of the mapping module to select a corresponding stored block offset mapping relationship;
    the mapping module is further configured to map the block offset of the first instruction address to a mapped block offset of the second instruction address based on the selected block offset mapping relationship; and
    the first instruction block address and the mapped second instruction block offset are configured to address the second memory, and the second memory is configured to provide the second instruction of a second instruction set to the processor core.

3. The system according to claim 1, wherein:
    the block offset mapping relationship is configured to be represented by two rows of binary bits;
    each bit in a first row of the two rows corresponds to block offsets of a first instruction in a first instruction block, a bit '1' denotes a block offset from which a first instruction begins, and a bit '0' denotes a block offset from which no first instruction begins;
    each bit in a second row of the two rows corresponds to the block offsets of an second instruction in a second instruction block, a bit '1' denotes a block offset from which a second instruction begins, and a bit '0' denotes a block offset from which no second instruction begins; and
    the converter converts the block offset of a first instruction address by: counting a number of bit '1's starting from one end of the first row of the two rows till the block offset of the first instruction, using a position on the second row of the two rows having the same count of bit '1's starting from the same end as the block offset of the corresponding second instruction address.

4. The system according to claim 3, wherein:
    the mapping module is further configured to map a block offset of a first instruction of a first instruction set to a block offset of a second instruction of a second instruction set based on the two rows of binary bits of the block offset mapping relationship, and the mapping module comprises a masker, a counter, a reverse counter, and an encoder;
    the masker restricts the range of the first row of bits starting from one end to the block offset of the first instruction;
    the counter is configured to include a first selector array which receives the bits within the restricted range of the first row of bits as control bits, with a position indicator initially in a position representing a count number of '0', each of the bit '1's on the first row within the restricted range moves the position indicator to a position representing one higher count number, the position where the position indicator occupies on plurality of output of the first selector array represents the number of first instructions within the restricted range;
    the reverse-counter is configured to include a second selector array which receives the first selector array's valid output indicator position representing the number of first instructions, and receives the second row of bits as control bits, starting from same end as in the first row, each of the bit '1's on second row of the two rows moves the position indicator to a position representing one lower count number, the second selector outputs the position indicator when the count number reaches '0', the position of the position indicator over the plurality of output positions of the second selector array indicates the starting position of the second instruction corresponding to the first instruction; and the encoder is configured to encode the valid output position over the second selector array's plurality of output bits to generate the block offset of the second instruction.

5. The system according to claim 4, wherein:

the first selector array is configured to comprise a plurality of two-input selectors organized as a two-dimensional array;

outputs of each column of selectors are configured to couple to the first inputs of selectors in the same row of the next column of selector array, are also to couple to the second inputs of selectors in an immediate higher row of the next column of selector array; a plurality of control bits each control a column of selectors in the array;

when a control bit is '0', each selector in the corresponding column selects its first input, thereby the column of selectors output the position indictor on the same row;

when a control bit is '1', each selector in the corresponding column selects its second input, thereby the column of selectors output the position indictor in an immediate higher row; and the outputs of the selectors in the last column are configured to be the first selector array output.

6. The system according to claim 4, wherein:

the second selector array is configured to comprise a plurality of two-input selectors organized as a two-dimensional array;

outputs of each column of selectors are configured to couple to the first inputs of selectors in the same row of the next column of selector array, also to couple to the second inputs of selectors in an immediate lower row of the next column of selector array;

the selectors in the first column of the array are configured to receive the row outputs of the first selector array; and each control bit is configured to control selectors in a column in the array;

when a control bit is '0', each selector in the corresponding column selects its first input, thereby the column of selectors output the position indictor in the same row;

when a control bit is '1', each selector in the corresponding column selects its second input, thereby the column of selectors output the position indictor in an immediate lower row; and the outputs of the selectors in the lowest row are configured to be the second selector array output.

7. The system according to claim 1, further comprising a selector, wherein:

the processor core produces a branch decision, a branch target instruction address in the format of a first instruction address, and a sequential instruction address;

the block address of the branch target instruction address is configured to address the storage element of the mapping module to select a stored block offset mapping relationship, and the mapping module is further configured to map the block offset of the branch target instruction address to a mapped block offset of second instruction address based on the selected block offset mapping relationship;

when the branch decision is 'take branch', the selector is configured to select the block address of the branch target instruction address and the mapped block offset of the second instruction to address the second memory;

when the branch decision is 'no branch', the selector is configured to select the sequential instruction address to address the second memory; and the second memory is configured to provide the second instruction of a second instruction set to the processor core.

8. The system according to claim 7, further comprises an ending flag memory;

the ending flag memory is configured to contain positions of the last instruction in each block of second instructions of the second instruction set; and the system is configured to determine whether an instruction is the last instruction in the instruction block of second instructions based on the content of the ending flag memory.

9. The system according to claim 7, wherein:

when a second instruction is not the last instruction in a block of second instructions of second instruction set, the next sequential instruction address is configured to be the unchanged block address of the sequential instruction address, and the block offset of the sequential instruction address with an address increment of the length of the following second instruction; and when a second instruction is the last instruction in a block of second instructions, the next sequential instruction address is configured to be the current instruction block address with an address increment of one block address, and the block offset of the very first second instruction of the next block.

10. The system according to claim 7, wherein:

a direct branch second instruction of the second instruction set is configured to contain a compensated branch offset;

the compensated branch offset is configured to be the summation of the block offset of and the branch offset contained in a direct branch first instruction;

a branch target instruction address in the format of first instruction of a first instruction set is configured to be the summation of a compensated branch offset and a block address of a direct branch second instruction of the second instruction set.

11. The system according to claim 1, wherein: the converter is further configured to convert instructions from a plurality of instruction sets to second instructions in the second instruction set, thereby the system is configured to support a plurality of instruction sets.

12. The system according to claim 1, further comprising:

a scan converter in place of the converter, a track table, and a tracker;

the scan converter is configured as a converter having a scan function;

the scan function is configured at least to calculate the branch target first instruction address;

the mapping module maps the block offset of the target first instruction to block offset of a second instruction based on the block offset relationship, which is contained in the mapping module storage element addressed by the block address of the branch target first instruction;

the track table is a memory configured so each of its memory elements, a track point, corresponds to at least a second instruction in the second memory;

the track point corresponding to a branch second instruction is configured to contain the calculated and mapped branch target address; and the tracker is configured to couple to the track table and to produce an address which addresses the track table to read out a track point.

13. The system according to claim 12, wherein:
when the branch condition from the processor core is 'not to branch', the tracker produced address maintains the same block address unchanged but increases the block offset of the second instruction;
when the branch condition from the processor core is 'branch', the tracker produced address is the address in the track point read out;
the block address of the tracker produced address addresses the second memory to fetch a block of second instructions of the second instruction set;
the block offset of the tracker produced address selects a second instruction from the selected block of second instructions.

14. The system according to claim 12, wherein:
the tracker comprises a shifter, a leading state counter, and an adder to generate a track address following a branch condition and a row of input states;
the entry of the row is configured to use one state to denote a first condition, to use another state to denote a second condition, the tracker generates track address that satisfying the branch condition and the first condition;
the block offset of the track address is configured to control the shifter;
the shifter is configured to receive the row of input states;
the leading state detector is configured to receive the shifter output and obtain a count which is configured to be the number of second condition states prior to the next first condition state;
the adder is configured to sum the count and the track block offset into a next block offset;
when the branch condition is 'not to branch', the track address is the track block address unchanged and the next block offset;
when the branch condition from the core is 'branch', the track address is the address in the track point read out.

15. The system according to claim 1, further including a read buffer:
the read buffer is configured to couple with the second memory and the processor core;
the read buffer is configured to contain at least a block of second instruction and its second address;
the read buffer is further configured to comprise a token passer, the token passer passes a token from an instruction to its sequential next instruction;
the read buffer is configured to compare an incoming second address with the second address of the block of second instruction contained in the read buffer;
when the addresses are matched, a token is inserted to the token passer at a position associated with the matched address;
the read buffer is configured to output the instruction that possess the token.

16. A method for mapping addresses of first instructions of a first instruction set to addresses of second instructions of a second instruction set, including:
storing in a second memory, a plurality of instruction blocks of second instructions converted from first instructions in a first memory, and outputting from the second memory one or more second instructions to a processor core for execution;
defining an instruction block as a group of contiguous instructions that have the same block address, the upper bit portion of instruction address as a block address, the lower bit portion of instruction address as a block offset;
organizing each of the plurality of instruction blocks of second instructions in the second memory such that each of the instruction blocks of second instructions corresponds to an instruction block of first instructions in the first memory; and
extracting and storing a block offset mapping relationship between each first instruction in a block of first instructions in a first memory and a corresponding second instruction in the corresponding instruction block of second instructions in the second memory.

17. The method according to claim 16, further including:
selecting an instruction block of second instructions in the second memory and the block offset mapping relationship of the block based on a block address of the first instruction address;
mapping a block offset of the first instruction address to a mapped block offset of the second instruction address based on the selected block offset mapping relationships;
selecting a second instruction from the selected instruction block of second instructions for the processor core based on the mapped block offset of the second instruction address.

18. The method according to claim 16, wherein:
the second instructions in the second instruction set are micro-operations in a micro-operation set.

19. The method according to claim 16, further including:
mapping the block offset of first instruction to the block offset of the second instruction address by:
counting the number of first instructions in the instruction block starting from one end of the instruction block up to the instruction block offset;
counting the same number of corresponding second instructions in the second instruction block starting from the same end; and
encoding the position of the second instruction last counted as the block offset of the second instruction.

20. The method according to claim 16, wherein:
recording the block offset mapping relationship as two rows of entries;
corresponding each entry in the first-row to a block offset of a first instruction address;
representing the starting position of each first instruction with a first state of a first-row entry, while representing each not starting position of a first instruction with a second state of a first-row entry;
corresponding each entry in the second-row to a block offset of a second instruction address; and
representing the starting position of each second instruction with a second-row entry of a first state, while representing a not starting position of a second instruction with a second-row entry of a second state.

21. The method according to claim 20, further including:
mapping the offset by masking, counting, reverse counting, and encoding;
restricting the range starting from one end of the first row of state to a given block offset of first instruction address by masking;
starting from an initial position, increasing the active signal by one position with each of the starting states on first row of states within the restricted range, this is the counting process;

decreasing the active signal by one position with each of the starting states on second row of states starting from the same end, this is the reverse counting process;

designating the last starting state on second row of states that returns the active signal to its initial positions the second instruction corresponding to the given first instruction; and encoding the designated position as the block offset of the second instruction address.

22. The method according to claim 16, further including:

when processing an in-order second instruction, which is a second instruction that does not change a program execution flow, selecting the next in-order second instruction from an instruction block of second instructions by a sequential next block offset without mapping.

23. The method according to claim 22, further including:

recording whether a second instruction is the last second instruction in a block of second instructions;

when an in-order second instruction is not a last second instruction of the instruction block of second instructions, determining a next second instruction as a sequential next second instruction in the same instruction block;

when an in-order second instruction is the last second instruction of the instruction block of second instructions, determining the next second instruction as the very first second instruction in the next instruction block of second instructions.

24. The method according to claim 16, further including:

obtaining a compensated branch offset by the summation of the branch offset and the block offset of the direct branch first instruction in a first instruction set;

embedding the compensated branch offset in the corresponding branch second instruction of a second instruction set; and determining a branch target first instruction address by summation of the compensated branch offset and the block address of the second instruction.

25. The method according to claim 16, further including:

calculating the branch target first instruction address, mapping the target first instruction address to second instruction address, and storing each branch target second instruction address in association with each of the branch second instruction of a second instruction set;

using the branch second instruction address to read out the stored branch target second instruction address; and addressing the second memory with the branch target second instruction address to determine the target second instruction.

26. The method according to claim 25, further including:

defining the block address of a track address as the second memory block number, and defining the block offset of a track address as the block offset of the second instruction address;

preserving the mapped branch target second instruction address in a track address format into a track point of a branch instruction;

as used herein, a track point is a single entry in a track containing information of at least one instruction, a track is a plurality of contiguous track points corresponding to an instruction block of a plurality of contiguous instructions, a track table is a plurality of tracks corresponding to a memory of a plurality of instruction blocks;

addressing the track table and reading out the content of a track point;

addressing the second memory with the block address of the track address in the content of a track point.

27. The method according to claim 16, further including:

converting third instructions of a third instruction sets to second instructions of a second instruction set, and mapping the block offset of third instruction address to the block offset of second instruction addresses based on the stored block offset mapping relationship; thereby the processor is capable of supporting both the first instruction set and the third instruction set.

28. The method according to claim 16, further including:

when a instruction spans two instruction blocks, designating the instruction as the last instruction of the prior instruction block, recording the length of the partial instruction in the latter instruction block; and designating the following instruction as the very first instruction of the latter instruction block, determining the starting block offset of this very first instruction in the latter instruction block based on the recorded partial instruction length.

29. The method according to claim 16, further including:

converting a block of first instructions to a block of second instructions by performing at least one round of conversion operation, starting from an entry position, wherein the entry position is a branch target first instruction, or the very first instruction of a block of first instructions.

30. The method according to claim 29, further including:

converting a not yet converted block of first instructions of the first instruction set starting at an entry position till the last instruction of the block, storing the converted second instructions MSB aligned in a memory block of the second memory, storing the second instruction portion of the extracted mapping relationship MSB aligned, and storing the first instruction portion of the extracted mapping relationship according to first instruction block offset;

converting the not yet converted portion of a partially converted block of first instruction of the first instruction set starting at an entry position till prior to the converted first instructions, append the newly converted second instructions and the newly extracted second instruction portion of the mapping relationship to the less significant side of existing second instructions in the memory block of the second memory and to the less significant side of the existing second instruction block offset mapping relationship, and storing the first instruction portion of the extracted mapping relationship according to first instruction block offset.

31. The method according to claim 29, further including:

converting a not yet converted block of first instructions of the first instruction set starting at an entry position till the last instruction of the block, storing the converted second instructions LSB aligned in a memory block of the second memory, storing the second instruction portion of the extracted mapping relationship LSB aligned, and storing the first instruction portion of the extracted mapping relationship according to first instruction block offset.

32. The method according to claim 31, further including:

converting the not yet converted portion of a partially converted block of first instruction of the first instruction set starting at an entry position till prior to the converted first instructions, storing the newly converted second instructions in reverse order starting from the MSB of the memory block of the second memory;

storing the newly extracted first instruction portion of the mapping relationship according to first instruction block offset, but inserting the newly extracted second instruction portion of the mapping relationship to LSB position by shifting the existing second instruction portion of the extracted mapping relationship to a more significant position, recording the shift-amount;

adjusting the block offset of second instruction address by the shift-amount, the adjusted block offset of second instruction address addressing the selected memory block of second memory to provide the desired second instruction.

\* \* \* \* \*